United States Patent [19]
Ogita et al.

[11] Patent Number: 6,109,225
[45] Date of Patent: Aug. 29, 2000

[54] VALVE TIMING CONTROL DEVICE FOR AN INTERNAL COMBUSTION ENGINE

[75] Inventors: Tamotsu Ogita; Mamoru Yoshioka, both of Susono, Japan

[73] Assignee: Toyota Jidosha Kabushiki Kaisha, Aichi-ken, Japan

[21] Appl. No.: 09/225,744

[22] Filed: Jan. 5, 1999

[30] Foreign Application Priority Data

Jan. 30, 1998 [JP] Japan .................................. 10-018963

[51] Int. Cl.[7] .............................. F02D 13/02; F01L 1/34
[52] U.S. Cl. ..................................... 123/90.15; 123/90.17
[58] Field of Search .............................. 123/90.15, 90.16, 123/90.17, 90.31

[56] References Cited

U.S. PATENT DOCUMENTS

| | | | |
|---|---|---|---|
| 5,517,955 | 5/1996 | Yoshioka | 123/90.15 |
| 5,529,031 | 6/1996 | Yoshioka | 123/90.15 |
| 5,626,109 | 5/1997 | Yasumura et al. | 123/90.15 |
| 5,738,053 | 4/1998 | Kato | 123/90.15 |

FOREIGN PATENT DOCUMENTS

| | | |
|---|---|---|
| 2-294536 | 12/1990 | Japan . |
| 4-194331 | 7/1992 | Japan . |
| 7-91218A | 4/1995 | Japan . |
| 9-60535 | 3/1997 | Japan . |

*Primary Examiner*—Weilun Lo
*Attorney, Agent, or Firm*—Kenyon & Kenyon

[57] ABSTRACT

An engine valve timing control device is disclosed, in which the valve overlap amount is controlled according to the fuel property, thereby keeping the drivability unchanged even when the fuel is changed. A shortage of engine output and cold hesitation are prevented at the same time when the engine temperature is low. The device is for controlling the valve operation characteristic of an internal combustion engine, and comprises a variable valve mechanism capable of changing the valve overlap amount and a control unit for controlling the operating amount of the variable valve mechanism in accordance with the engine operating conditions. The property of the fuel burnt in the engine is determined as light, intermediate or heavy. Under the engine operating condition where the overlap amount otherwise is the same, the operating characteristic of the intake valve and the exhaust valve is controlled in such a manner that the overlap amount of the intake valve or the exhaust valve is smaller for the intermediate fuel than for the light fuel and smaller for the heavy fuel than for the intermediate fuel. Also, the control of the valve overlap amount can be corrected in accordance with the engine temperature.

10 Claims, 33 Drawing Sheets

NE (RPM)

|  | | 800 | 1600 | 2400 | 3200 | | 6400 |
|---|---|---|---|---|---|---|---|
| GN (gr/rev) | 0.25 | 0 | 5 | 10 | 15 | | 15 |
| | 0.50 | 10 | 20 | 25 | 30 | | 20 |
| | 0.75 | 25 | 35 | 40 | 40 | | 30 |
| | 1.00 | 40 | 50 | 60 | 60 | | 30 |
| | 1.25 | 40 | 50 | 60 | 60 | | 20 |
| | 1.50 | 30 | 45 | 50 | 45 | | 10 |
| | 1.75 | 30 | 35 | 40 | 30 | | 0 | tVVT (°CA)

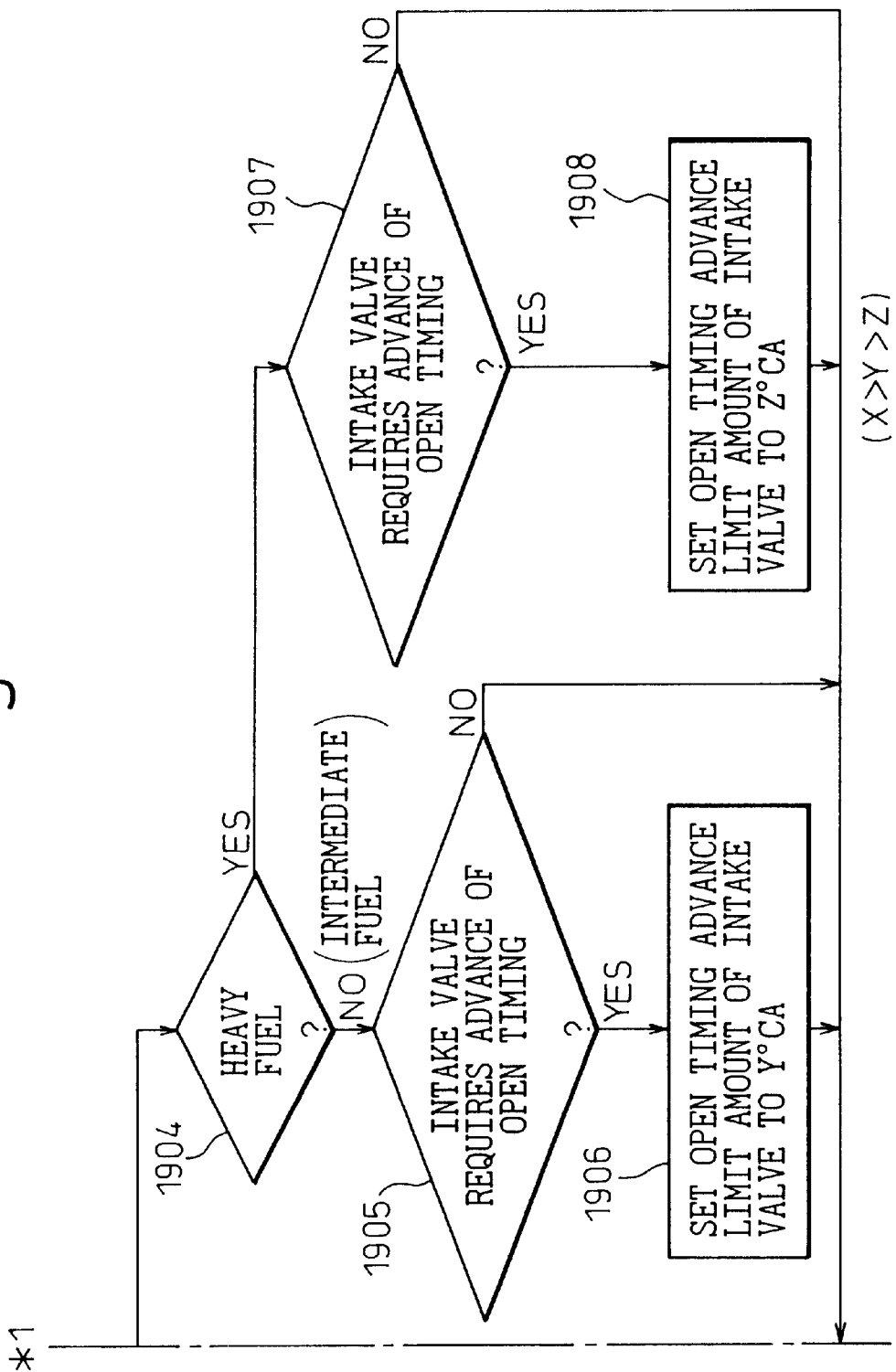

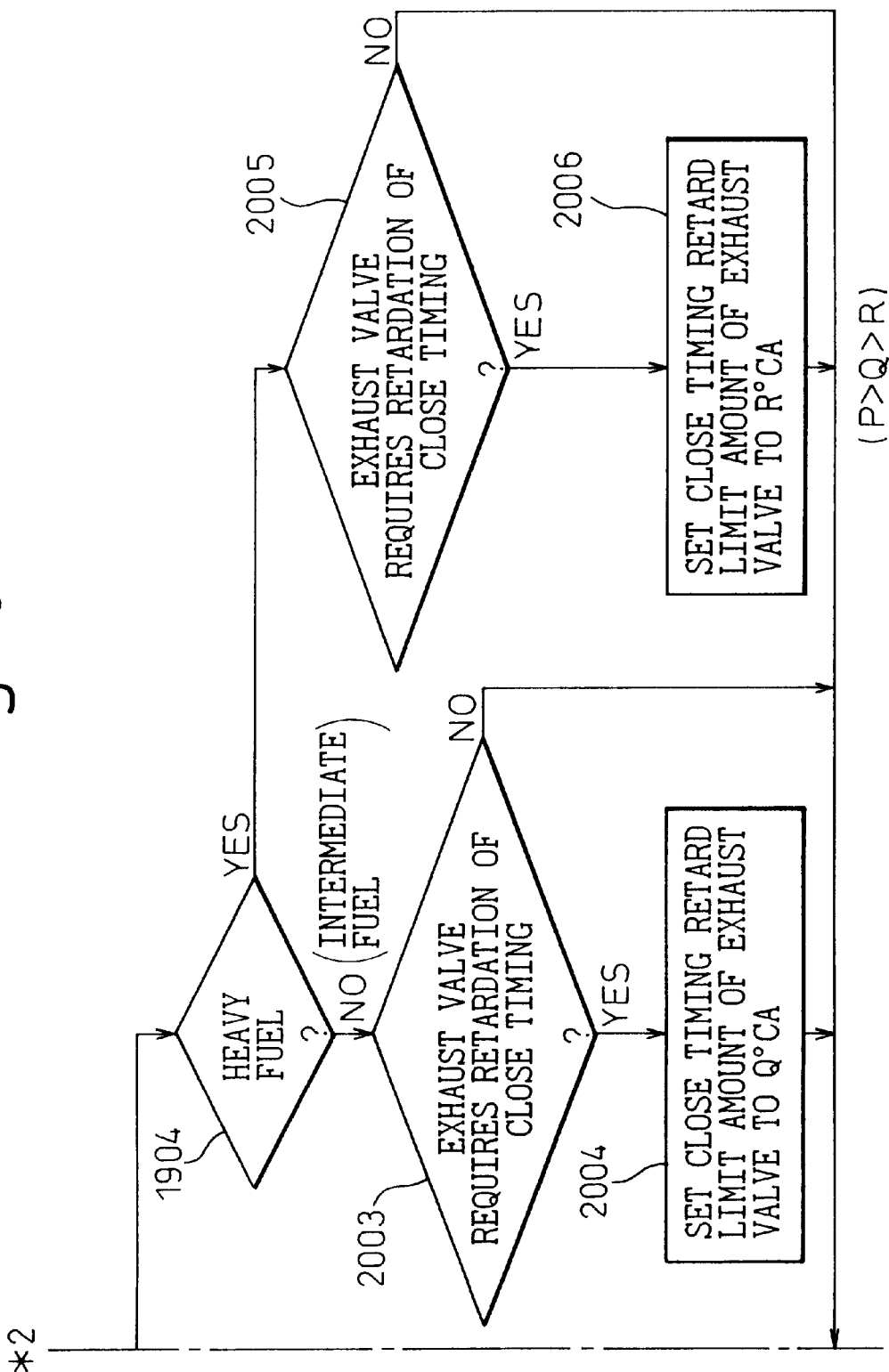

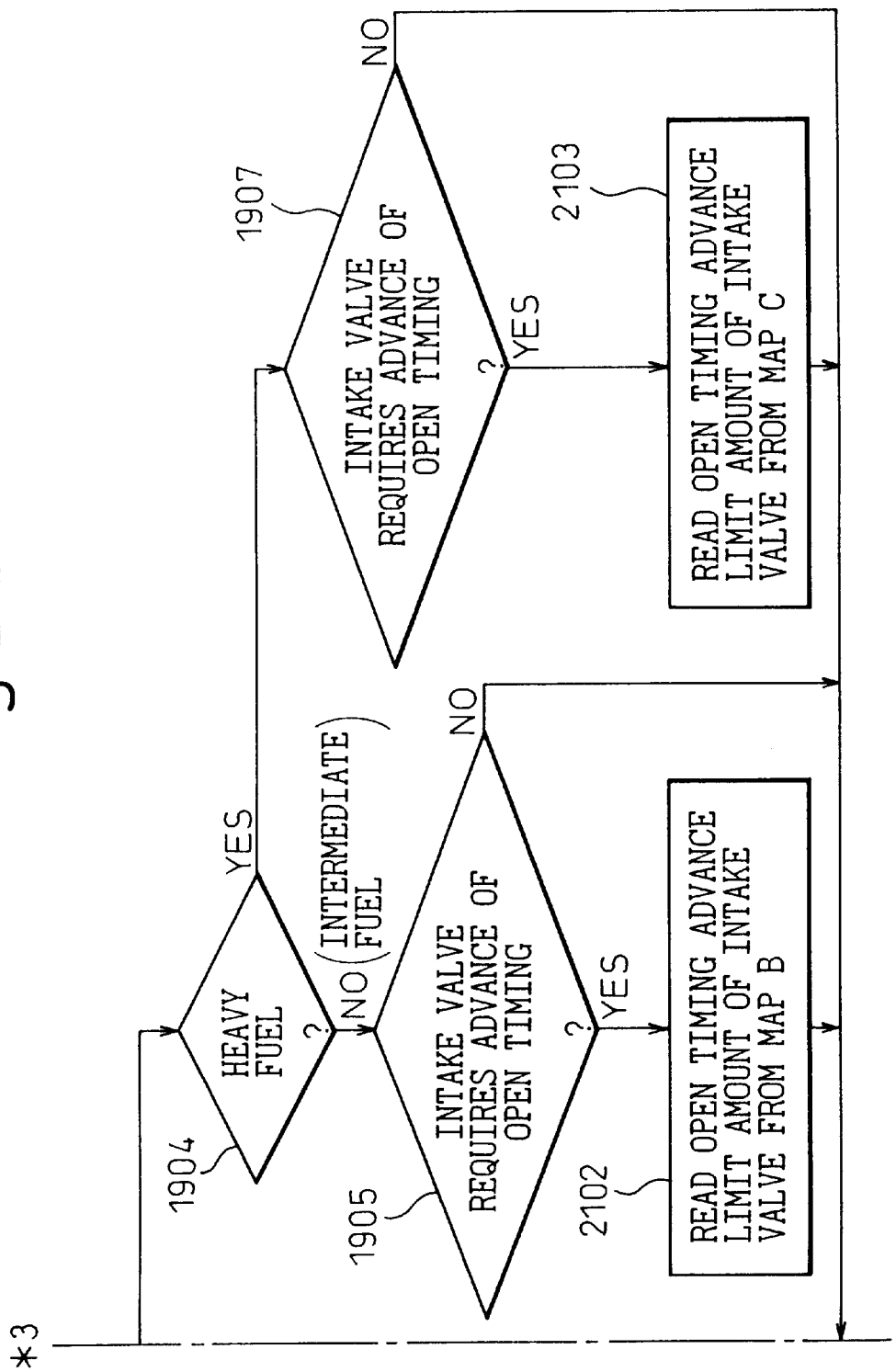

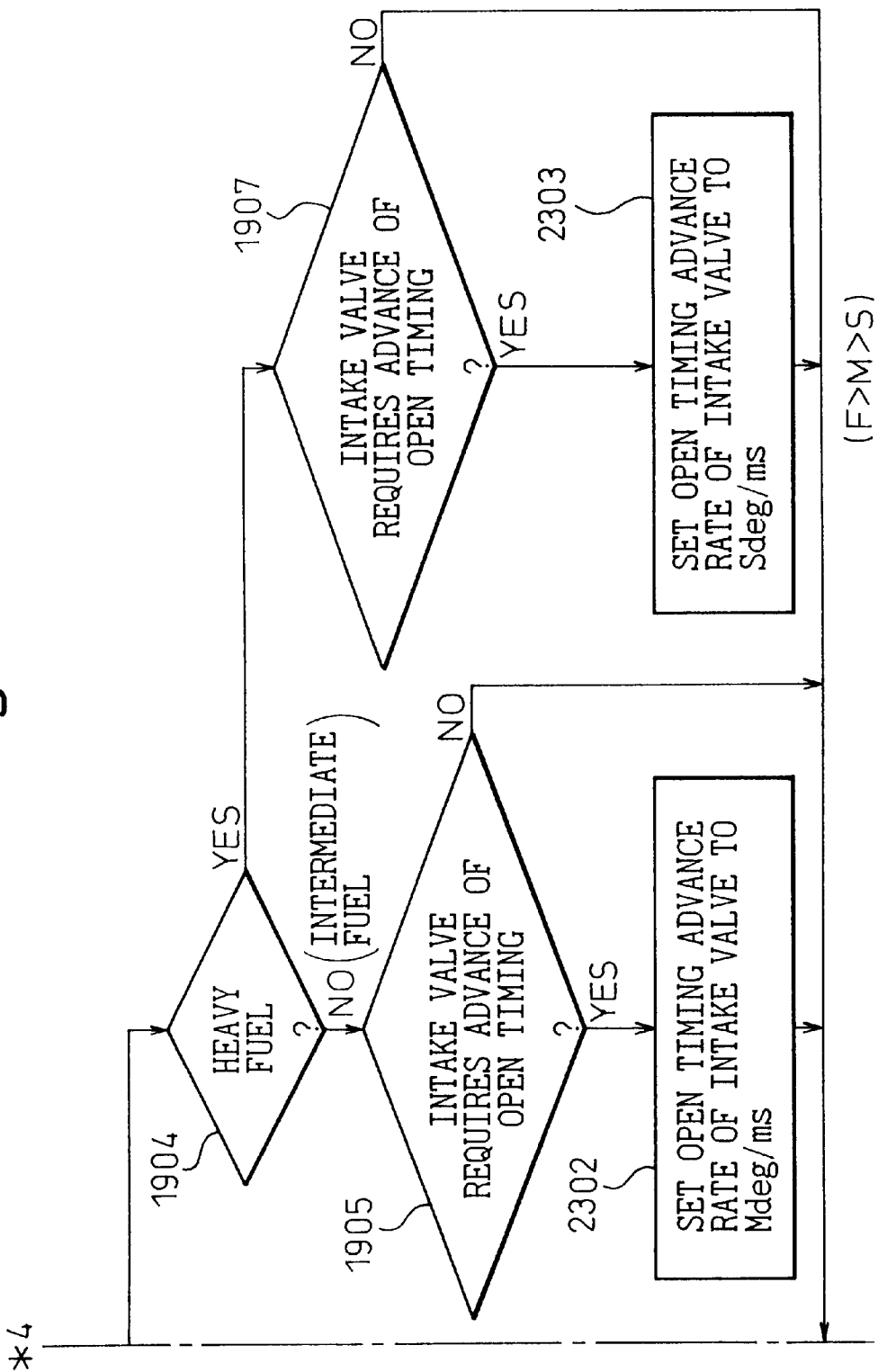

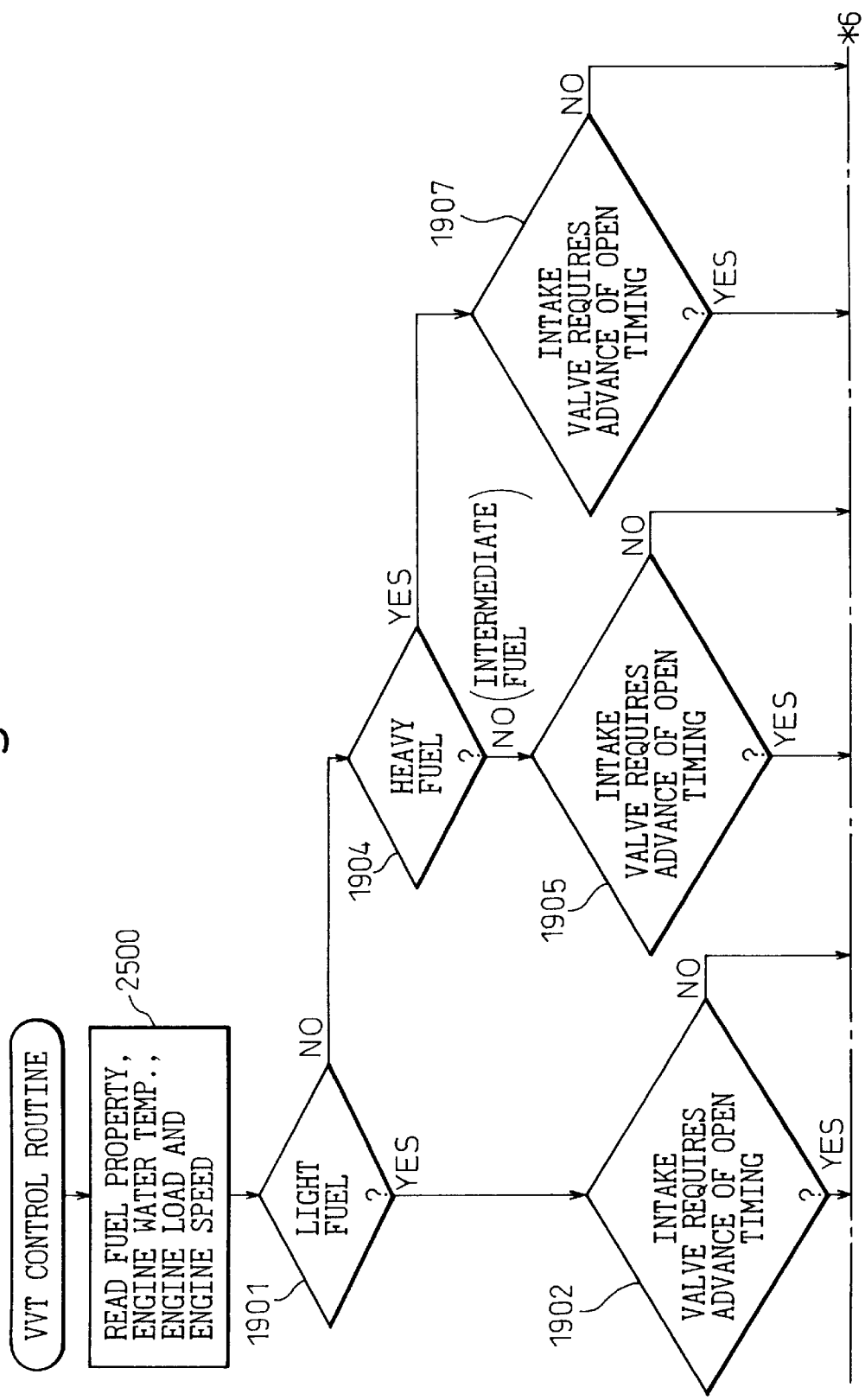

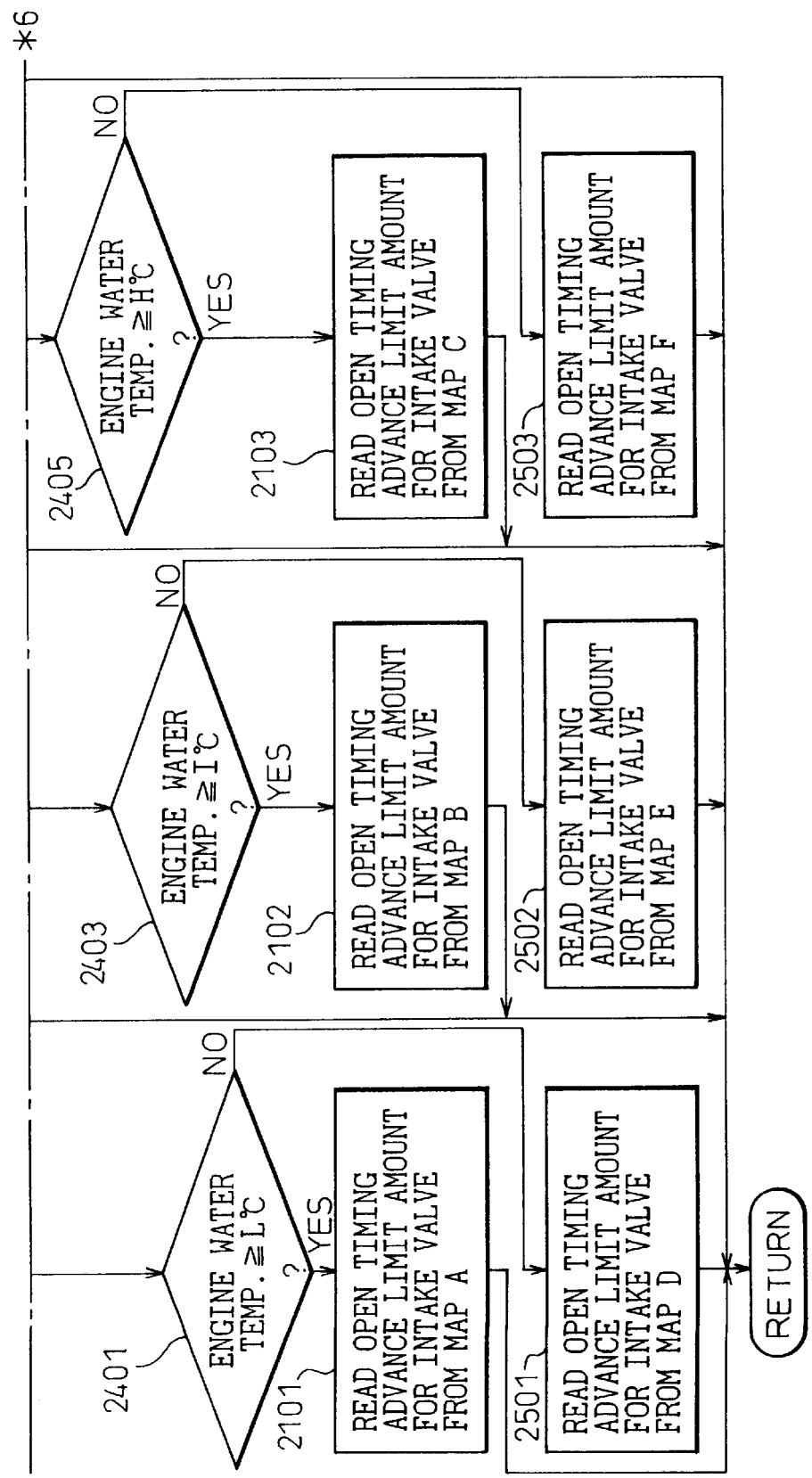

VALVE TIMING CONTROL DEVICE FOR AN INTERNAL COMBUSTION ENGINE

BACKGROUND OF THE INVENTION

1. Field of the Invention

The present invention relates to a valve timing control device for changing the valve timing of an engine and controlling the valve overlap amount between the intake valve and the exhaust valve of the engine in accordance with the operating conditions of the engine. More in particular, the present invention relates to a valve timing control device for an engine which is capable of reducing the emission without deteriorating the engine fuel consumption rate by correcting the valve timing even in the case where a fuel of a different property is supplied.

2. Description of the Related Art

Conventionally, the timing of operating the intake valve mounted on the cylinder head of the engine and the exhaust valve is uniquely synchronized with the rotational phase of the crankshaft, and therefore, the amount of the intake air and the exhaust air in the combustion chamber is dependent on the opening degree of the throttle valve arranged in the intake manifold and the rotational speed of the engine.

In recent years, however, a valve timing control device (variable valve timing mechanism VVT) has found a practical application, in which the timing of operation of the intake valve and the exhaust valve (hereinafter sometimes referred to as the intake and exhaust valves) can be changed so that the amount of intake and exhaust gases in the combustion chamber can be adjusted with a higher degree of freedom. This valve timing control device comprises a mechanical variable mechanism rendering the timing of the operation of the intake and exhaust valves variable and a control unit using a computer for controlling the operation of the variable mechanism. The control unit controls the variable mechanism in accordance with the operating conditions of the engine. Thus, the operation timing of at least one of the intake valve and the exhaust valve is controlled thereby to control the length of the period during which both the intake valve and the exhaust valve are open (the magnitude of the valve overlap amount). As a result of this control operation, the amount of air introduced into the combustion chamber is adjusted to proper amount, or the exhaust gas that has been burnt in the combustion chamber (burnt gas) and returns to and stay in the combustion chamber, i.e. the internal EGR amount is maintained in proper amount for an improved engine output, emission and fuel consumption.

An example of this type of valve timing control device is described in the Unexamined Patent Publication (Kokai) No. 4-194331.

The device described in this publication switches the valve timing in accordance with the operating conditions of the engine. Specifically, when the engine is running at low speed under a light load, the valve overlap amount is set to a low level. Also, when the engine is running in cold state at low temperature, the overlap amount is set to a small level over the entire operating areas.

Generally, when the valve overlap amount is set to a large level, both the intake valve and the exhaust valve remain open for a longer period during the exhaust stroke, and the burnt gas in the cylinders is liable to return to the intake port in a phenomenon called "blow back". Especially when the engine is running under a light load with a small throttle valve opening degree and a high negative pressure in the intake port (that is to say, a low absolute pressure in the intake port), a valve overlap is liable to cause blowing back of the burnt gas.

A large amount of the burnt gas blew back into the intake port causes the burnt gas returned to the intake port to be introduced again into the cylinder during the intake stroke. This poses the problem of a reduced amount of new gas supplied to the cylinder (an increased internal EGR amount). Especially when the engine temperature is low, an increased amount of the fuel supplied to the intake port attaches to the wall surface of the intake port (a wall-attached fuel) with the result that a sufficient amount of fuel is not supplied to the cylinder.

Specifically, when the engine temperature is low, the fuel supplied to the intake port is not easily vaporized, and therefore forms comparatively large liquid fuel particles in the intake port. If the burnt gas returns to the intake port under this condition, the fuel particles in the intake port are blown back and attach to the wall surface thereof. Also, the lower the engine temperature, i.e. the lower the efficiency of fuel vaporization, the larger the amount of the fuel that is blown back and attaches to wall surface of the intake port. If the spitting of the burnt gas occurs when the engine temperature is low, therefore, the fuel attached to the wall surface of the intake port prevents a sufficient amount of fuel from being supplied to the cylinder, thereby causing a cold hesitation (called the delayed acceleration at low temperature) or posing the problem of unstable combustion due to the increased internal EGR amount.

The Unexamined Patent Publication (Kokai) No. 4-194331 described above discloses a method in which, when the engine is running at low speed under a light load and liable to cause the spitting due to a high negative pressure of the intake port, the valve overlap amount is reduced to reduce the spitting of the burnt gas to prevent an increase of the internal EGR amount and the deterioration of the fuel combustion. Further, when the engine temperature is low, the valve overlap amount is reduced over the entire operation range thereby to reduce the amount of fuel attaching to the wall surface due to the spitting of the burnt gas.

As described above, in the device described in the aforementioned patent publication, the valve overlap amount is set to a lower value when the engine temperature is low than when the engine temperature is high in order to stabilize the combustion by reducing the internal EGR amount and to prevent the cold hesitation by reducing the amount of fuel attaching to the wall surface of the intake port.

Another problem is that when the engine temperature is low, the operating speed of the valve timing control device for changing the valve timing decreases to such an extent that the engine may misfire depending on the change in the operating conditions. Specifically, when the engine temperature is low, the increased friction in the various parts and the increased viscosity of the engine oil decreases the operating speed of the valve timing control device. As a result, when the engine temperature is low, it takes longer to change the valve overlap amount to a level suitable for the prevailing operating conditions, and a difference occurs temporarily between the optimum valve overlap amount and the actual valve overlap amount. In the case where the actual valve overlap amount is smaller than the optimum value, the engine output decreases but no serious operating problem is posed. In the case where the valve overlap amount is excessively large as compared with the optimum value, however, a misfire may occur. In an extreme case, the engine becomes impossible to operate. In view of this, when the engine temperature is low, the valve overlap amount is set normally to a level lower than when the engine temperature is high. In this way, the actual valve overlap amount is prevented from increasing excessively as compared with the optimum value even when the operating speed of the valve timing control device decreases, thereby preventing a misfire.

Specifically, in the prior art, when the engine temperature is low, the valve overlap amount is set to a value smaller than when the engine temperature is high, in order to (1) reduce the internal EGR, (2) to reduce the amount of fuel attached to the wall surface of the intake port, and (3) to prevent a misfire which otherwise might be caused by the slower operating speed of the valve timing control device.

If the valve overlap amount is uniformly decreased by a valve timing control device like the one disclosed in the above-mentioned patent publication, in which the valve overlap amount of the cylinder is changed by changing the valve timing, however, the engine performance is considerably reduced when the temperature is low. In the case where the valve overlap amount is changed by changing the valve timing, the valve open period is normally maintained constant. For example, in a case in which the valve overlap amount is controlled by changing the operation timing of the intake valve, the earlier (advanced) the operation timing of the intake valve, the more the valve overlap amount increases, while the later (retarded) the operation timing of the intake valve, the more the valve overlap amount decreases. In the case where the valve overlap amount is changed by controlling the valve timing, therefore, a small setting of the valve overlap amount delays the close timing of the intake valve at the same time so that the intake valve undesirably closes during the compression stroke after the intake stroke of the cylinder. In this way, once the close timing of the intake valve overlaps with the compression stroke of the cylinder, the gas that has already been introduced into the cylinder is pushed back to the intake port from the intake valve during the compression stroke, resulting in a lower intake gas volume efficiency of the cylinder. Especially when the engine is running at low speed, the supercharge effect due to the intake inertia cannot substantially be secured and therefore, a delayed close timing of the intake valve considerably reduces the engine output due to a reduced intake air volume efficiency.

On the other hand, the fuel attached to the wall surface of the intake port, for example, even in the case where the burnt gas is somewhat blown back due to the valve overlap when the engine temperature is low, is not easily attached to the wall surface if the fuel is vaporized efficiently. Even when the engine temperature is low, therefore, it should be possible to increase the valve overlap amount in the case where a light fuel high in vaporization efficiency is used unlike in the case where a heavy fuel, not easily vaporized, is used.

Also, in the case where the friction is small in the valve timing control device or a working oil low in viscosity is used, a misfire should be prevented even if the valve overlap is set to a large amount at a low temperature when the operating speed of the valve timing control device is high unlike when the operating speed is low.

For this reason, if the valve overlap amount is set uniformly to a small value when the engine temperature is low as in the device disclosed in the Unexamined Patent Publication (Kokai) No. 4-194331 described above, the unnecessary small setting of the valve overlap amount may lead to the operation with a lower engine output depending on the operating conditions.

Some valve timing control devices comprise a variable valve timing mechanism capable of changing the operation timing of the intake and exhaust valves continuously without switching between small and large values. In this variable valve timing mechanism of continuous variable type, the engine operating conditions are detected by a computer thereby to calculate a target operation timing of the intake and exhaust valves, and at the same time, the actual operation timing of the intake and exhaust valves is detected, so that the variable timing mechanism is controlled by feedback in such a manner that the target operation timing and the actual operation timing of the intake and exhaust valves coincide with each other.

In the case where this variable valve timing mechanism of a continuously variable type develops a trouble such that the variable mechanism fails to operate as intended, the engine suffers from various faults. Assume, for example, that the variable valve timing mechanism fails to operate with a large valve overlap amount under a light engine load. The engine may be stalled. Once the engine is stalled, any subsequent trouble in the variable valve timing mechanism cannot be detected.

In view of this, a fault detection device for the engine valve timing control device has been proposed (see the Unexamined Patent Publication (Kokai) No. 9-60535), in which a trouble of the variable valve timing mechanism of continuous variable type can be detected even after the engine comes to stop due to a stall by detecting the trouble of the control device based on the judgment of the occurrence of an engine stall.

The variable valve timing mechanism of a continuously variable type disclosed in the Unexamined Patent Publication (Kokai) No. 9-60535 described above has the effect of reducing NOx due to an increased internal EGR and improving the fuel consumption due to a decreased pumping loss by setting the valve overlap amount to a large value.

The components of the fuel used for the engine, however, are not constant under all operating conditions, but are divided into several types according to the properties to assure the same volatility in accordance with the temperature of the location where the fuel is mainly used. The fuel properties are roughly classified into three types described below.

Light fuel: Fuel having many components of low boiling point

Heavy fuel: Fuel having few components of low boiling point

Intermediate fuel: Fuel having components of a boiling point intermediate between the light and heavy fuels The variable valve timing mechanism described in the Unexamined Patent Publication No. 9-60535, however, fails to take the aforementioned fuel properties into consideration, and fails to perform the control operation in accordance with the fuel properties. In the case where a heavy fuel is used, for example, more fuel is attached to the wall surface. The fluctuation of the amount of the heavy fuel thus attached may destabilize the combustion.

SUMMARY OF THE INVENTION

A first object of the present invention is to provide an engine valve timing control device comprising a variable valve timing mechanism of a continuously variable type, in which the valve overlap amount is controlled taking the fuel properties into consideration and NOx is reduced while at the same time improving the fuel consumption rate due to a decreased pumping loss.

A second object of the invention is to provide a valve timing control device in which the valve overlap amount is adjusted by changing the valve timing in such a manner that the reduction in the valve overlap amount is minimized when the engine is low in temperature thereby to improve the engine output under the conditions where the engine output has conventionally been reduced.

The features of the configuration of a valve timing control device for an engine that achieve the objects of the present invention are described as first to 12th aspects of the invention below.

The feature of the configuration according to the first aspect of the invention lies in that a valve timing control device for changing the valve timing of at least one of the intake valve and the exhaust valve of an engine comprises valve variable means capable of changing the valve overlap amount from the opening of the intake valve to the closing of the exhaust valve of a given cylinder, means for detecting the operating conditions of the engine, control means for controlling the operating amount of the valve variable means in accordance with the operating conditions of the engine, fuel property detection means for detecting the property of the fuel combusted in the engine, and operating amount correction means of the control means for correcting the control amount of the control means in accordance with the fuel property detected by the fuel property detection means.

The feature of the configuration according to a second aspect of the invention lies in a valve timing control device according to the first aspect of the invention, in which the operating amount correction means for the control means corrects the control amount based on the limit value corresponding to the fuel property detected by the fuel property detection means.

The feature of the configuration according to a third aspect of the invention lies in a valve timing control device according to the second aspect of the invention, in which the control amount of the operating amount correction means for the control means is corrected by correcting the limit value of the open timing advance of the intake valve and the limit value of the close timing retardation of the exhaust valve corresponding to the fuel property detected by the fuel property detection means.

The feature of the configuration according to a fourth aspect of the invention lies in a valve timing control device according to the third aspect of the invention, in which the limit value of the open timing advance of the intake valve and the limit value of the close timing retardation of the exhaust valve are largest for the property of light fuel and are progressively smaller for the intermediate and heavy fuels in that order.

The feature of the configuration according to a fifth aspect of the invention lies in a valve timing control device according to the first aspect of the invention, in which the operating amount correction means for the control means changes the correction amount in accordance with the fuel property detected by the fuel property detection means and the engine operating conditions.

The feature of the configuration according to a sixth aspect of the invention lies in a valve timing control device according to the fifth aspect of the invention, in which the operating amount correction means for the control means changes the correction amount by reading a correction amount from a map corresponding to the fuel property detected by the fuel property detection means and the engine operating conditions.

The feature of the configuration according to a seventh aspect of the invention lies in a valve timing control device for changing the valve timing of at least one of the intake valve and the exhaust valve of an engine, comprising valve variable means capable of changing the valve overlap amount from the opening of the intake valve to the closing of the exhaust valve of a given cylinder, means for detecting the operating conditions of the engine, control means for controlling the operating amount of the valve variable means, fuel proper detection means for detecting the property of the fuel combusted in the engine, and operating speed correction means for the control means for correcting the control speed of the control means in accordance with the fuel property detected by the fuel property detection means.

The feature of the configuration according to an eighth aspect of the invention lies in a valve timing control device according to the first to seventh aspects of the invention, in which the means for detecting the engine operating conditions includes means for detecting the engine temperature, and the control means activates the valve variable means when the engine temperature is not lower than a predetermined value.

The feature of the configuration according to a ninth aspect of the invention lies in a valve timing control device according to the eighth aspect of the invention, in which the control means activates the valve variable means at an engine temperature which is lowest for the property of light fuel and progressively increases for the property of the intermediate and heavy fuels in that order.

The feature of the configuration according to a tenth aspect of the invention lies in a valve timing control device according to the first aspect of the invention, in which the means for detecting the operating conditions of the engine includes means for detecting the engine temperature, the control means controls the operating amount of the valve variable means to reduce the valve overlap of the engine to a lower amount when the engine temperature is low than when the engine temperature is high, and the operating amount correction means for the control means corrects the control amount in such a manner as to increase the valve overlap at a low engine temperature to an amount larger in the case where the fuel used for the engine is a light fuel than in the case where the fuel used for the engine is a heavy fuel with the property thereof detected by the fuel property detection means.

The feature of the configuration according to an 11th aspect of the invention lies in a valve timing control device for changing the valve timing of at least one of the intake valve and the exhaust valve of an engine, comprising valve variable means capable of changing the valve overlap amount from the opening of the intake valve to the closing of the exhaust valve of a given cylinder, means for detecting the operating conditions of the engine, control means for controlling the operating amount of the valve variable means in accordance with the operating conditions of the engine, and operating speed detection means for detecting the rate of changing the valve timing, wherein the engine operating conditions detection means includes means for detecting the engine temperature, and the control means controls the operating amount of the valve variable means thereby to correct the overlap amount at a low engine temperature to a higher value when the valve timing changing rate is high than when the valve timing changing rate is low.

The feature of the configuration according to a 12th aspect of the invention lies in a valve timing control device according to the 11th aspect of the invention, further comprising engine speed detection means for detecting the engine speed, wherein the control means controls the operating amount of the valve variable means thereby to correct the valve overlap amount at a low engine temperature to a higher value when the engine speed is high than when the engine speed is low.

According to the first aspect of the invention, a heavy fuel, if used, attaches in a greater amount to the wall surface of the intake port and the combustion becomes unstable when the valve overlap amount is large. Therefore, the overlap amount is controlled not to increase excessively. In the case of a light fuel, on the other hand, the problem of the fuel attached is posed less often so that the overlap amount is increased to reduce NOx and the pumping loss. In this way, the valve overlap amount can be optimally determined in accordance with the fuel property.

According to the second aspect of the invention, a limit value is set corresponding to the fuel property. According to the third aspect of the invention, the limit values of the open timing advance of the intake valve and the close timing retardation of the exhaust valve are set according to the fuel property. According to the fourth aspect of the invention, on the other hand, the limit value is increased to a largest value for the light fuel property, and progressively decreased for the intermediate and heavy fuel properties in that order. According to the fifth and sixth aspects of the invention, the correction amount of the operating amount correction means of the control means is changed by reading a correction amount from a map corresponding to the fuel property and the engine operating conditions. According to the seventh aspect of the invention, the rate of change in the amount of the attached fuel can be controlled by changing the control speed and the combustion can be stabilized even more. Further, according to the eighth and ninth aspects of the invention, the change in the amount of attached fuel with the engine temperature is taken into consideration to achieve an optimum control operation.

According to the tenth aspect of the invention, the valve overlap amount is set to a smaller value when the engine temperature is low than when the engine temperature is high. In the case where the light fuel is used for the engine, however, the valve overlap amount is corrected to a larger value than for the heavy fuel even when the engine temperature is low. As a result, the valve overlap amount is corrected in accordance with the tendency of vaporization of the fuel when the engine temperature is low, and the valve overlap amount is set to a large value in the case where the fuel is vaporized so efficiently that no fuel attaches to the wall surface.

Also, according to the 11th aspect of the invention, the valve overlap amount is set to a smaller value when the engine temperature is low than when the engine temperature is high. In the case where the changing rate of the valve timing (the operation speed of the valve timing control device) is high, however, the valve overlap amount is corrected to a larger value than in the case where the changing rate of the valve timing is low even when the engine temperature is low. As a result, the valve overlap amount is set to a large value even when the engine temperature low if the response speed of the valve timing control device is so high that the difference between the optimum valve overlap amount and the actual overlap amount is small.

Further, according to the 12th aspect of the invention, there is provided a valve timing control device according to the 11th aspect of the invention, in which the valve overlap amount is corrected in accordance with the engine speed. Specifically, when the engine is running at high speed, the discharge pressure and the discharge flow rate of the work-ing oil pump of the valve timing control device increase and therefore the operating speed of the valve timing control device becomes higher than when the engine speed is low. As a result, if the valve overlap is controlled based on the operating speed of the valve timing control device detected by the operating speed detection means when the engine speed is low, the valve overlap amount for high engine speed is liable to be not necessarily proper. According to claim 3 of the invention, the valve overlap amount corrected by the operating speed correction means the engine speed correction means is further corrected in accordance with the engine speed. Thus, the change in the operating speed of the valve timing control unit with the engine speed is corrected.

BRIEF DESCRIPTION OF THE DRAWINGS

The present invention will be more clearly understood from the description as set forth below with reference to the accompanying drawings, wherein:

FIGS. 19A and 19B are flowcharts showing the steps of controlling the valve timing according to a fourth embodiment of the invention;

FIGS. 20A and 20B are flowcharts showing the steps of controlling the valve timing according to a fifth embodiment of the invention;

FIGS. 21A and 21B are flowcharts showing the steps of controlling the valve timing according to a sixth embodiment of the invention;

FIGS. 23A and 23B are flowcharts showing the steps of controlling the valve timing according to a seventh embodiment of the invention;

FIGS. 25A and 25B are flowcharts showing the steps of controlling the valve timing according to a ninth embodiment of the invention;

DESCRIPTION OF THE PREFERRED EMBODIMENTS

Embodiments of the present invention will be described in detail below based on specific examples with reference to the accompanying drawings.

Figure 1A:
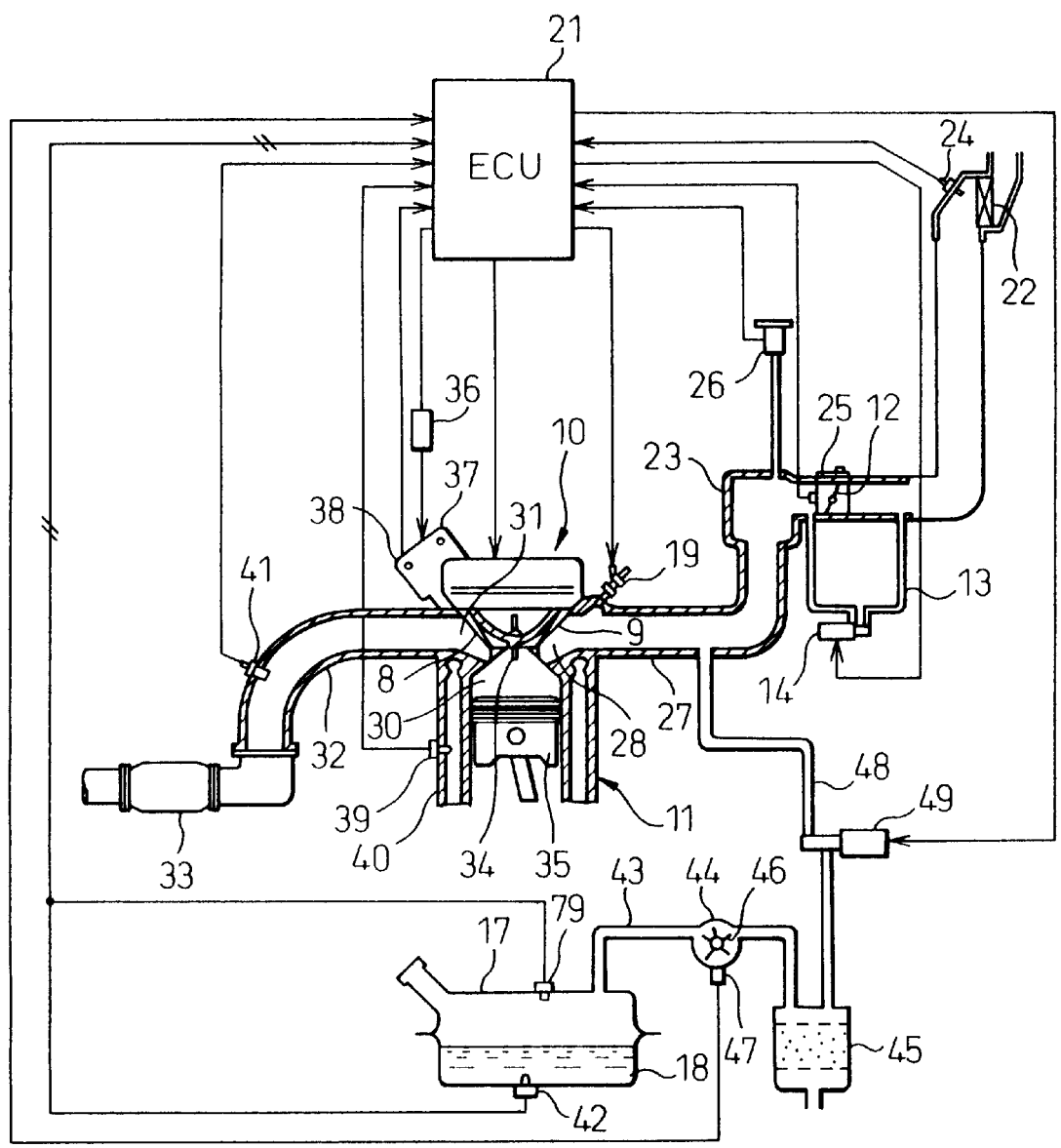
FIG. 1A is a diagram showing a general configuration of a multi-cylinder engine of electronic fuel injection control type including a valve timing control device according to the present invention.

FIG. 1A shows a general configuration of a multi-cylinder internal combustion engine 11 of electronic fuel injection control type including a valve timing control device 10 according to this invention. The engine 11 is a 4-cylinder 4-cycle spark ignition internal combustion engine controlled by an ECU (engine control unit) 21 having a microcomputer built therein.

A throttle valve 12 and a surge tank 23 are arranged in that order on the downstream side of an air cleaner 22. An intake air temperature sensor 24 for detecting the temperature of the intake air is mounted in the neighborhood of the air cleaner 22. Also, an idle switch 25, adapted to turn on when the throttle valve 12 closes up, is mounted on the throttle valve 12. Further, the surge tank 23 includes a pressure sensor 26 of diaphragm type for measuring the amount of intake air. A bypass 13 for communicating the upstream side and the downstream side of the throttle valve 12 with each other is arranged circumventing the throttle valve 12. An ISCV (idle speed control valve) 14 with the opening thereof controlled by a solenoid is arranged midway of the bypass 13. The current flowing in the ISCV 14 is controlled in duty cycles to regulate the opening degree of the ISCV 14, with the result that the amount of air flowing in the bypass 13 is regulated to control the idling speed to a target value.

The surge tank 13 communicates with a combustion chamber 30 of the engine 11 through an intake manifold 27 and an intake port 28. A fuel injection valve 19 for supplying the pressured fuel corresponding to the intake air amount detected by the pressure sensor 26 to the intake port for each cylinder from a fuel supply system is arranged downstream of the surge tank 23. The output of the idle switch 25 and the output of the pressure sensor 26 are applied to the ECU 21.

The exhaust gas discharged from the combustion chamber 30 is introduced to a catalyst unit 33 through an exhaust port 31 and an exhaust manifold 32 and emitted into the atmosphere in purified state. The exhaust manifold 32 arranged upstream of the catalyst unit 33 includes an oxygen sensor 41 which is a kind of air-fuel ratio sensor. The oxygen sensor 41 generates an electrical signal corresponding to the concentration of the oxygen component of the exhaust gas. The output of the oxygen sensor 41 is input to the ECU 21.

The intake port 28 is operated by the intake valve 9, and the exhaust port 31 is operated by the exhaust valve 8. The open/close timing of the exhaust valve 8 and the intake valve 9 is controlled by the valve timing control device 10. The valve timing control device 10 according to this embodiment, which can control the retardation of the close timing of the exhaust valve 8 and the advance of the open timing of the intake valve 9, can control the period (the valve overlap amount) during which the intake valve 9 opens before the exhaust valve 8 closes and therefore both the exhaust valve 8 and the intake valve 9 are open. The valve timing control device 10 is controlled by the ECU 21. The configuration of this valve timing control device 10 is described later.

Numeral 34 designates a spark plug for generating a spark in the combustion chamber 30, and numeral 35 a piston reciprocating in the combustion chamber 30. An ignitor 36 generates a high voltage, which is distributively supplied to the spark plugs of the cylinders by way of a distributor 37. A rotational angle sensor 38 is used for detecting the rotation of the rotational shaft of the distributor 37. For example, a rotation signal of the engine is sent from the rotational angle sensor 38 to the ECU 21 for each 30° CA.

A water temperature sensor 30 for detecting the temperature of the cooling water is arranged in a cylinder block 40 of the engine 11. The water temperature sensor 39 generates an electrical signal of analog voltage corresponding to the temperature of the cooling water, and a water temperature sensor signal (THW) is sent to the ECU 21.

A fuel temperature sensor 42 is arranged under the fuel tank 17 for measuring the temperature of the fuel 18. A pressure sensor 79 for detecting the internal pressure of the fuel tank 17 is arranged and a vapor path 43 is formed on the fuel tank 17. The vapor path 43 communicates with a canister 45 through a vapor flowmeter 44. The vapor generated in the fuel tank 17, the flow rate of which is measured by the vapor flowmeter 44, flows into the canister 45. The vapor flowmeter 44 has a rotative portion 46 adapted to rotate in response to the vapor flow rate. The rotation of the rotative portion 46 is detected by a vapor flow rate sensor 47, and the detection signal of the vapor flow rate thus detected is input to the ECU 21.

From the detection signals of the internal pressure of the fuel tank detected by the fuel tank pressure sensor 79 and the vapor flow rate detected by the vapor flow rate sensor 47, the ECU 21 can detect the property of the fuel 18 in the fuel tank 17. Specifically, the ECU 21 can detect whether the fuel involved is a light fuel, an intermediate fuel or a heavy fuel according to the degree of difficulty of evaporation (distilling characteristic) of the fuel 18 in the fuel tank 17.

The vapor adsorbed to the canister 45 is introduced into the intake manifold 27 through a purge path 48. The purge path 48 includes an orifice not shown, and therefore, the negative pressure of the intake manifold 27 is not exerted directly on the fuel tank 17. A purge control valve 49 is arranged midway of the purge path 48. The opening degree of the purge control valve 49 is adjusted by regulating the current flowing in the solenoid of the purge control valve 49, thereby adjusting the flow rate of the purge flowing in the purge path 48.

Figure 1B:
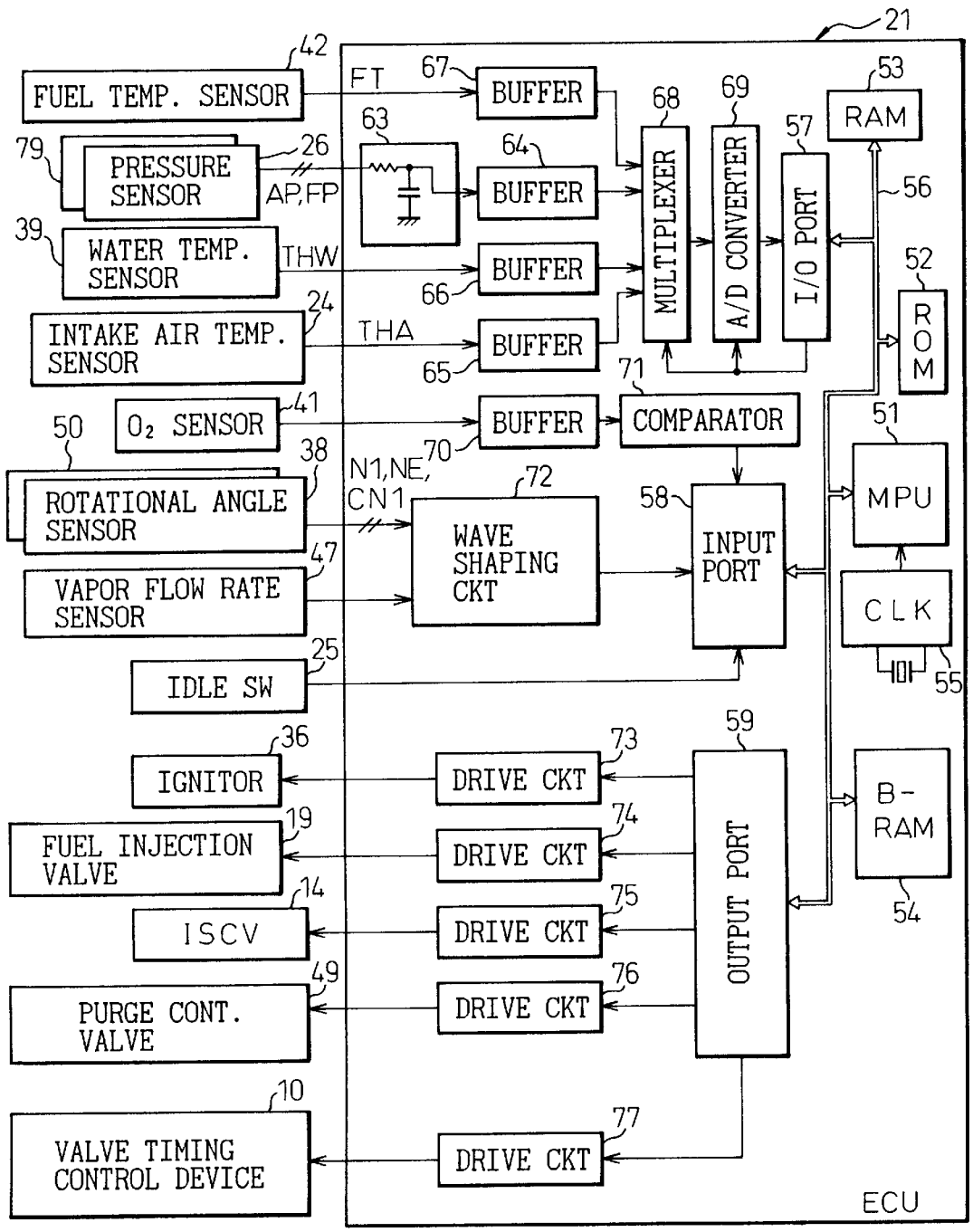
FIG. 1B is a block diagram showing the connection between the internal configuration of the ECU of FIG. 1A and sensora.

The ECU 21 having a microcomputer built therein has a configuration as shown in FIG. 1B. In FIG. 1B, the same component parts as the corresponding component parts in FIG. 1A are designated by the same reference numerals, respectively, and will not be described. In FIG. 1B, the ECU 21 includes a MPU (microprocessor unit) 51, a ROM 52 having a processing program incorporated therein, a RAM 53 used as a working area, a backup RAM (B-RAM) 54 for holding the data even after the engine stops, and a clock generator (CLK) for supplying a clock signal to the MPU 51. These component parts are connected to each other by a bidirectional bus line 56. The bus line 56 is connected with an input/output port 57, an input port 57 and an output port 59.

The input/output port 57 is connected with four buffers 64 to 67 through a multiplexer 68 and an A/D converter 69. The buffer 64 is supplied with the intake pressure detection signal AP of the pressure sensor 26 and the fuel tank internal pressure detection signal FP of the fuel tank pressure sensor 79 through a filter 63. The buffers 65 to 67, on the other hand, are supplied with the detection signal THA of the intake air temperature sensor 24, the detection signal THW of the water temperature sensor 65 and the detection signal FT of the fuel temperature sensor 42, respectively. The filter 63 is for removing the vibration component of the intake pipe pressure and the fluctuation components of the fuel tank internal pressure contained in the detection signal of the pressure sensor 26. The multiplexer 68 is for selectively outputting the input signals.

The input port 58 is supplied with the detection signal of the oxygen sensor 41 through a buffer 70 and a comparator 71, the detection signals N1, NE, CN1 from a crank shaft rotational angle sensor 38 and a cam rotational angle sensor 50, and the detection output of the vapor flow rate sensor 47 through a waveform shaping circuit 72. The input port 58 is further supplied with the on/off signal from an idle signal switch 25.

The output port 59 is connected to drive circuits 73 to 77. The drive circuit 73 drives the ignitor 36, the drive circuit 74 drives the fuel injection valve 19, the drive circuit 75 drives the ISCV 14, the drive circuit 76 drives the purge control valve 49, and the drive circuit 77 drives the valve timing control device 10.

Figure 1C:
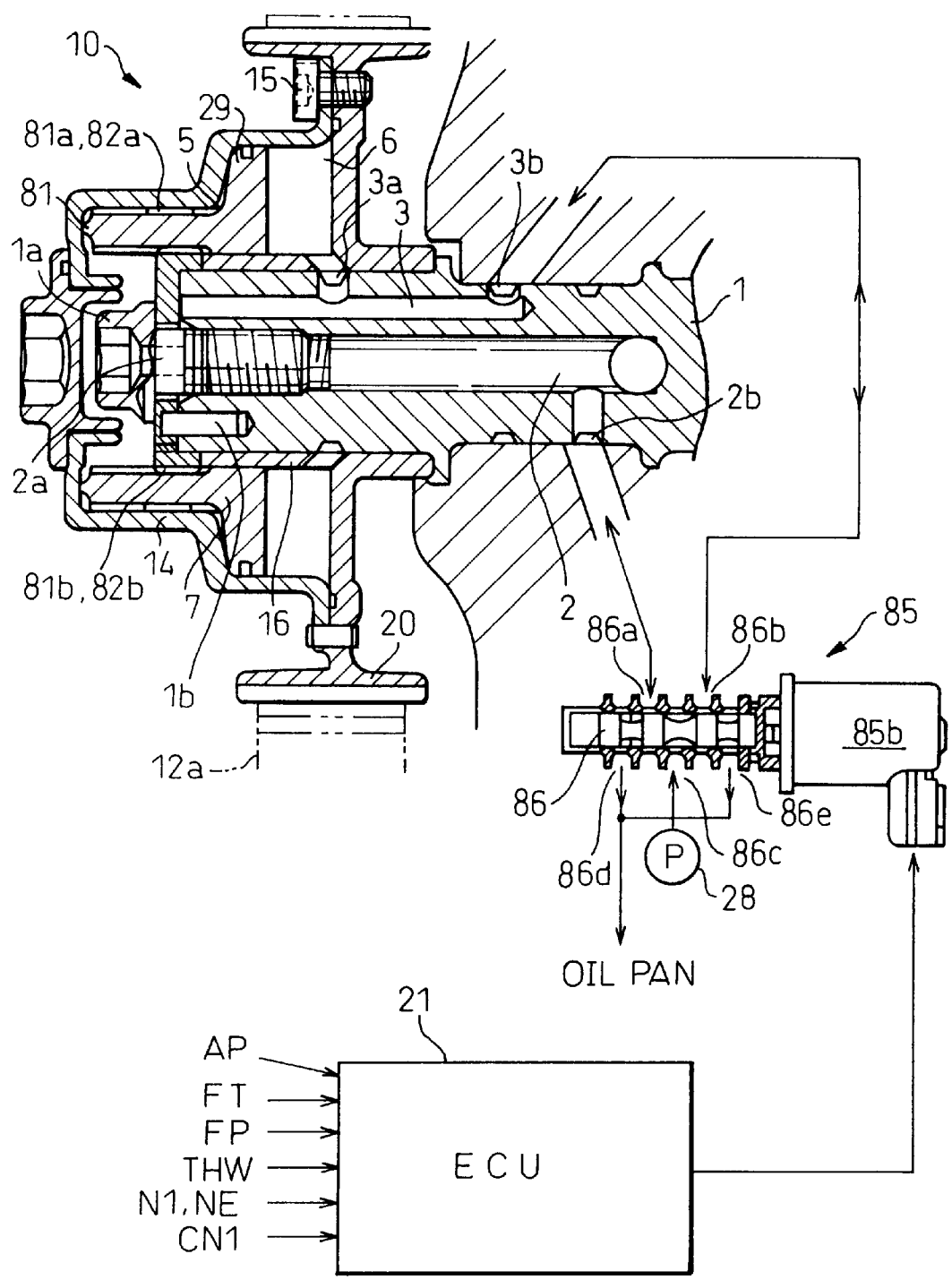
FIG. 1C is a diagram schematically showing a configuration of a valve timing control device according to an embodiment of the invention as applied to the intake valve of a four-cycle engine.

FIG. 1C is a diagram schematically showing a configuration of the valve timing control device 10 of FIGS. 1A, 1B as applied to the intake valve of a 4-cycle engine.

This embodiment employs an engine of double overhead camshaft (DOHC) type having a separate camshaft for driving each of the intake valve and the exhaust valve. The valve timing control device 10 is arranged only for the intake camshaft. Specifically, according to this embodiment, the valve timing is not changed for the exhaust valve, but only the valve timing of the intake valve is changed in accordance with the operating conditions thereby to change the valve overlap between the intake valve and the exhaust valve. By the way, the present invention is not limited to this embodiment, but is applicable also to the case where the valve timing of only the exhaust valve is changed or the case where the valve timings of both the intake valve and exhaust valve are changed.

In FIG. 1C, numeral 1 designates an intake camshaft for driving the open/close operation of the intake valve (not shown) of the DOHC engine. A valve timing control device 10 is arranged at an end of the intake camshaft 1.

The valve timing control device 10 includes a timing pulley 20 having a cylindrical sleeve 16 and a cover 4 for covering the ends of the camshaft 1. The timing pulley 20 is mounted rotatably on the camshaft 1 around the intake camshaft 1 through the cylindrical sleeve 16. Also, the cover 4 is fixed by a bolt 15 to the timing pulley 20 and adapted to rotate integrally with the pulley 12.

The cover 4 has a piston member 7 therein. The piston member 7 includes an annular piston portion 29 and a cylindrical portion 81 extending from the piston portion 29. The outer peripheral surface and the inner peripheral surface of the piston portion 29 are in slidable contact with the inner peripheral surface of the cover 4 and the outer peripheral surface of the sleeve 16, respectively. Also, the outer peripheral surface and the inner peripheral surface of the cylindrical portion 81 of the piston member 7 are cut and formed with an outer helical gear 81a and an inner helical gear 81b having a predetermined helix angle, respectively. The outer helical gear 81a is in mesh with an internal helical gear 82a formed on the inner peripheral surface of the cover 4. Also, the inner helical gear 81b is in mesh with an annular external helical gear 82b mounted integrally by a bolt 1a and a pin 1b at the end surface of the camshaft 1.

In the valve timing control device 10 according to this embodiment, the rotation of the engine crankshaft (not shown) is transmitted to the timing pulley 20 through a timing belt 12a. With the rotation of the pulley 12, the cover 4 rotates integrally with the pulley 12, so that the piston member 7 coupled to the cover 4 through the helical gears 82a, 81a is rotated integrally with the cover 4. The piston member 7 is also coupled to the camshaft 1 through the helical gears 81b, 82b, and therefore the camshaft 1 is rotated integrally with the pulley 12.

Specifically, in the valve timing control device 10 according to this embodiment, the turning effort of the camshaft 1 is transmitted to the timing pulley 20 through the timing belt 12a from the crankshaft, and further transmitted from the pulley 12 through the cover 4, the helical gears 82a, 81a, the piston member 7 and the helical gears 81b, 82b to the camshaft 1.

The valve timing control device 10 according to this embodiment changes the valve timing of the intake valve by moving the piston member 7 along the axis of the camshaft 1. Specifically, the piston member 7 is coupled to the cover 4 and the camshaft 1 by helical gears 82a, 81a, 81b, 82b in mesh with each other and having a predetermined helix angle. As a result, once the piston member 7 moves along the axis of the camshaft, the point of engagement of the helical gears 82a, 81a and 81b, 82b moves along the axis following the tooth trace. Therefore, when the piston member 7 moves along the axis of the camshaft, the engaging point of the helical gears 82a, 81a and 81b, 82b moves in the axial direction along the tooth trace.

In view of the fact that each tooth face of the gear has a helix angle with respect to the axial direction of the camshaft, the movement of the engaging point along the axis causes the cover 4 and the piston member 7 to move relatively to each other circumferentially along the tooth trace of the helical gear, and so does the piston member 7 and the camshaft 1. Thus, with the movement of the piston member 7 along the axial direction, the cover 4 rotates relatively to the piston member 7 and the piston member relatively to the camshaft 7. By moving the piston member 7 along the axis of the camshaft 1 while the engine is running, therefore, the rotational phase of the timing pulley 20, i.e. the rotational phase of the camshaft 1 with respect to the rotational phase of the crankshaft can be advanced (or retarded). Thus, the timing of operating the intake valve driven by the camshaft 1 can be advanced (or retarded) appropriately.

As described above, the valve timing control device 10 according to this embodiment changes only the rotational phase of the intake camshaft 1. When changing the valve timing, therefore, the open timing of the intake valve is changed in the same amount as the close timing thereof, thus maintaining a constant open time period of the intake valve.

According to this embodiment, the timing of the intake valve is changed by moving the piston member 7 using the oil pressure. As shown in FIG. 1C, two oil paths 2 and 3 are formed along the axial direction in the camshaft 1. The oil path 2 is formed at the center of the camshaft 1, and the axial end of the oil path 2 communicates with a hydraulic chamber 5 formed between the inner surface of the cover 4 and the axial end surface of the piston member 7 through a port 2a formed in the bolt 1a. Also, the other end of the oil path 2 is connected to a linear solenoid valve 85 described later through a port 2b formed in radial direction in the camshaft 1. On the other hand, the axial end of the oil path 3 is closed by the annular outer helical gear 82b described above. Also, the oil path 3 communicates through a radially-formed port 3a with the hydraulic chamber 6 formed by the end surface of the piston member 7, the timing pulley 20 and the cover 4 through the radially-formed port 3a on the one hand and communicates with the linear solenoid valve 85 through another port 3b on the other hand.

The linear solenoid valve 85 is a spool valve having a spool 86 and includes a hydraulic port 86a connected through a piping to the port 2b of the oil path 2 described above, a hydraulic port 86b connected through a piping to the port 3b of the oil path 3, a port 86c connected to an oil pressure source 28 such as an engine lubricant pump, and two drain ports 8d, 86e. The spool 86 of the valve 85 operates in such a manner that one of the ports 86a and 86b communicates selectively with the port 86c and the other is connected to the drain ports.

Specifically, when the spool 86 moves leftward in FIG. 1C, the port 86a communicating with the port 2b of the oil path 2 is connected to the pump 88 constituting an oil pressure supply through the port 86c, and the drain port 86d is closed. At the same time, the port 86b connected to the port 3b of the oil path 3 communicates with the drain port 86e. As a result, the lubricant flows into the hydraulic chamber 5 of the valve timing control device 10 from the hydraulic pump 88 such as the engine lubricant pump through the oil path 2 and the port 2a, thereby pushing the piston member 7 rightward in FIG. 1C. At the same time, the lubricant in the hydraulic chamber 6 is discharged from the drain port 86e from the port 3a through the oil path 3, the port 3b, the port 86b of the linear solenoid valve 85, etc. As a result, the piston member 7 moves rightward in FIG. 1C.

When the spool 88 moves rightward in FIG. 1C, on the other hand, the port 86b is connected to the port 86c, and the port 86a is connected to the drain port 86d. As a result, the lubricant flows into the hydraulic chamber 6 through the oil path 3, and the lubricant is discharged into the drain port 86d through the oil path 2 from the hydraulic chamber 5. Thus, the piston member 7 moves leftward in FIG. 1C.

According to this embodiment, the helix angle of the helical gears 81a, 81b and 82a, 82b is set so that when the lubricant is supplied to the hydraulic chamber 5 and the piston member 7 moves rightward in FIG. 1C, the operation timing of the intake valve is changed to the advance side, and when the lubricant is supplied to the hydraulic chamber 6 and the piston member 7 moves leftward in FIG. 1C, the operation timing of the intake valve is changed to retard side.

A linear solenoid actuator for driving the spool 86 is designated by 85b in FIG. 1C. The linear solenoid actuator 85b is supplied with a control signal from an ECU (engine control unit) 21 described later, and moves the spool 86 in an amount proportional to the magnitude of the control signal. The position of the piston member 7, i.e. the operation timing of the intake valve is changed accordingly.

An ECU for controlling the operation of the linear solenoid valve 85 is designated by numeral 21 in FIG. 1C. The internal configuration of the ECU 21 was described above with reference to FIG. 1B, and therefore will not be illustrated. The ECU 21 according to this embodiment controls the operation of the linear solenoid valve 85 in accordance with the engine operating conditions, regulates the operation timing of the intake valve, and thus controls the valve overlap amount of the intake and exhaust valves. For the purpose of this control operation, the ECU 21 is supplied with a voltage signal AP proportional to the engine intake air amount (volumetric flow rate) from the intake pressure sensor 26 arranged in the intake path of the engine, and a voltage signal THW proportional to the engine cooling water temperature from the water temperature sensor 39 arranged in the engine cooling water path. The ECU 21 is also supplied with a pulse signal N1 representing the rotational angle of the crankshaft from the crankshaft rotational angle sensor 38 arranged on the engine crankshaft, and a pulse signal CN1 representing the rotational angle of the camshaft 1 from a cam rotational angle sensor 50 arranged on the camshaft.

Also, the ECU 21 is supplied with a voltage signal FT from a fuel temperature sensor 42 for detecting the fuel temperature of a fuel tank 17 and a voltage signal FP from a fuel tank pressure sensor 79 for detecting the internal pressure of the fuel tank.

The engine intake air amount detected by the pressure sensor 26 is converted into a weight flow by a well-known method, and further the intake weight flow GN (=G/NE) per revolution of the engine is calculated using the engine speed NE at predetermined time intervals and stored in the RAM 33 of the ECU 21.

The pulse signal from the crankshaft rotational angle sensor 38 contains an N1 signal indicating a reference position of the crankshaft generated for each 720 degrees of rotation of the crankshaft and an NE signal generated for each 30 degrees of rotation of the crankshaft. The cam rotational angle sensor 50 generates a CN1 pulse signal indicating the arrive of the camshaft at a reference position for each 360 degrees of the camshaft rotation. The ECU 21 calculates the engine speed NE from the pulse intervals of the NE signal at predetermined time intervals and at the same time calculates the rotational phase (actual operation timing of the intake valve) VT of the camshaft 1 from the time interval between the N1 signal and the CN1 signal using the engine speed NE. The result of this calculation is stored in the RAM 53. Also, the cooling water temperature THW is A/D converted and stored similarly in the RAM 53 at predetermined time intervals. In other words, the detection values GN, NE, VT, THW, FT, FP, etc. stored in the RAM 53 are updated at predetermined time intervals so that the latest values are stored in the RAM 53 all the time.

As described later, the engine speed NE and the engine intake air amount GN are used as parameters indicating the engine load conditions. Also, the cooling water temperature THW is used for correcting the valve timing based on the engine temperature, as described later. Further, the tank internal fuel temperature FT and the tank internal pressure FP are used for determining the property of the engine fuel.

The output port 59 of the ECU 21, on the other hand, is connected to the actuator 85b of the linear solenoid valve 85 through the drive circuit 48 thereby to supply a control signal to the actuator 85b.

The ECU 21 in this embodiment, in cooperation with the fuel temperature sensor 42 and the fuel tank pressure sensor 79, functions as fuel property determining means for determining the property of the fuel in the fuel tank 17 and fuel correction means for correcting the valve overlap amount in accordance with the fuel property when the engine temperature is low.

The setting of the operation timing of the intake valve will be explained with reference to FIG. 2.

Figures 2, 3:
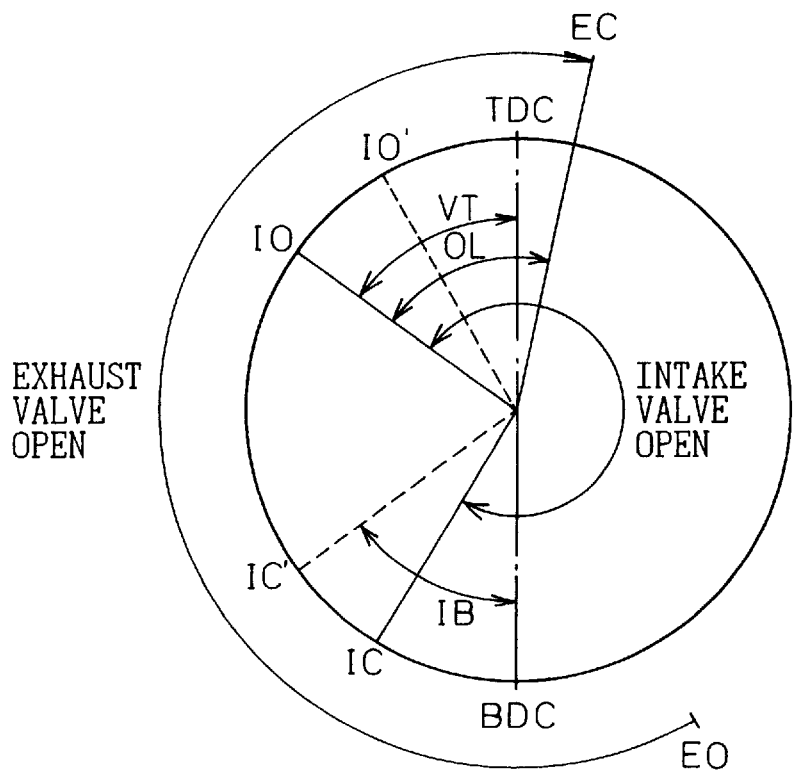
FIG. 2 is a model diagram showing general open and close timings of the intake valve and the exhaust valve.
FIG. 3 is a diagram showing an example of setting a basic valve timing value after complete warming up of the engine.

FIG. 2 is a diagram showing a model of the general operation timing of the intake valve and the exhaust valve. In FIG. 2, TDC designates the top dead center of the piston stroke, BDC the bottom dead center thereof, IO, IC the open timing and the close timing, respectively, of the intake valve, and EO, EC the open timing and the close timing, respectively, of the exhaust valve. As shown in FIG. 2, the intake valve opens before the top dead center (TDC) of the exhaust stroke, and closes after the bottom dead center (BDC) of the intake stroke. The exhaust valve, on the other hand, opens before the bottom dead center (BDC) of the explosion stroke and closes after the top dead center (TDC) of the exhaust stroke. As shown in FIG. 2, the valve timing is set in such a manner that the intake valve opens (IO) before the exhaust valve closes (EC) in the exhaust stroke, and therefore there exists a period during which both the intake valve and the exhaust valve are open (the period indicated by OL in FIG. 2). In this embodiment, the length (angle) of the period OL is called as the valve overlap amount. Also, in this embodiment, the angle from the open timing of the intake valve to the top dead center is defined as a valve timing value VT. As seen from FIG. 2, in this embodiment, the close timing of the exhaust valve is fixed, and therefore the valve open timing VT and the valve overlap amount OL corresponds to each other in one-to-one relation. Specifically, a large VT (an early open timing IO of the intake valve) indicates a correspondingly larger valve overlap amount OL, while a small VT (a late open timing IO of the intake valve) indicates a correspondingly smaller valve overlap amount OL.

Generally, the setting of the intake valve timing VT (valve overlap amount OL) has the following effects on the engine performance.

(1) When VT is increased and the valve overlap amount OL is set to a large value, the spitting of the burnt gas into the intake port increases under a light load where the negative pressure in the intake manifold increases (the absolute pressure of the intake port decreases). Also, the burnt gas blew back into the intake port is introduced again into the combustion chamber, so that what is called the internal EGR effect, in which the amount of the residual burnt gas in the combustion chamber increases, increases. In view of the fact that the throttle valve opening degree increases and the intake negative pressure decreases with the increase in the load, on the other hand, the spitting of the burnt gas decreases even if the valve overlap amount OL is set to a large value under a heavy load.

(2) If the VT is reduced and the valve overlap amount OL is set to a small value, the intake valve open timing and close timing are delayed as compared with when the valve overlap amount is set to a large value (IO', IC' in FIG. 2 show the intake valve open and close timings, respectively, for the valve overlap amount set to a small value). In this case, the period (designated by IB in FIG. 2) during which the intake valve is open in compression stroke is lengthened, and therefore the new air introduced into the cylinder is pushed back into the intake port from the cylinder in the initial period of compression stroke in low and intermediate engine speed areas. The charging efficiency of the cylinder is thus reduced. As a result, if the valve overlap amount OL is set to a small valve, the real compression ratio of the cylinder is reduced.

In high engine speed areas, on the other hand, the intake air increases in flow velocity and the intake inertia effect is produced. The later the close timing, therefore, the higher the charging efficiency for an increased real compression ratio. As a result, in high engine speed areas, the real compression ratio of the cylinder is increased, if the valve overlap amount OL is set to a small valve.

According to this embodiment, by taking the effect of the valve timing value on the engine performance described above into consideration, the intake valve timing is set in each engine operating area in the manner described below.

FIG. 3 shows an example of the setting of the valve timing value VT for the engine operation in the standard state of the embodiment, i.e. the operation after the warming of the engine. The valve timing setting in the standard state will hereinafter be referred to as the basic valve timing value (tVVT).

In the table of FIG. 3, the ordinate represents the intake air weight GN (grams/rotation) per engine rotation used as a parameter indicating the engine load, and the abscissa represents the engine speed NE (RPM). The basic valve timing value tVVT is given by the rotational angle (° CA) of the crankshaft.

As shown in FIG. 3, the basic valve timing value tVVT assumes a maximum value in the intermediate speed and intermediate load operation areas of the engine (in the area of NE≈2400 to 3200 RPM, GN≈1.0 to 1.25 grams/rotation in FIG. 3). The basic valve timing value tVVT and the valve overlap amount OL become smaller, when the engine speed or engine load increases or decreases from this intermediate engine speed and intermediate engine load area.

Specifically, according to this embodiment, in the low load area (say, GN<1.00), the lower the load, the smaller the value to which the basic valve timing tVVT (i.e., the valve overlap amount OL) is set in order to stabilize the combustion against the reduction of the internal EGR due to the spitting of the burnt gas. In the intermediate load area, on the other hand, the internal EGR increases considerably, and therefore the emission can be improved and the pumping loss can be reduced. Therefore, the valve overlap amount OL (basic valve timing value tVVT) is generally set to a value larger than under low or heavy load. Even in the intermediate load area, however, if the valve overlap amount OL is set to an excessively high value in the low engine speed area, the combustion is liable to become unstable. In the high speed and intermediate load area, on the other hand, if the valve overlap amount OL is set to a large value, the intake inertia cannot be used for a reduced charging efficiency. In the low engine speed area and the high engine speed area, therefore, the valve overlap amount OL is set to a comparatively small value. For this reason, according to this embodiment, the basic valve timing value tVVT is set to such a value that the valve overlap amount OL assumes a maximum value in the intermediate engine speed and intermediate load area.

In the heavy load area, the internal EGR is required to be reduced for increasing the output. Therefore, VT is generally set to a small value. Especially in the high speed area, the smaller the VT, the greater the effect of improving the charging efficiency of new air due to the intake inertia. In this area, therefore, the VT is set to a smaller value than in the low and intermediate speed areas. As a result, according to this embodiment, the basic valve timing value tVVT is set in such a manner that the valve overlap amount OL is reduced with the increase in load in the heavy load area (GN>1.25), and the valve overlap amount OL is smaller in the high speed area (NE>3200 RPM) than in the low speed area (NE<1600 RPM) under the same load.

Now, an explanation will be given about the correction of the basic valve timing value tVVT at low engine temperatures.

As described above, the valve timing value tVVT (valve overlap amount) shown in FIG. 3 is associated with the standard state after the engine is sufficiently warmed up. In the state where the engine is low in temperature, however, the fuel is not efficiently vaporized. A large spitting of the burnt gas onto the intake port, therefore, would pose the problem of the fuel particles attaching to the intake port wall in the same liquid state as when supplied to the intake port. When the engine temperature is low, the temperature of the intake port wall surface is also low, so that the fuel attached to the intake port wall surface is not easily vaporized. Thus, once the fuel is attached to the wall surface when the engine temperature is low, the amount of the fuel actually supplied into the cylinder is reduced, thereby posing the problem of "scruple" (called cold hesitation) to increase the engine speed during the low temperature operation. In view of this, according to this embodiment, the basic valve timing value tVVT of FIG. 3 is corrected based on the engine cooling water temperature THW, so that the lower the engine temperature (the lower the engine cooling water temperature THW), the smaller the actual valve overlap amount thereby to prevent the cold hesitation.

Figure 4:
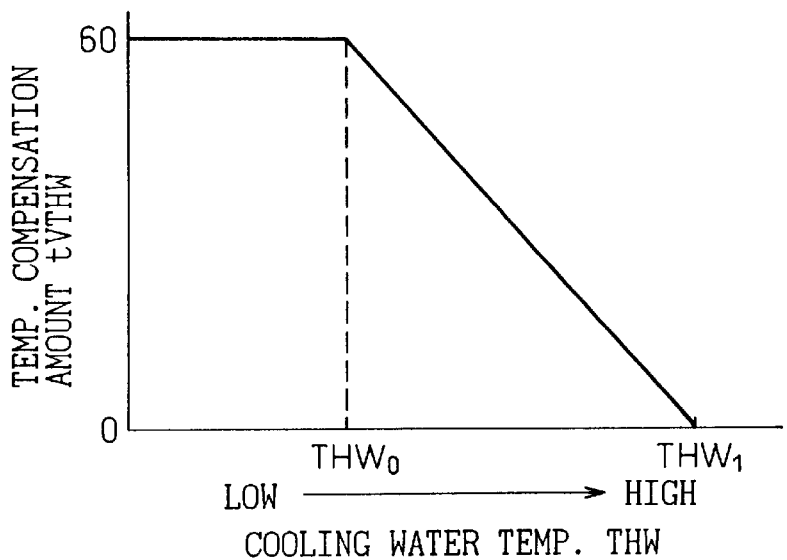
FIG. 4 is a diagram showing the relation between the temperature corrected amount of the valve timing and the temperature of the engine cooling water.

FIG. 4 is a graph showing the relation between the cooling water temperature THW and the valve timing temperature correction amount tVTHW based on THW. As shown in FIG. 4, the value of the temperature correction amount tVTHW is set to zero after complete engine warm-up (with the cooling water temperature THW of at least a predetermined value THW1). In the temperature range of THW<THW1, on the other hand, the temperature correction amount tVTHW is set to a larger value, the lower the cooling water temperature THW. Further, in the area where the cooling water temperature THW is not higher than a predetermined value THW0, the temperature correction amount tVTHW is set to a predetermined large value. As described later, the ECU 21 determines the value of the temperature correction amount tVTHW based on the cooling water temperature THW, corrects the basic valve timing value tVVT determined from the engine speed and the load, using the temperature correction amount tVTHW, and calculates the actual valve timing control target value VVT of the valve timing control device 10 as VVT=tVVT−tVTHW (VVT≧0).

As a result, the valve timing control target value VVT after temperature correction is set to a value smaller by the correction amount tVTHW corresponding to the cooling water temperature THW uniformly over the entire operation areas as compared with the basic valve timing value tVVT of FIG. 3.

In the case where the temperature is corrected in such a manner as to reduce the valve overlap amount for the entire load areas when the engine temperature is low, however, the above-mentioned delay in the intake valve close timing poses the problem that the engine output is more decreased due to the reduction in actual compression ratio especially in the low and intermediate speed areas where the supercharge effect is not obtained by the intake inertia.

The correction of the valve overlap amount by the engine temperature described above is intended mainly to prevent the fuel from being attached to the port wall surface by the spitting of the burnt gas to the intake port when the engine temperature is low. Even when the engine temperature is low, however, as long as the fuel particles supplied to the intake port are vaporized or sufficiently atomized, however, the amount of fuel attached to the wall surface is reduced even in the presence of spitting, if any, of the burnt gas to the intake port. The tendency of the fuel to vaporize, on the other hand, depends to a large measure on the composition of a particular fuel. A fuel containing much light components (light fuel) is satisfactorily vaporized even when the engine temperature is low. Even when the engine temperature is low, therefore, if a light oil superior in vaporization tendency is used, the fuel is not easily attached to the wall surface. In such a case, no problem of cold hesitation or the like is posed even if the valve overlap amount is set to a somewhat large value.

Specifically, as long as the valve overlap amount is set to a small value always when the engine temperature is low, the engine output is unnecessarily reduced even when a light fuel is used which can increase the engine output by setting the valve overlap amount to a larger value. According to this embodiment, therefore, the valve timing setting after temperature correction described above is further corrected in accordance with the fuel property in such a way that the lighter the fuel used, the larger the valve overlap amount. As a result, the valve overlap amount is reduced only when necessary at low engine temperatures, and the unnecessary engine output reduction is prevented.

For the valve overlap amount to be corrected according to the property of the fuel used when the engine temperature is low as described above, it is necessary to accurately determine the vaporization tendency of the fuel currently used for the engine. According to this embodiment, the fuel property is determined according to the following method by measuring the change in fuel temperature in the fuel tank and the change in the pressure in the fuel tank after engine start.

Figure 5:
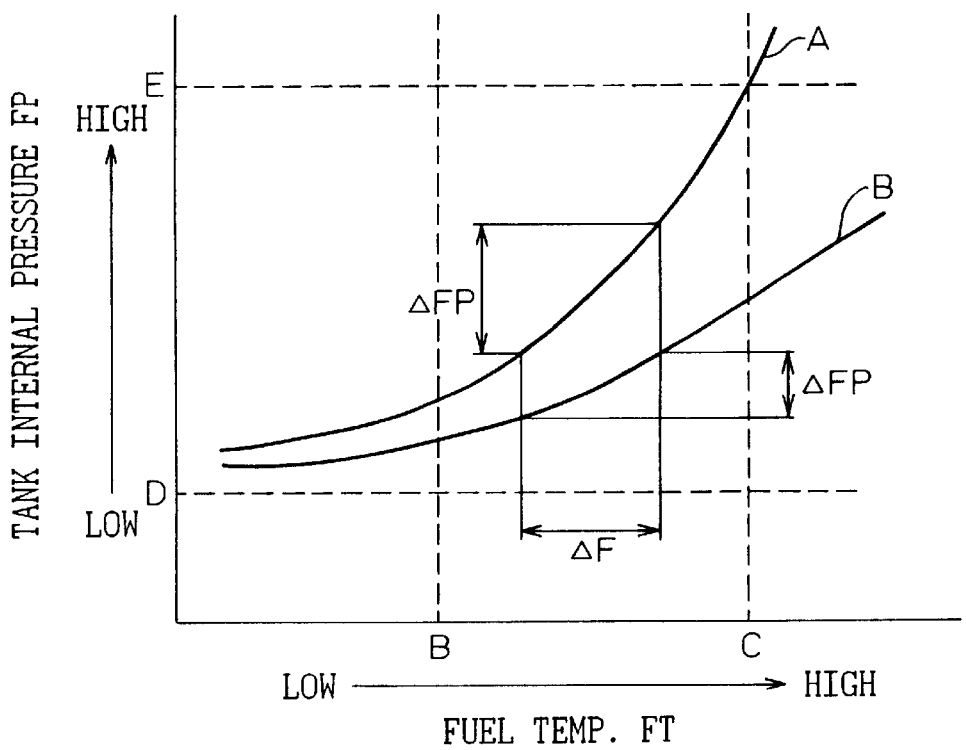
FIG. 5 is a diagram for explaining the change in tank internal pressure with the change in fuel temperature.

FIG. 5 is a diagram showing the relation between the internal pressure of the fuel tank (fuel vapor pressure) and the internal temperature of the tank. In FIG. 5, the abscissa represents the fuel temperature, and the ordinate represents the tank internal pressure. The curve A in the drawing covers the fuel (light fuel) containing many light components, and the curve B the fuel (heavy oil) containing many heavy components. The internal pressure of the fuel tank increases with the fuel vapor pressure as the fuel temperature increases. In the process, as shown in FIG. 5, the vapor pressure becomes higher for the easily vaporized light fuel (curve A) than for the not easily vaporized heavy fuel (curve B), the temperature being the same. Thus, the internal pressure of the fuel tank increases. Also, as shown in FIG. 5, the difference of the tank internal pressure between the light fuel and the heavy fuel increases with the fuel temperature. Specifically, the rate of increase of the tank internal pressure before the fuel reaches a predetermined temperature is larger, the lighter the fuel (the easier the vaporization). According to this embodiment, therefore, the vaporization tendency of the fuel is determined by measuring the increase of the tank internal pressure ($\Delta FP$ in FIG. 5) while the fuel temperature increases by a predetermined value ($\Delta F$ in FIG. 5).

Figure 6A:
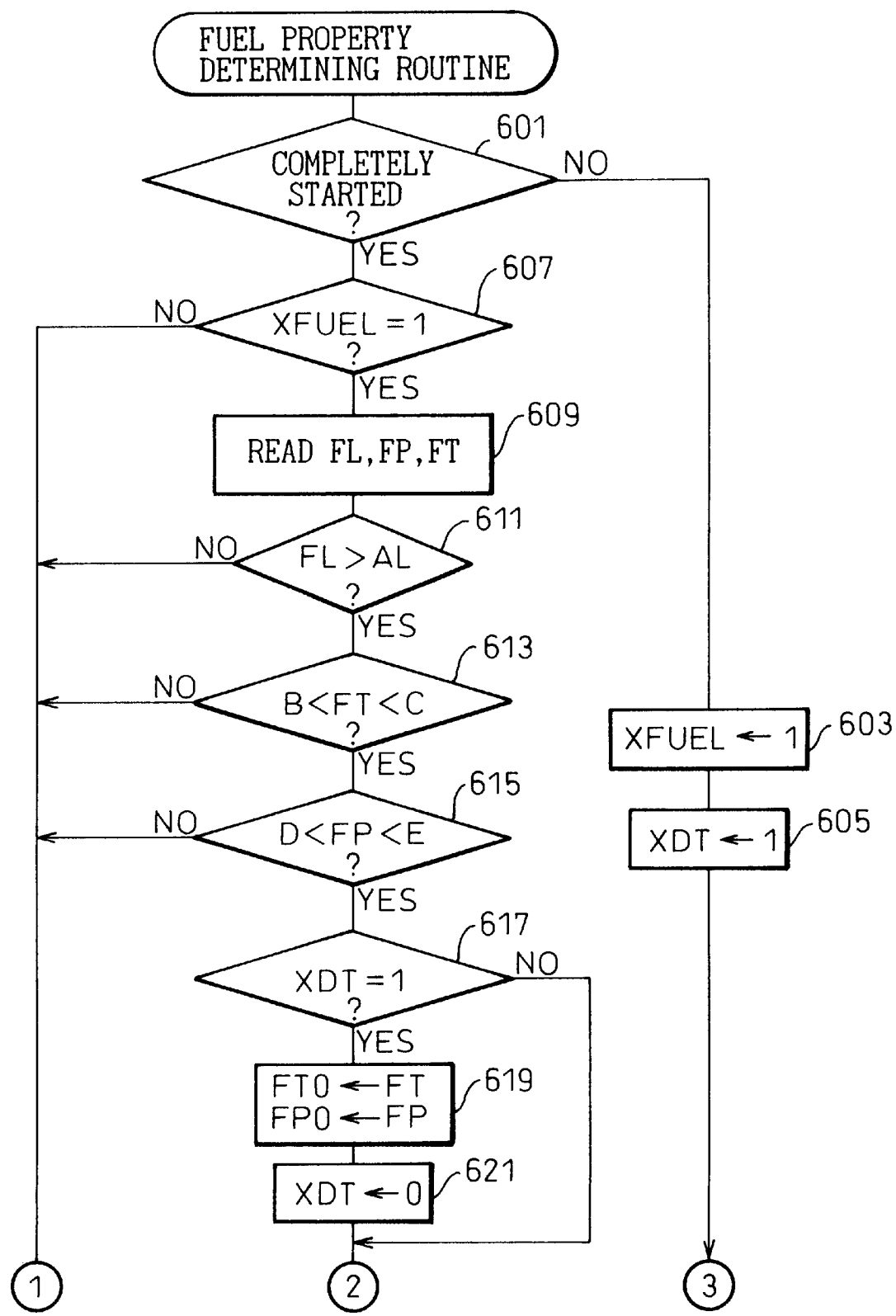
FIGS. 6A and 6B are flowcharts showing an example of steps for determining the property of the fuel according to the present invention.
Figure 6B:
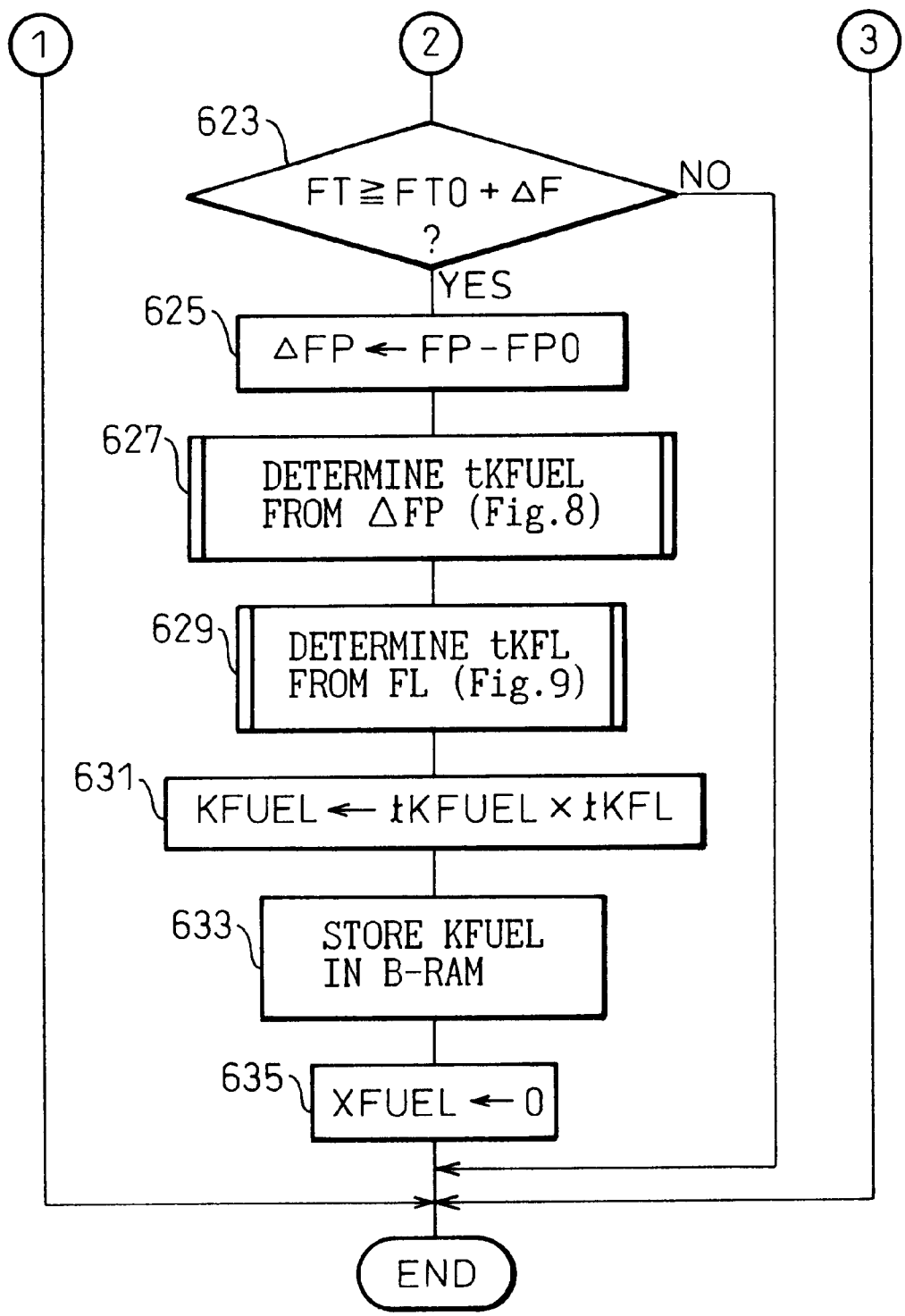

FIGS. 6A and 6B are flowcharts for explaining an example routine for determining the fuel property. This routine is executed at regular time intervals by the ECU 21.

In this routine, the fuel property is determined each time the engine starts.

In FIG. 6A, when the routine starts, step 601 determines whether the engine has been completely started or not. In the case where the engine has not been completely started (in the case where the engine is in the process of starting operation), the flags XFUEL and XDT are set to the initial value of 1 in steps 603 and 605, respectively. Whether the engine has been completely started or not is determined according to whether the engine speed has increased beyond a predetermined value (say, 400 RPM) or not. The flag XFUEL is for determining the engine fuel property only once each time the engine starts, and the value of the flag XFUEL is set to zero in step 633 (FIG. 6B) after determining the fuel property. The flag XDT, on the other hand, is for storing the fuel temperature FT0 and the tank internal pressure FP0 at the time of starting measurement. The value of XDT is set to zero in step 621 after storing FT0 and FP0.

In the case where the engine is completely started in step 601, the process proceeds to step 607 for determining whether the value of the flag XFUEL is set to 1 or not. In the case where XFUEL is L≠1 (i.e. in the case where the fuel property is already determined), the routine is terminated immediately without executing step 607 and subsequent steps.

In the case where XFUEL is 1 in step 607, on the other hand, the process proceeds to step 609 for reading the residual fuel amount FL in the fuel tank, the internal pressure FP of the fuel tank and the fuel temperature FT. Based on these values, steps 611 to 615 determine whether the prerequisites for determining the fuel property have been established or not.

The prerequisites determined in steps 611 to 615 are that (1) the residual fuel amount FL in the tank is larger than a minimum value (AL), (2) the fuel temperature in the tank FT is within a predetermined temperature range (B<FT<C), and (3) the tank internal pressure FP is within a predetermined pressure range (D<FP<E). In the case where any one of the prerequisites (1) to (3) above fails to be established, the routine is terminated immediately without determining the fuel property.

The prerequisites (1) to (3) are required to be met at the time of determining the fuel property because, according to this embodiment, the fuel property is determined from the increase of temperature and pressure in the fuel tank and therefore the measurement is necessary in a range where both the temperature increase and the pressure increases are stable. Specifically, the prerequisite (1) is required to be met because in the case where the residual fuel amount in the tank is not more than a predetermined minimum value, the tank internal pressure increases to a lesser degree often causing a measurement error. The prerequisite (2) is required to be met, on the other hand, in view of the fact that measurement is conducted in a range where the rate of increase of the tank internal pressure is larger by a certain degree than the rate of temperature increase (FIG. 5). Also, the prerequisite (3) must be met because the fuel tank normally includes a pressure control valve for controlling the tank internal pressure in a predetermined range, and therefore the measurement is necessary within a pressure range in which the pressure control valve is not activated.

Once all the conditions of steps 611 to 615 are met, the tank internal pressure FP and the fuel temperature FT as of the meeting of the conditions are stored as the pressure FP0 and the temperature FT0 at the time of measurement start in steps 617 to 621. Steps 617 and 621 are provided for executing step 619 only once.

Then, the routine proceeds to step 623 in FIG. 6B.

Step 623 in FIG. 6B determines whether the current fuel temperature FT has increased by a predetermined temperature width $\Delta F$ from the temperature FTO (step 619) at the time of starting measurement. In the case where the temperature increase is smaller than $\Delta F$, step 625 and subsequent steps are not executed and the routine is terminated. In the case where the fuel temperature has increased by $\Delta F$ from the time the measurement is started, on the other hand, the pressure increase $\Delta FP$ (=FP−FP0) in the fuel tank from the start of measurement is calculated in step 625. In step 627, the basic learning value tKFUEL of the fuel property is determined based on $\Delta FP$ calculated in step 625.

Figure 7:
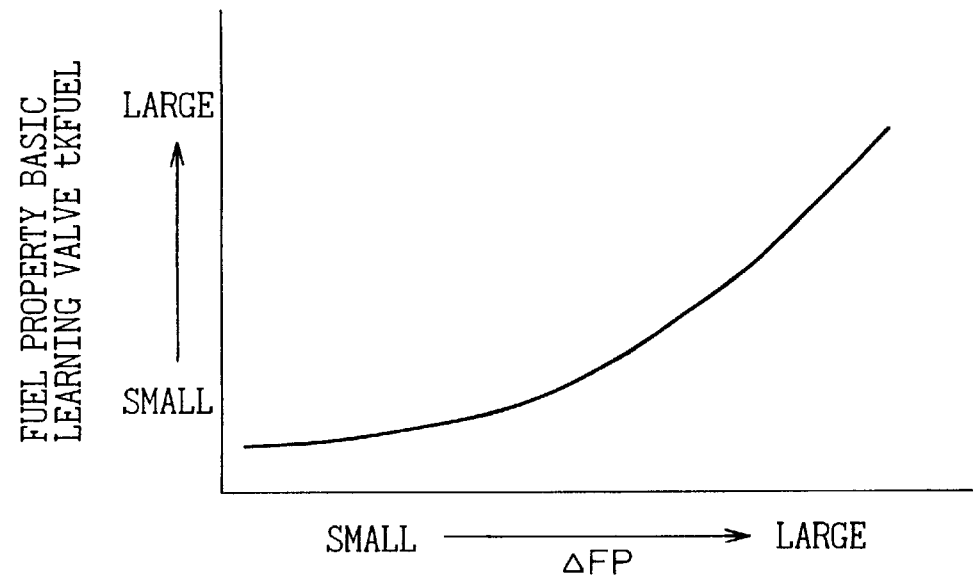
FIG. 7 is a graph showing the relation between the basic learning value of the fuel property and the change in tank internal pressure.

FIG. 7 is a diagram showing the relation between $\Delta FP$ and tKFUEL. As shown in FIG. 7, according to this embodiment, the larger the value of $\Delta FP$, the larger the value to which tKFUEL is set. As described with reference to FIG. 5, the increase of the tank internal pressure ($\Delta FP$) with respect to a predetermined temperature increase width ($\Delta F$) is larger, the larger the fuel volatility (vaporization tendency), i.e. the lighter the fuel. Therefore, according to this embodiment, the basic learning value tKFUEL of the fuel property is set to a larger value, the lighter the fuel.

Steps 629 and 631 are for correcting the basic learning value tKFUEL of the fuel property determined in step 627 in accordance with the residual fuel amount in the tank.

When the residual fuel amount in the tank is small (i.e. when the volume of the space above the fuel level in the tank), the tank internal pressure increases to a small degree relative to the fuel temperature increase. Consequently, the smaller the current residual fuel amount in the tank, the value tKFUEL determined in step 627 is considered smaller than the true value thereof. In view of this, according to this embodiment, the residual fuel amount correction coefficient tKFL is determined in accordance with the residual fuel amount FL read in step 609 (step 629), and thus the true fuel property learning value KFUEL is calculated as KFUEL= tKFUEL×tKFL.

Figure 8:
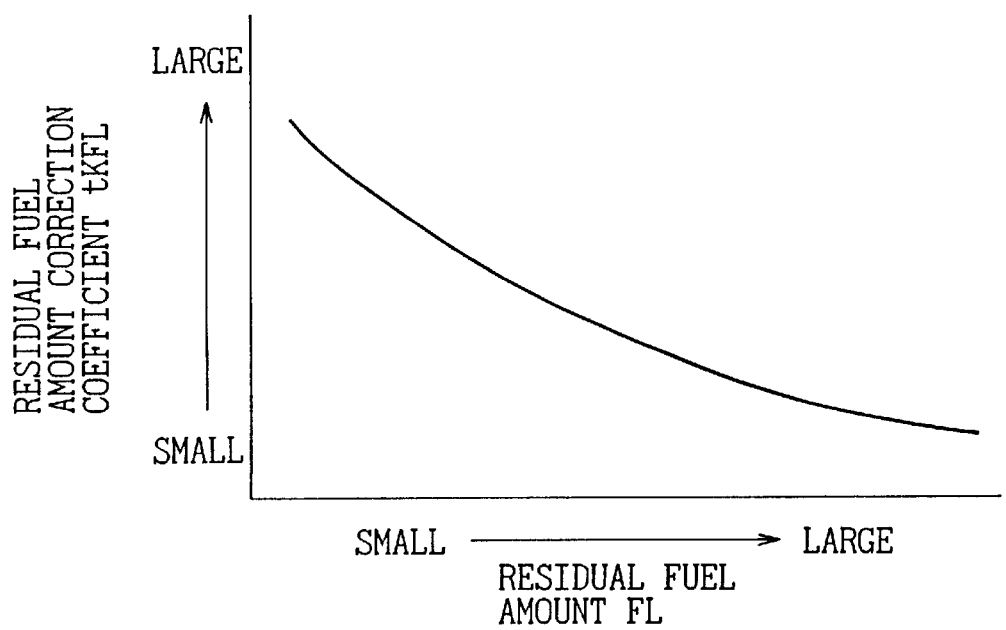
FIG. 8 is a graph showing the correction of the fuel learning correction coefficient based on the residual fuel amount.

FIG. 8 is a diagram showing the relation between the residual fuel amount correction coefficient tKFL and the residual fuel amount FL. As shown in FIG. 8, the value tKFL is set to a larger value, the smaller the value of the residual fuel amount FL.

After calculating the fuel property learning value KFUEL in the aforementioned manner, the value KFUEL thus calculated is stored in the backup RAM 37 of the ECU 21 in step 633, and after setting the flag XFUEL to zero in step 635, the routine is terminated. As described above, once the value of flag XFUEL is set to zero, the fuel property is not determined subsequently (steps 609 to 633)

The relation shown in FIGS. 7 and 8 used for calculating the fuel property learning value KFUEL is determined in advance by an experiment or the like based on the actual fuel tank and the fuel property, and stored in the ROM 32 of the ECU 21.

Now, an explanation will be given of another method of detecting the property of the fuel 18 in the fuel tank 17. In this method, the property of the fuel 18 is detected by use of a vapor flow rate sensor 47 described with reference to FIG. 1A. An example of this detection will be explained with reference to the flowchart of FIG. 9A.

Figure 9A:
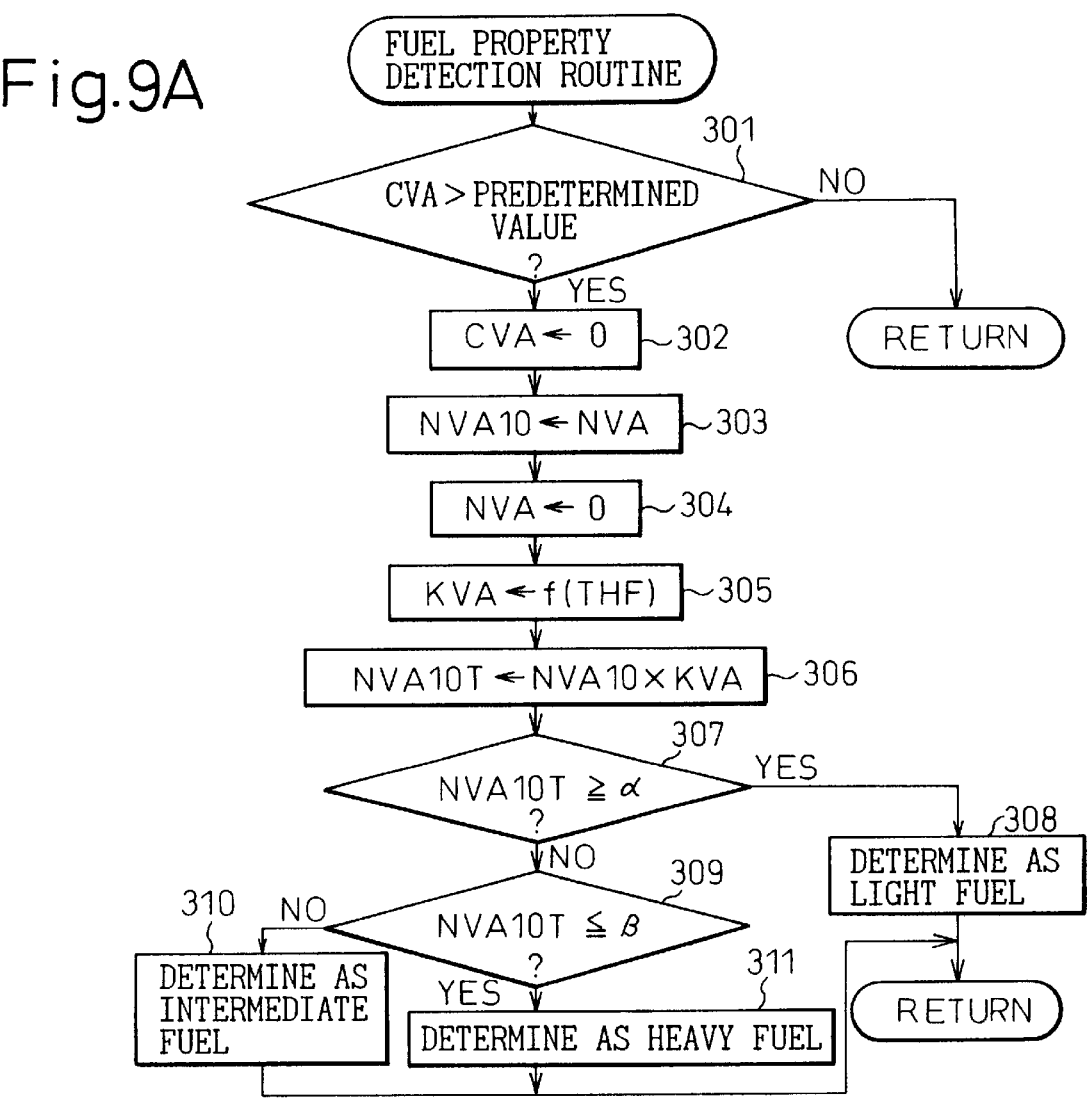
FIG. 9A is a flowchart showing another example of steps for determining the fuel property according to the invention.

FIG. 9A shows the steps of calculating the fuel property determination coefficient NVAT10T and constitutes a part of the main routine. In step 301, it is determined whether the flowmeter measurement time CVA is counted up by a 4-ms routine not shown and has reached a predetermined value such as ten seconds or more, for example. In the case where the figure is not longer than ten seconds, the routine is terminated. When ten seconds has passed, on the other hand, the process proceeds to step 302. In step 302, the measurement time CVA of the flowmeter is reset to zero. Thus, steps 302 to 306 are executed at the rate of once every ten seconds.

The ECU 21 also includes a vapor flow rate counter counted up by an external interrupt routine activated only when the detection signal of the vapor flow rate sensor 47 described above changes from low to high voltage, i.e. each time the rotative unit 46 of FIG. 1A makes one rotation. The count value NVA of the vapor amount counter is set to a variable NVA10 in step 303 following step 302. This count value NVA of the vapor amount counter is reset to zero in the next step 304. Therefore, the value of the variable NVA10 indicates the rotational speed of the rotative unit 46 of the vapor flowmeter 44 for each ten seconds, which is a value proportional to the vapor flow rate.

In the next step 305, the temperature of the fuel 18 is detected by the fuel temperature sensor 42. Based on the fuel temperature detection signal THF thus obtained, the fuel temperature correction coefficient KVA is calculated using the function f(THF). Specifically, the distilling characteristic being the same, a given fuel generates less vapor at low temperature than at high temperature. As a result, in order to correct the difference in the amount of generated vapor for different fuel temperature, the fuel temperature correction coefficient KVA is set to a larger value, the lower the fuel temperature.

Figure 9B:
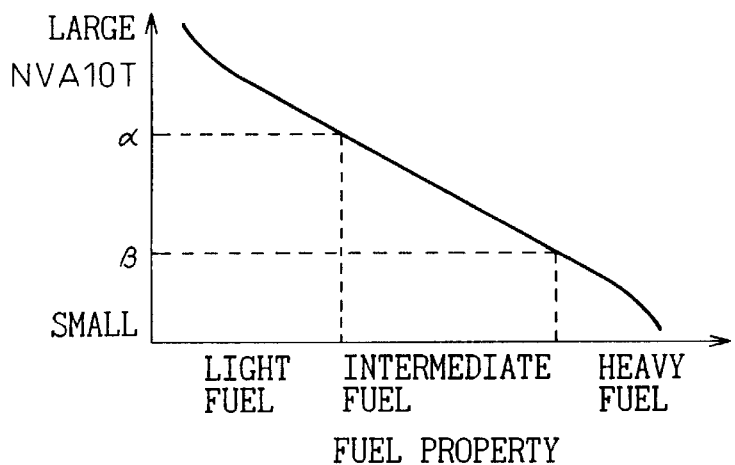
FIG. 9B is a characteristic diagram showing the relation between the fuel property and the fuel property determination coefficient obtained in FIG. 9A.

In next step 306, the fuel property correction coefficient NVA10T is determined from the formula NVA10×KVA. Specifically, the fuel property correction coefficient NVA10T is a value obtained by correcting the vapor flow rate for each ten seconds by the fuel temperature correction coefficient. When this value is large, a light fuel having few components of high boiling points (many components of low boiling points) is indicated, while when this value is small a heavy fuel having many components of high boiling points (few components of low boiling points) is indicated. The relation between the magnitude of the fuel property correction coefficient NVA10T and the fuel property is illustrated in FIG. 9B.

In step 307, it is determined whether the magnitude of the fuel property correction coefficient NVA10T is not less than a predetermined value $\alpha$, and in the case where NVA10T$\geq\alpha$, the process proceeds to step 308, where the fuel is determined as a light fuel and the routine is terminated. In the case where NVA10T<$\alpha$ in step 307, on the other hand, the process proceeds to step 309 for determining whether the magnitude of the fuel property correction coefficient NVA10T is not more than a predetermined value B smaller than the predetermined value $\alpha$. In the case where NVA10T$\leq\beta$ in step 309, the process proceeds to step 311 for determining the fuel as a heavy fuel and thus terminating the routine. In the case where NVA10T>$\beta$ in step 309, on the other hand, the process proceeds to step 311 for determining the fuel as an intermediate fuel and the routine is terminated.

For the engine carrying a variable valve timing mechanism of continuous variable type, the fuel property is determined at the time of cold engine start when the variable valve timing mechanism is not activated, and the fuel property detected is held in the RAM 53 or the backup RAM 54. Since the unit measurement time of the vapor flow rate is set to 10 seconds in this embodiment, the fuel property can be detected at any time even when the vehicle is running. Even in the case where the vehicle refills the gasoline midway of the travel and is supplied with a different property of fuel, the change in the fuel property can be detected.

Figure 10:
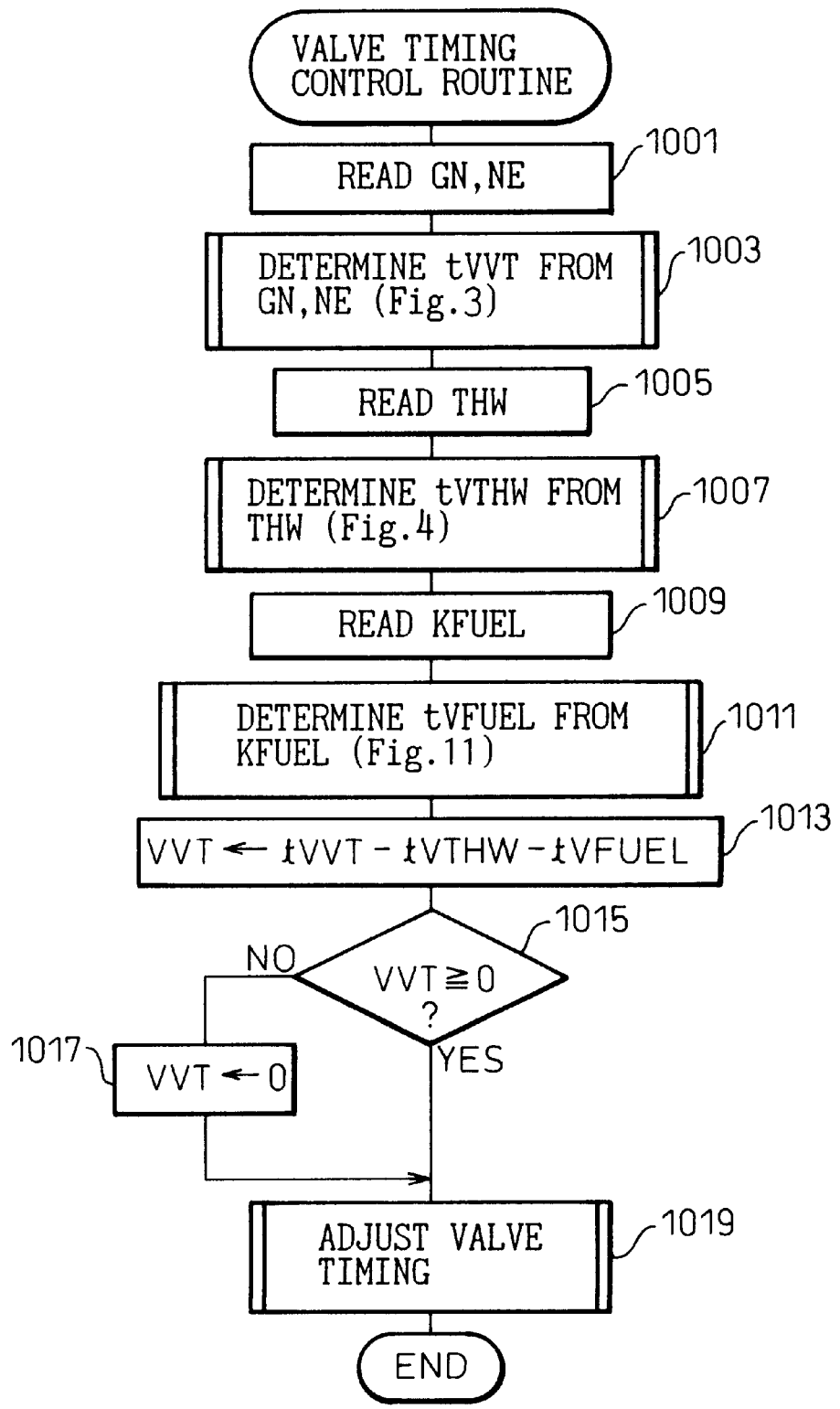
FIG. 10 is a flowchart showing the steps of controlling the valve timing according to a first embodiment of the invention.

Now, an explanation will be given of the first embodiment of the valve timing control using the fuel property learning value KFUEL described above. FIG. 10 is a flowchart showing the valve timing control routine according to this embodiment. In this routine, the valve timing is set according to the engine operating conditions. At the same time, as described above, the setting of the valve timing is corrected based on the engine cooling water temperature and the fuel property. This routine is executed at regular time intervals by the ECU 21.

When the routine starts in FIG. 10, the intake air weight flow rate GN per engine rotation and the engine speed NE are read in step 1001. Then, in step 1003, the basic valve timing amount tVVT is read from the relation of FIG. 3 using the values GN and NE. The relation of FIG. 3 is stored beforehand in the ROM 32 of the ECU 21 as a numerical map using GN and NE.

After calculating the basic valve timing tVVT, the current cooling water temperature THW is read in step 1005. In step 1007, the temperature correction amount tVTHW is determined using the relation of FIG. 4 from the cooling water temperature THW. The relation of FIG. 4 is also stored in the ROM 32 of the ECU 21 in the form of numerical map using the THW value in advance.

Figure 11:
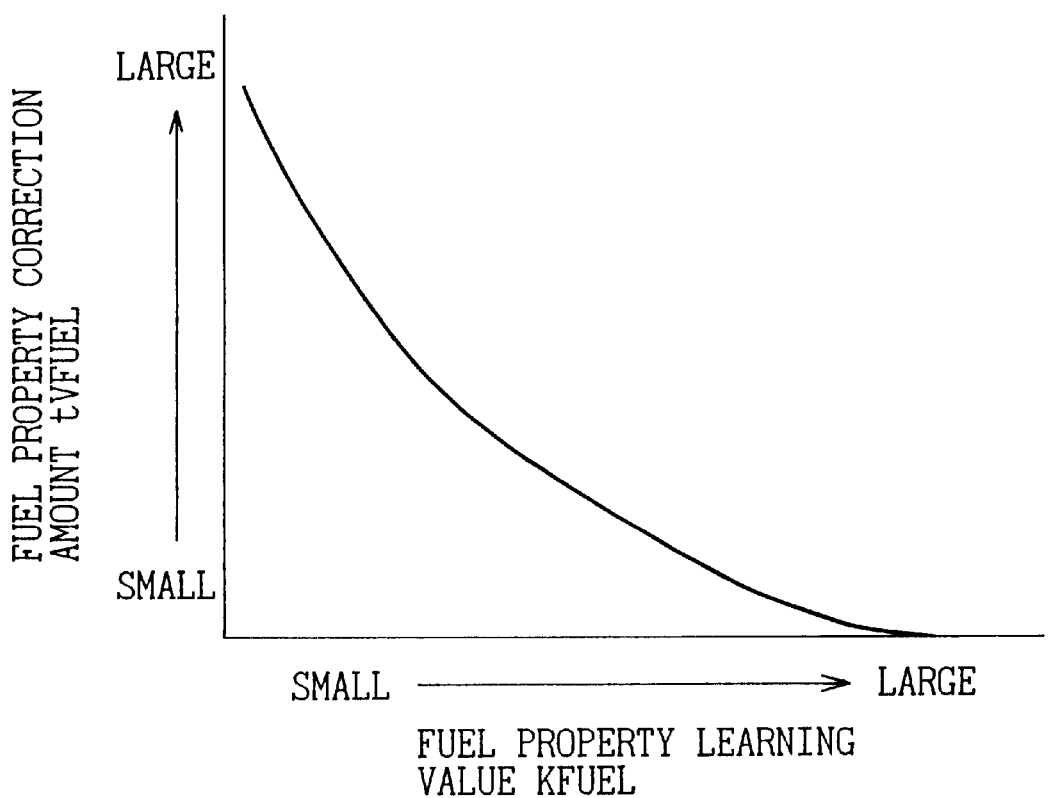
FIG. 11 is a graph showing the setting of the fuel property correction amount.

Then, in step 1009, the fuel property learning value KFUEL calculated by the routine of FIGS. 6A and 6B is read from the backup RAM 37. In step 1011, the fuel property correction amount tVFUEL is determined based on the value KFUEL. FIG. 11 is a graph showing the relation between the fuel property learning value KFUEL and the fuel property correction amount tVFUEL. As shown in FIG. 11, according to this embodiment, the value of the fuel property correction amount tVFUEL is set to a smaller value, the larger the value of the learning value KFUEL, i.e. the lighter the fuel.

In step 1013, the basic valve timing tVVT is corrected using the temperature correction amount tVTHW determined as described above and the fuel property correction amount tVFUEL, and the setting VVT of the valve timing is calculated as VVT=tVVT−tVTHW−tVFUEL.

Then, in steps 1015 and 1017, in the case where the valve timing setting VVT corrected in step 1011 assumes a negative value, VVT is reset to zero, thus limiting the valve timing setting VVT always as VVT≧0.

In step 1019, the linear solenoid valve 25 is controlled in such a manner that the actual valve timing VT detected by the camshaft rotational angle sensor 45 coincides with the setting VVT, and the routine is terminated. This control is PDI (proportional differential and integral) control based on the difference between VVT and VT, for example.

As a result of the above-mentioned correction, the valve timing is set to a smaller value, the lower the engine temperature, the other conditions being the same. Thus, the lower the engine temperature, the smaller the valve overlap amount. Also, the valve timing VT is corrected by the property of the fuel used, and the other conditions being the same, the valve timing VT is corrected to a larger value and the valve overlap amount assumes a larger value, the lighter the fuel used. As a result, even when the engine temperature is low, if a light fuel is used, the valve overlap amount can be set to a larger value than when a heavy fuel is used. This prevents the engine output from unnecessarily decreasing when the engine temperature is low.

Now, the valve timing control according to another embodiment of the invention will be explained.

According to the first embodiment, the valve timing is corrected in accordance with the fuel property, and thus the reduction in engine output is prevented by increasing the valve overlap amount when using a light fuel and thus when not necessary to set the valve overlap amount to a small value at low engine temperatures. In this embodiment, in contrast, the valve overlap amount is corrected in accordance with the operating speed of the valve timing control device 10 instead of the fuel property.

As described above, generally, the operating speed of the valve timing control device is reduced when the engine temperature is low, due to the increased viscosity of the working oil of the valve timing control unit, the increased friction of various operating units, etc. In the case where the engine load undergoes a change and the valve timing control target value (optimum valve timing value) is reduced, therefore, it takes considerable time for the actual valve timing to reach a control target value, with the result that the actual valve timing value temporarily remains larger than the optimum valve timing value.

In such a case, the valve overlap amount assumes a value larger than the optimum value. In the case where the actual valve overlap amount is very large as compared with the optimum value, an engine misfire may occur. In view of this, even in the case where the operating speed of the valve timing control device decreases when the engine temperature is low, it is general practice to set the valve overlap amount to a very small value at low engine temperatures so as not to increase the actual valve overlap amount excessively as compared with the optimum value. Specifically, the valve overlap amount at low engine temperatures is normally set after taking into account the considerable reduction in the operating speed of the valve timing control device.

Actually, however, the operating speed of the valve timing control device is not always reduced when the engine temperature is low. In the case where the working oil low in viscosity at low temperatures is used, for example, the operating speed of the valve timing control device is not reduced so much even when the engine temperature is low. Also, since the clearance varies from one part to another of a mechanism within a tolerable range, some products have a large clearance between component parts with a small friction at low temperatures. In such products, therefore, the operating speed is not reduced so much even when the engine temperature is low. In such a case, no misfire occurs even when the valve overlap amount for low temperatures is set to a comparatively large value. If the valve overlap amount at low engine temperatures is set to the same small value in all cases, therefore, the engine output is unnecessarily reduced in the case where the operating speed is not reduced so much at low temperatures.

According to this invention, the operating speed of the valve timing control device 10 is actually detected while the engine is running and, in accordance with the operating speed thus detected, the setting of the valve timing is corrected.

Figure 12:
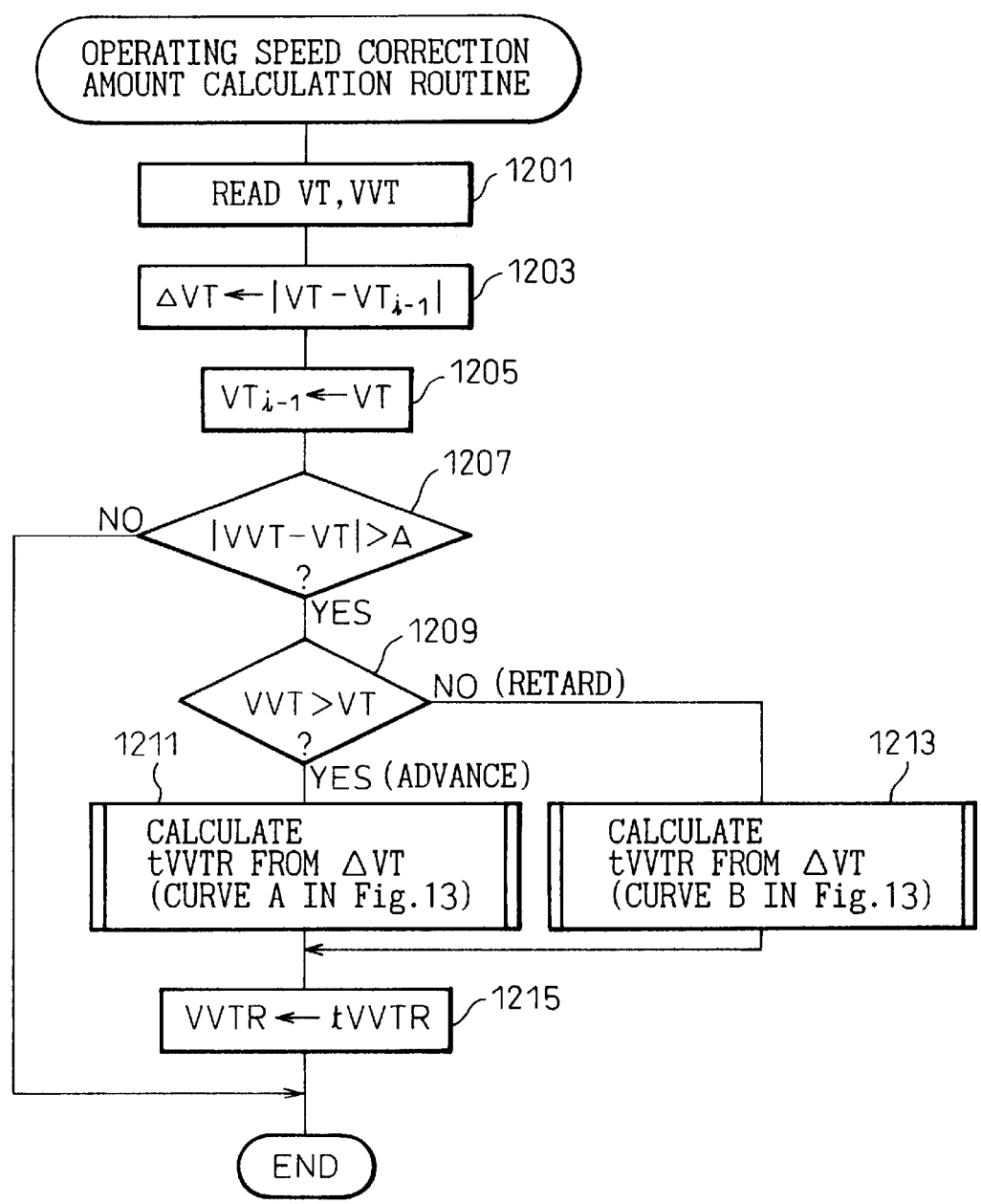
FIG. 12 is a flowchart showing the routine for calculating the correction amount based on the operating speed of the valve timing control device according to an embodiment.

FIG. 12 is a flowchart showing the correction amount calculation routine for detecting the operating speed of the valve timing control device and calculating the operating speed correction amount tVVTR of the valve timing in accordance with the operating speed. This routine is executed at regular time intervals (say, about 100 ms) by the ECU 21.

In FIG. 12, when the routine starts, the current valve timing value VT and the valve timing setting (control target value) VVT calculated by the valve timing control routine described later are read in step 1201. In step 1203, the change amount ΔVT of the valve timing value VT from the time of the preceding routine execution is calculated as ΔVT=|VT−VTi−1|. VTi−1 is a valve timing value at the time of the preceding execution of the routine. This routine is executed at regular time intervals, and therefore the change amount ΔVT represents the current actual operating speed of the valve timing control device. In step 1205, the value VTi−1 is updated in preparation for the next routine execution.

Then, in step 1207, it is determined whether the difference |VVT−VT| between the valve timing control target value VVT and the current valve timing value VT is larger than a predetermined value A. Only in the case where |VVT−VT|>A are steps 1209 to 1215 executed for calculating the operating speed correction amount. The reason why the operating speed correction amount is calculated only when the difference |VVT−VT| is larger than the predetermined value A is to employ, as the operating speed, the valve timing change amount ΔVT measured when the difference between the control target value VVT and the actual valve timing VT is somewhat large and the operating speed of the valve timing control device 10 has sufficiently increased. Specifically, when the difference between the control target value and the actual valve timing value is somewhat large, the operating speed of the valve timing control device increases and the fluctuations of the operating speed are reduced. By calculating the correction amount of the operating speed based on the change amount ΔVT measured under this condition, a highly reliable correction of the operation speed is made possible.

In the case where the difference |VVT−VT| is larger than a predetermined value A in step 1207, step 1209 determines whether the control target value VVT is larger or not than the actual valve timing value VT, i.e. whether the valve timing control device is currently advancing (increasing) or retarding (decreasing) the valve timing. In the case where the valve timing is being advanced (VVT>VT), the process proceeds to step 1211 and, using the valve timing change amount (change speed) ΔVT calculated in step 1203, the operating speed correction coefficient tVVTR is determined from the relation shown by curve A in FIG. 13. In the case where the valve timing is being retarded (VVT≦VT), on the other hand, the process proceeds to step 1213, where the operating speed correction coefficient tVVTR is determined from the relation shown by curve B of FIG. 13 similarly using ΔVT. In step 1215, the operating speed correction coefficient tVVTR determined in step 1211 or 1213 is stored as the operating speed correction amount VVTR actually to be used. Thus, the routine is terminated.

Figure 13:
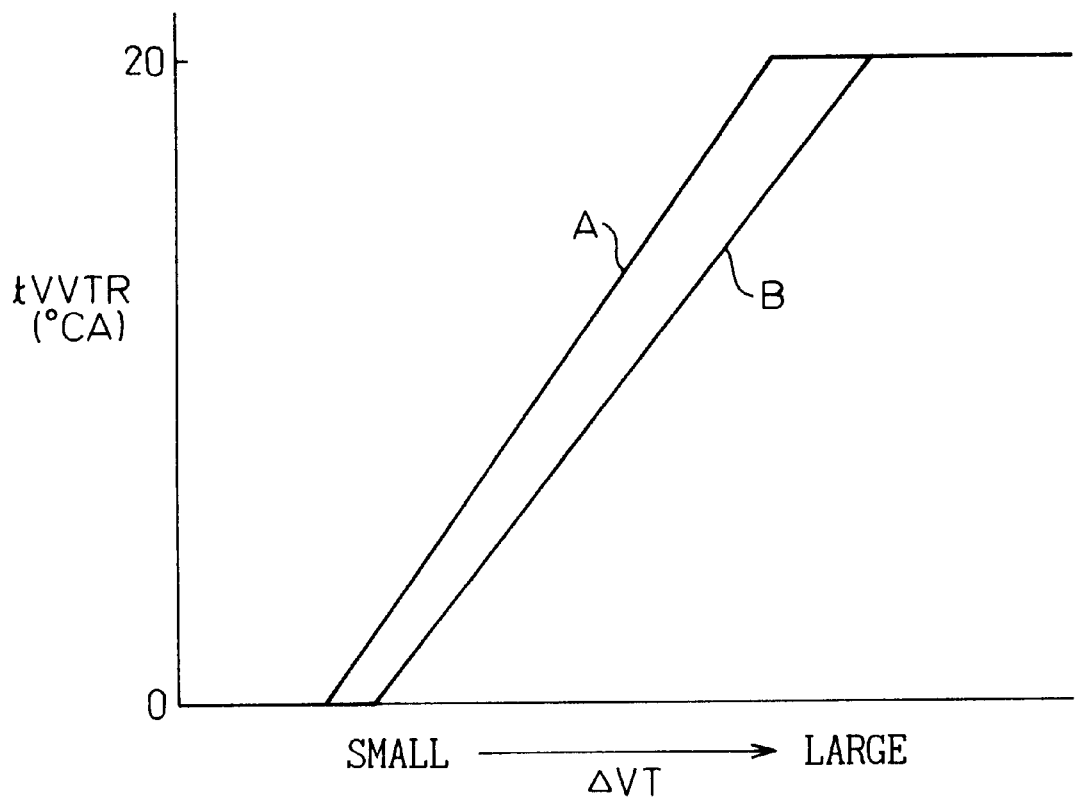
FIG. 13 is a graph showing the setting of the operating speed correction amount.

FIG. 13 is a diagram showing the relation between the operating speed correction coefficient tVVTR and the operating speed ΔVT of the valve timing control device. Normally, the valve timing control device is subjected to the reaction force toward the advancing or the retarding side from the camshaft. The other conditions being the same, therefore, the operating speed ΔVT is different between the ongoing advance operation and the ongoing retard operation. According to this embodiment, two curves of the ongoing advance operation (curve A) and the ongoing retard operation (curve B) are prepared in such a manner as to produce the same operating speed correction coefficient tVVTR regardless of whether the advance or retard operation is being performed, and these two curves are selected in accordance to whether the measurement ΔVT is associated with the advance or retard operation. FIG. 13 shows the case in which the valve timing control device is subjected to the reaction force in the valve timing retard direction from the camshaft (the case in which the operating speed for retard operation is higher than the operating speed for advance operation)

Figure 14:
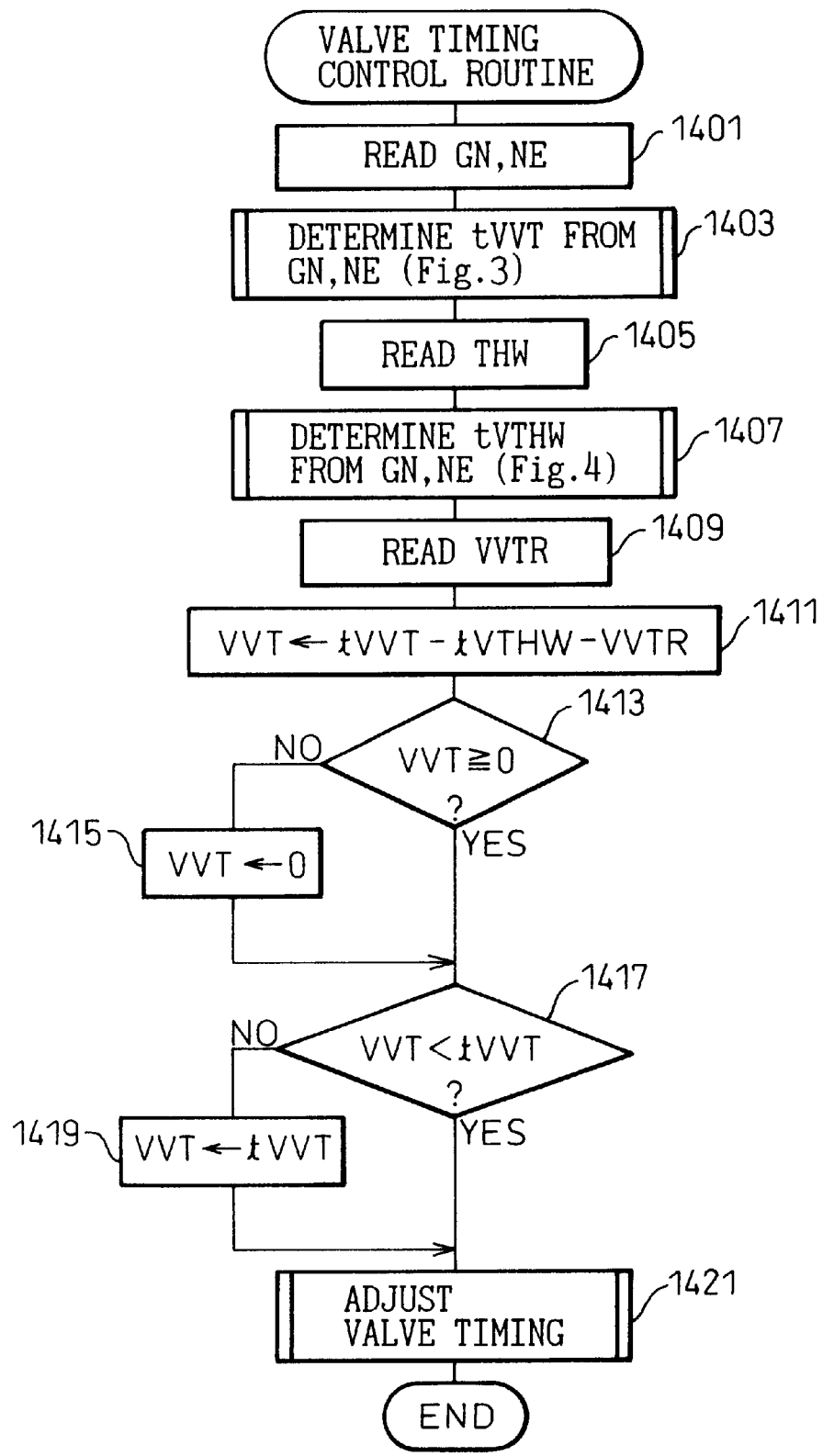
FIG. 14 is a flowchart showing the steps of controlling the valve timing according to a second embodiment of the invention.

FIG. 14 is a flowchart showing the routine according to the second embodiment for valve timing control in which the correction is effected according to the operating speed of the valve timing control device using the operating speed correction amount VVTR described above. This routine is executed at regular time intervals by the ECU 21.

In FIG. 14, when the routine starts, steps 1401 to 1407 set the basic valve timing tVVT based on GN and NE and determine the temperature correction amount tVTHW based on the engine temperature. Steps 1401 to 1407 are the same as steps 1001 to 1007, respectively, and therefore will not be described.

Upon completion of step 1407, the routine corrects the valve timing based on the operating speed of the valve timing control device in step 1409 and subsequent steps. Specifically, in step 1409, the operating speed correction amount VVTR calculated in the routine of FIG. 12 is read, and in step 1411, the basic valve timing tVVT is corrected using the temperature correction amount tVTHW and the operating speed correction amount VVTR calculated in step 1407, and the valve timing setting VVT is determined as VVT=tVVT−tVTHW+VVTR. More specifically, the valve timing is advanced more, the larger the operating speed correction amount VVTR, resulting in an increased valve overlap. As described above, the operating speed correction amount VVTR is set to a larger value, the higher the operating speed of the valve timing control device (FIG. 13). According to this embodiment, therefore, the valve overlap amount is set to a larger value, the larger the operating speed of the valve timing control device even when the engine temperature is low.

After the valve timing VVT is set as described above, steps 1413 to 1419 limit the valve timing setting VVT to a positive value not exceeding the basic valve timing tVVT, and in step 1421, the valve timing control device 10 is controlled based on the VVT after the limitation.

In this embodiment, even when the engine is low in temperature, in the case where the operating speed of the valve timing control device is high and it is not necessary to set the valve overlap amount to a small value, the valve overlap amount is corrected upward in accordance with the operating speed of the valve timing control device. Even when the engine temperature is low, therefore, a reduction of the engine output which is inherently not required is prevented.

Now, an explanation will be given of a method of calculating the correction amount VVTR based on the operating speed of the valve timing control device according to an embodiment different from that of FIG. 12. In the embodiment of FIG. 12, the correction amount VVTR is calculated based on the change rate ΔVT of the valve timing value when the difference is large between the valve timing setting VVT and the actual valve timing value VT. Actually, however, the operating speed of the valve timing control device changes with the engine speed. For example, the rotational speed of the hydraulic pump driven by the engine is reduced when the engine speed is low. As a result, the pressure of the working oil of the valve timing control device decreases and so does the operating speed of the valve timing control device. Conversely, when the engine speed is high, the rotational speed of the hydraulic pump increases and so does the pressure of the working oil. Thus the operating speed of the valve timing control device increases.

In the routine of FIG. 12 shown above, on the other hand, the operating speed correction amount VVTR is calculated only when the difference between the setting VVT and the actual valve timing value VT is large. Therefore, the VVTR is calculated comparatively infrequently. As a result, if the engine speed at the time of calculating the VVTR is different from the engine speed at the time of correcting the valve timing, the actual operating speed of the valve timing control device may fail to correspond to the correction amount VVTR. Specifically, if the valve timing is corrected when the engine speed is high using the VVTR calculated when the engine speed is low, the increase of the valve overlap amount is set to a small value undesirably in spite of the fact that the operating speed of the valve timing control device is actually high (step 1411 in FIG. 14). Conversely, if the correction of step 1411 in FIG. 14 is effected when the engine speed is low using the VVTR calculated when the engine speed is high, the valve overlap amount may be undesirably set to a large value in spite of the fact that the operating speed of the valve timing control device is actually reduced.

According to this embodiment, the difference of the operating speed due to the difference of engine speed is corrected based on the engine speed at the time of calculating the operating speed correction amount VVTR and the engine speed at the time of correcting the valve timing based on VVTR.

Figure 15A:
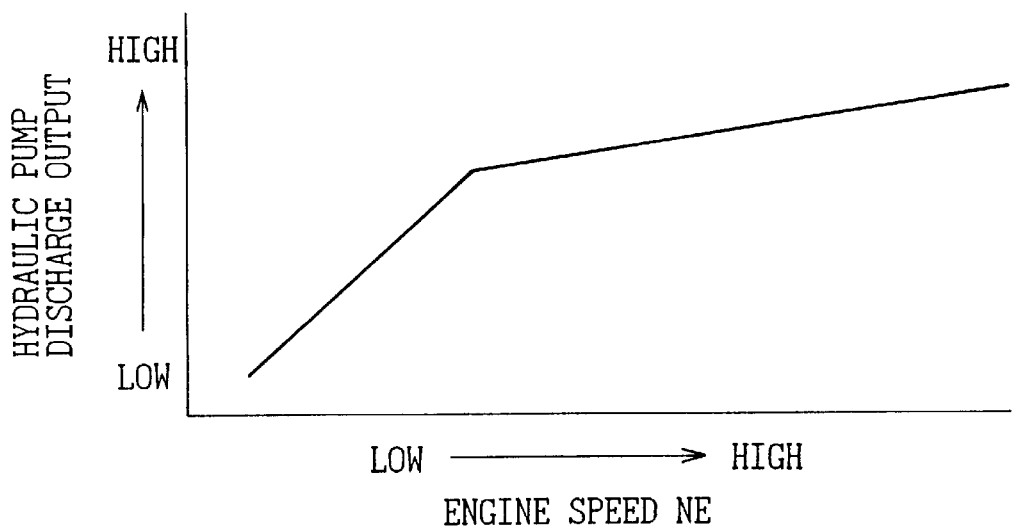
FIG. 15A is a graph showing the change in the discharge output of a hydraulic pump according to the engine speed.
Figure 15B:
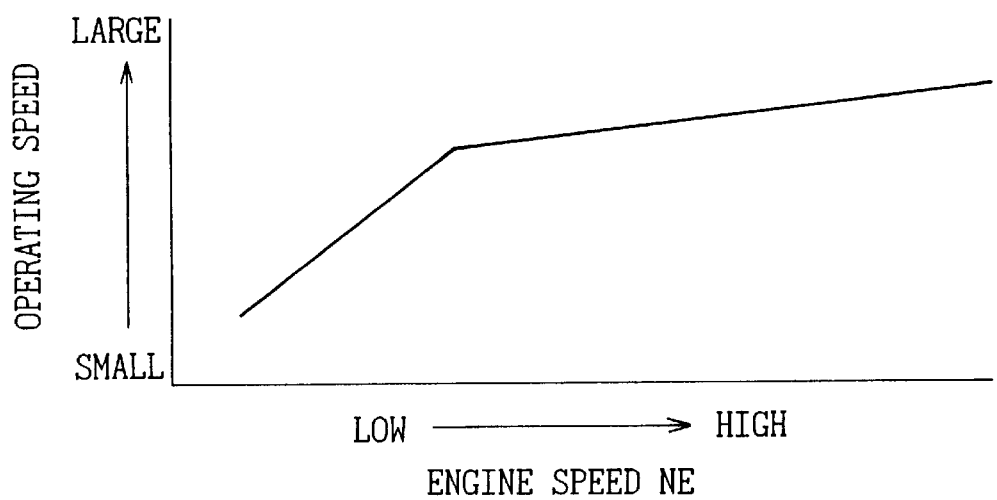
FIG. 15B is a graph for explaining the change in the operating speed of the valve timing control device according to the engine speed.

FIGS. 15A, 15B show an example of the change in the operating speed of the valve timing control device with the engine speed. FIG. 15A shows the change, with the engine speed, of the discharge pressure of the hydraulic pump driven by the engine. As shown in FIG. 15A, the pump discharge pressure increases with the increase in engine speed. Also, FIG. 15B shows the change in the operating speed of the valve timing control device with the change in oil pressure of FIG. 15A. As shown in FIG. 15B, the operating speed of the valve timing control device changes substantially the same way as the discharge pressure of the hydraulic pump.

Figure 16:
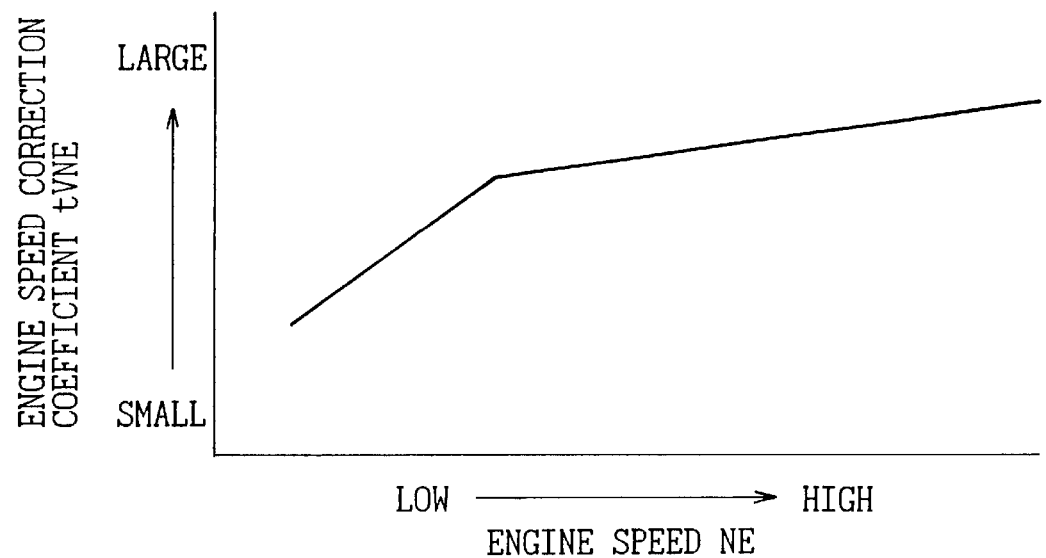
FIG. 16 is a graph showing the relation between the engine speed and the engine speed correction coefficient.

According to this embodiment, the engine speed correction coefficient tVNE determined in accordance with the engine speed based on the characteristic of FIG. 15 is employed to correct the operating speed correction amount VVTR. FIG. 16 is a diagram showing the relation between the engine speed correction coefficient tVNE and the engine speed NE. As shown in FIG. 16, the engine speed correction coefficient tVNE is set to have the same characteristic as in FIG. 15B.

Figure 17:
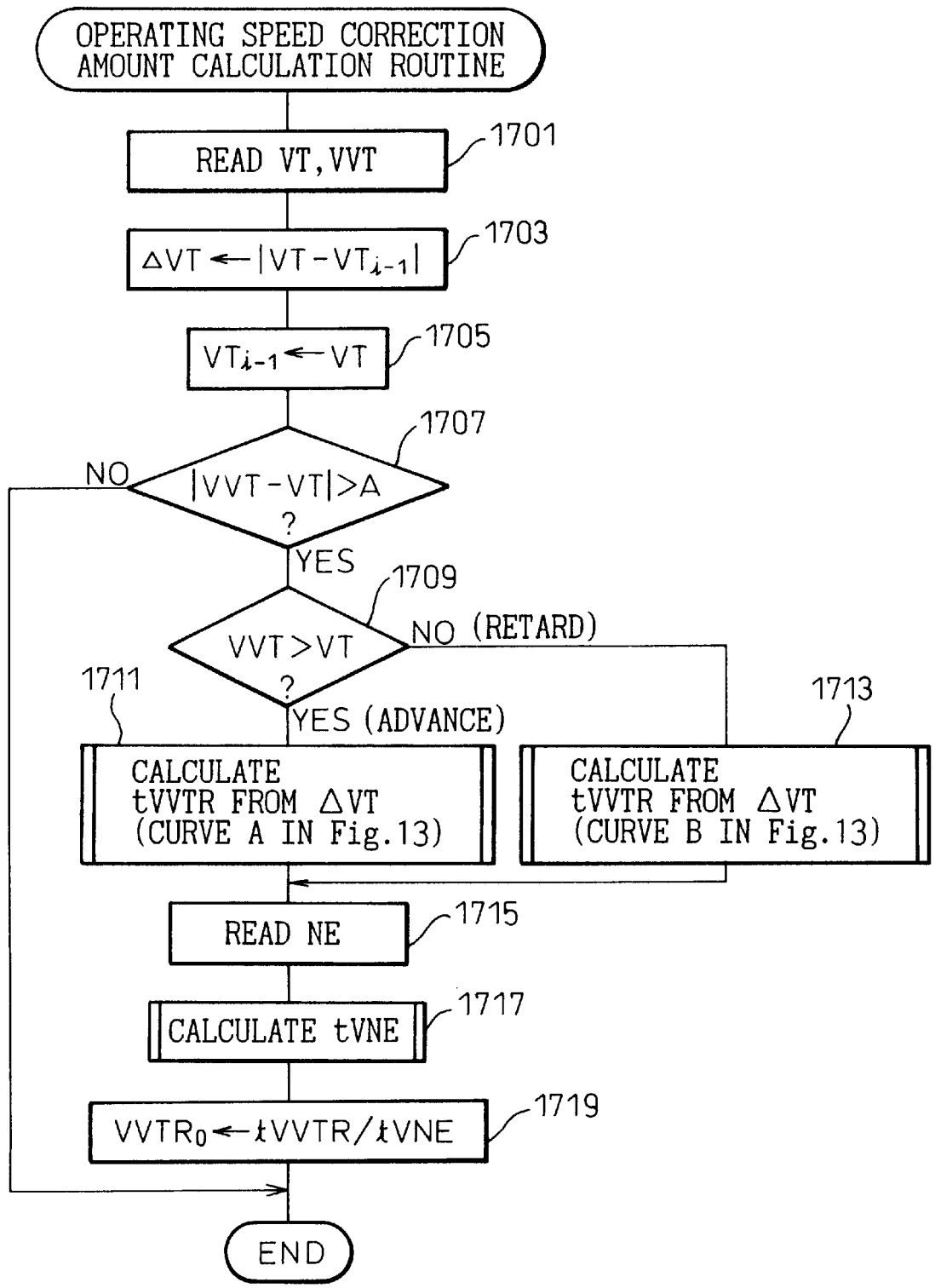
FIG. 17 is a flowchart showing the routine for calculating the operating speed correction amount taking the engine speed into account.

FIG. 17 is a flowchart showing the routine for calculating the operating speed correction amount VVTR using the correction coefficient tVNE. In FIG. 17, steps 1701 to 1713 are for calculating the operating speed correction coefficient tVVTR from the change amount ΔVT of the valve timing value. These steps are identical to steps 1201 to 1213 in FIG. 12, and therefore will not be described. According to this embodiment, after the operating speed correction coefficient tVVTR is calculated as described above, the current engine speed NE is read in step 1715, and the engine speed correction coefficient tVNE is calculated from the relation of FIG. 16 using the engine speed NE in step 1717. In step 1719, tVVTR divided by tVNE is stored as the basic operating speed correction amount VVTR0.

Figure 18:
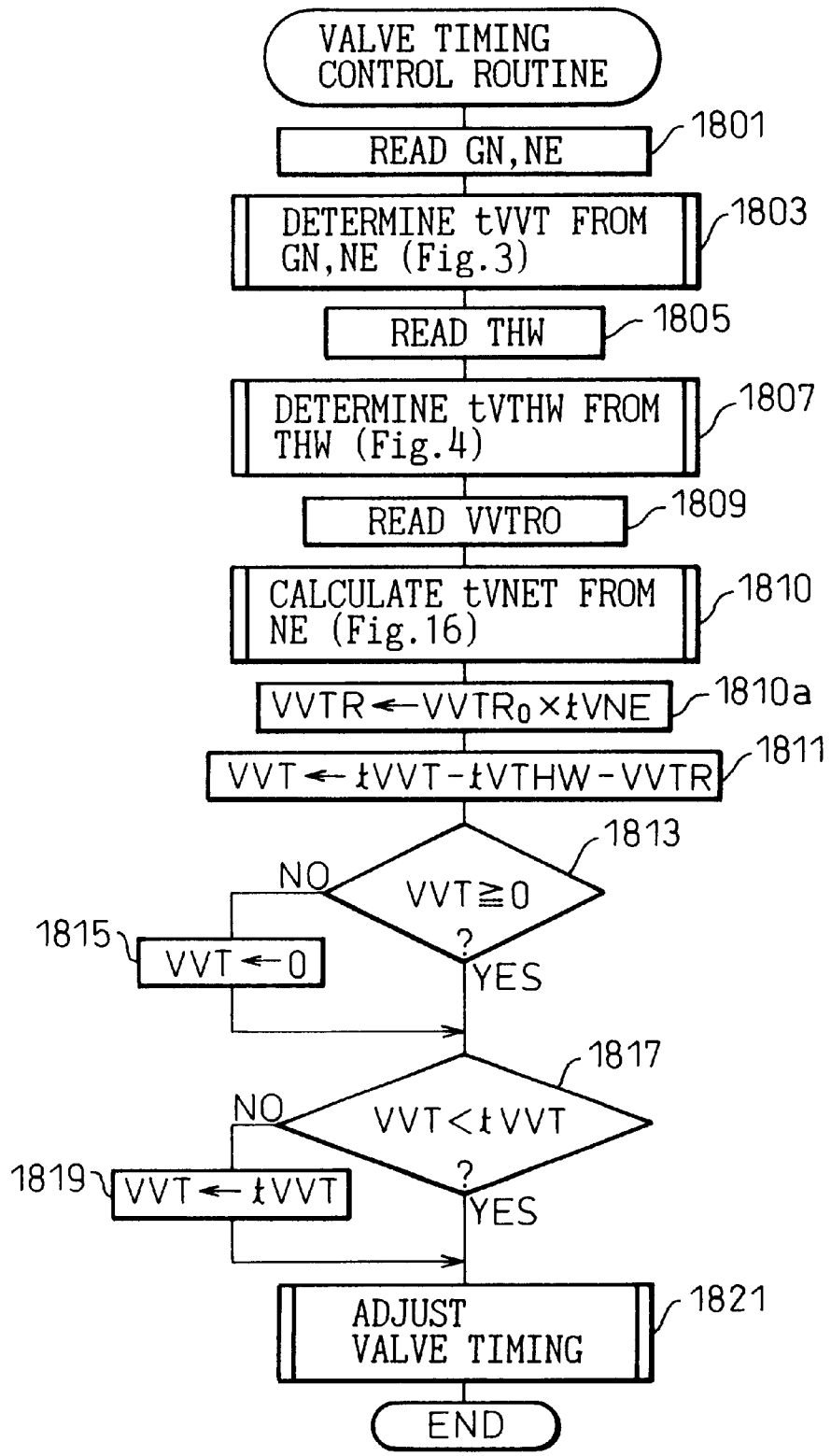
FIG. 18 is a flowchart showing the steps of controlling the valve timing according to a third embodiment of the invention.

FIG. 18 is a flowchart showing the routine according to the third embodiment for valve timing control using the correction amount VVTR0 and the engine speed correction coefficient tVNE stored as described above. The routine of FIG. 18 is different from the routine of FIG. 14 only in that steps 1810 and 1810a are added between steps 1409 and 1411, and steps 1801 to 1809 and steps 1811 to 1821 represent the same process as steps 1401 to 1409 of FIG. 14 and steps 1411 to 1421 of FIG. 14, respectively.

In FIG. 18, the basic operating speed correction amount VVTR0 set in FIG. 17 is read in step 1809, and the engine speed correction coefficient tVNE corresponding to the current engine speed NE is calculated based on FIG. 16 in step 1810. Using the engine speed correction coefficient tVNE based on the current engine speed, the value of the basic correction amount VVTR0 is corrected again. In other words, VVTR0 is multiplied by the correction coefficient tVNE and the product is used as the operating speed correction amount VVTR for effecting the valve timing correction in step 1811 and subsequent steps.

In this way, the correction is effected using the engine speed when calculating the correction amount VVTR0 and correcting the valve timing. Thus, the correction is made possible based on the operating speed of the valve timing control device accurately regardless of the change in engine speed. The value of tVVTR (steps 1711, 1713 in FIG. 17) calculated when the engine is running at high speed, for example, is divided by a comparatively large engine speed correction coefficient tVNE (FIG. 16) during high speed and the resulting value is stored as VVTR0. When correcting the valve timing when the engine is running at low speed (step 1811 in FIG. 18), the product of VVTR0 and the comparatively small correction coefficient tVNE for low engine speed is used for control (step 1810a in FIG. 18). As a result, VVTR used for valve timing correction assumes a comparatively small value and the valve timing correction corresponding to the current engine speed becomes possible.

As described above, according to the third embodiment, the operating speed of the valve timing control device detected as above is corrected in accordance with the engine speed, thus making possible more accurate correction of the valve overlap amount.

Now, an explanation will be given of the advance control of the open timing of the intake value and the retard control of the close timing of the exhaust valve of a variable valve timing mechanism of continuous variable type mounted on the engine capable of determining the fuel property by the steps of FIG. 9A according to an embodiment of the invention.

Figure 19A:
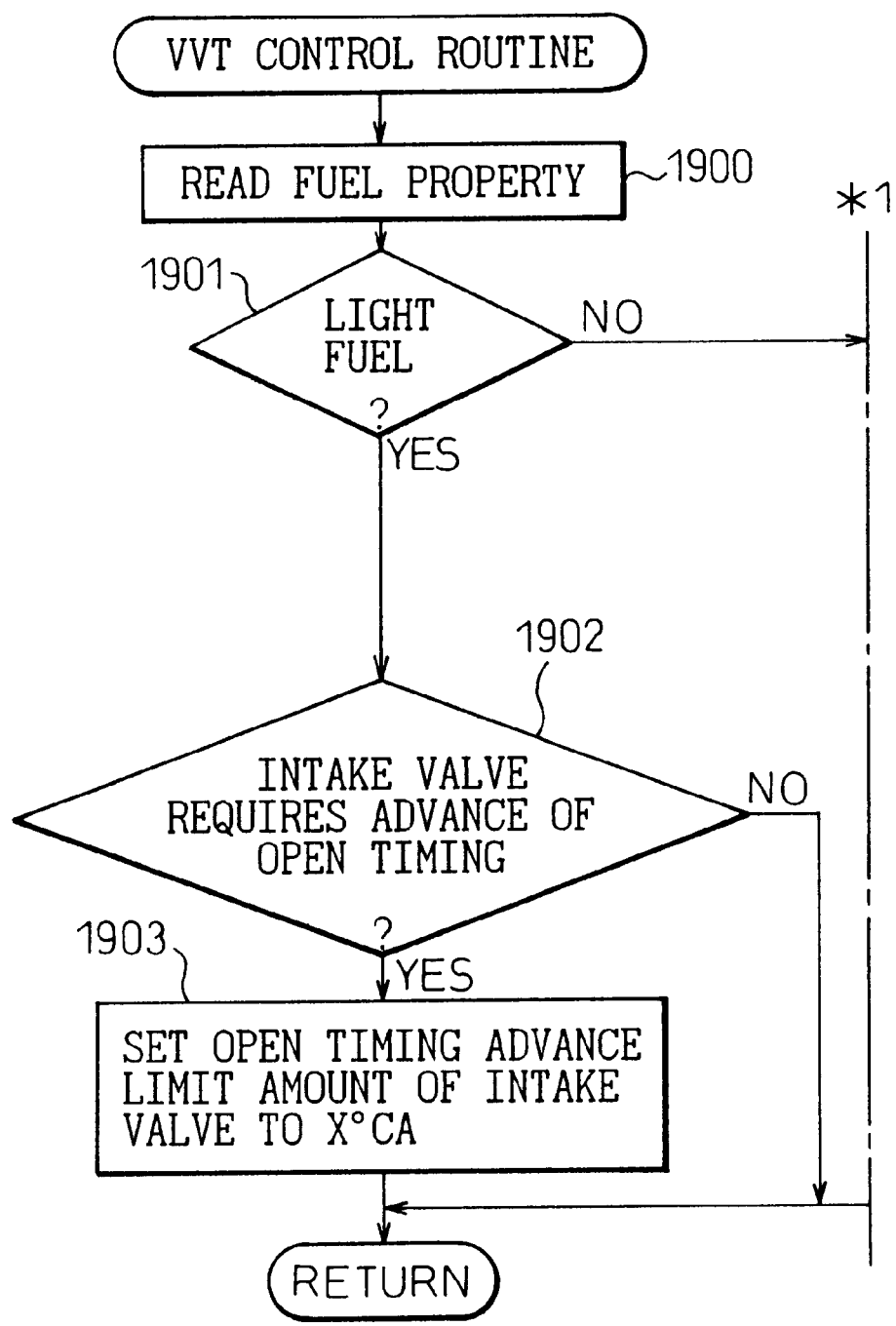

FIGS. 19A and 19B are flowcharts showing the valve timing control device 10 of the engine and the steps of advance control of the open timing of the intake valve 9 according to a fourth embodiment of the present invention. In step 1900, the fuel property determined by the steps explained with reference to FIG. 9A is read. In the next step 1901, it is determined whether the fuel is a light fuel or not.

In the case where the fuel is a light fuel, the process proceeds to step 1902 for determining whether the intake valve 9 requires the advance of the open timing. In the case where the intake valve 9 requires no advance of the open timing, the routine is immediately terminated. In the case where the intake valve 9 requires the advance of the open timing, in contrast, the process proceeds to step 1903, and the open timing advance control amount of the intake valve 9 is set to X0CA and this routine is terminated. In the case where the fuel is not a light fuel in step 1901, on the other hand, the process proceeds to step 1904 for determining whether the fuel is a heavy fuel or not.

In the case where the fuel is not a heavy fuel, it is an intermediate fuel, and therefore the process proceeds to step 1905 for determining whether the intake valve 9 requires the advance of the open timing. In the case where the intake valve 9 requires no advance of the open timing, the routine is immediately terminated. In the case where the intake valve 9 requires the advance of the open timing, on the other hand, the process proceeds to step 1906 and the open timing advance control amount of the intake valve 9 is set to Y0CA, thus terminating this routine. The open timing advance control amount Y0CA of the intake valve 9 set at this time is a value smaller than the open timing advance control amount X0CA for the light fuel. In the case where the decision in step 1904 is a heavy oil, in contrast, the process proceeds to step 1907.

In the case where the fuel is a heavy one, step 1907 determines whether the intake valve 9 requires the advance of the open timing or not. In the case where the intake valve 9 requires no advance of the open timing, the routine is terminated immediately. In the case where the intake valve 9 requires the advance of the open timing, on the other hand, the process proceeds to step 1908, where the open timing advance control amount of the intake valve 9 is set to Z0CA and the routine is terminated. The open timing advance control amount Z0CA of the intake valve 9 set when the fuel is a heavy one is smaller in value than the open timing advance control amount Y0CA for the intermediate fuel.

Figure 27A:
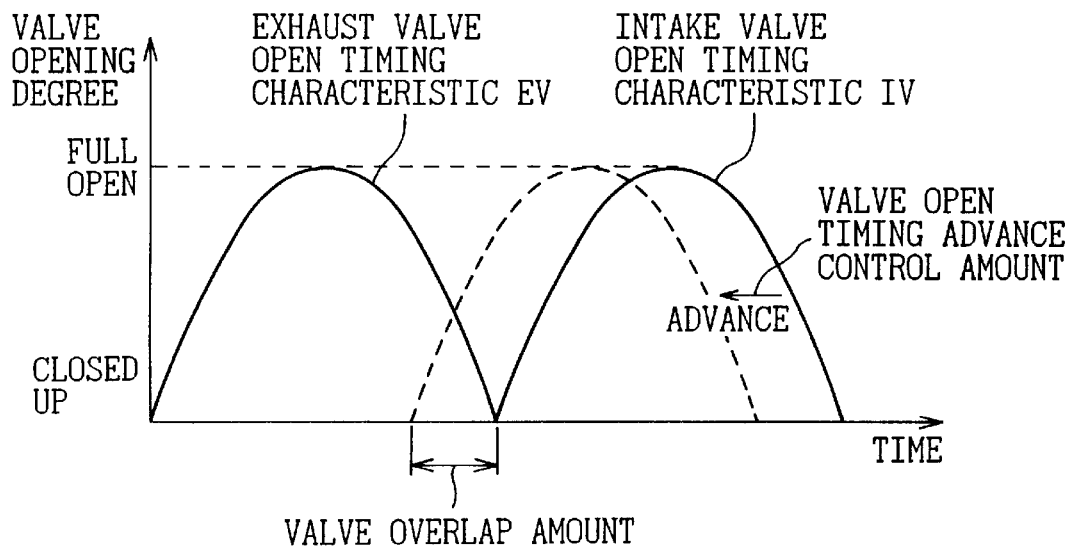
FIG. 27A is a diagram showing the valve open characteristics of the intake valve and the exhaust valve when the intake valve is advanced for obtaining a valve overlap.

Now, the valve overlap which is defined as a period during which both the exhaust valve 8 and the intake valve 9 of a given cylinder in the intake stroke of the engine are open will be explained with reference to FIG. 27A. In FIG. 27A, the solid curve EV represents the open characteristic of the exhaust valve 8, and the solid curve IV the open characteristic of the intake valve 9. In this case, the period during which the exhaust valve 8 is open and the period during which the intake valve 9 is open are not overlapped. So, the valve overlap amount is zero. In the case where the intake valve 9 requires the advance of the open timing from this state, the advance of the open timing of the intake valve 9 causes the intake valve 9 to open earlier as shown by dashed curve in FIG. 27A, so that the open characteristic of the exhaust valve 8 is overlapped with that of the intake valve 9. This overlap of the open characteristic between the exhaust valve 8 and the intake valve 9 is the valve overlap amount. The valve overlap amount is larger, the larger the open timing advance control amount of the intake valve 9.

In the conventional valve timing control device, the open timing advance control amount of the intake valve 9 is changed in accordance with the engine operating conditions. Nevertheless, the control amount has been constant for a predetermined engine operating condition regardless of the fuel property. Generally, in the engine having the valve timing control device, the internal EGR amount is increased with the increase in the valve overlap amount. As a result, when using a heavy fuel liable to attach to the wall surface, the combustion becomes unstable and the drivability is deteriorated.

In order to prevent this inconvenience, according to the fourth embodiment described above, the open timing advance control amount of the intake valve 9 is reduced when a heavy or an intermediate fuel is used as compared with when a light fuel is used. As a consequence, when the intake valve 9 requires the advance of the open timing, the valve overlap amount is changed according to the fuel property, and therefore the deterioration of the drivability is prevented.

Figure 20A:
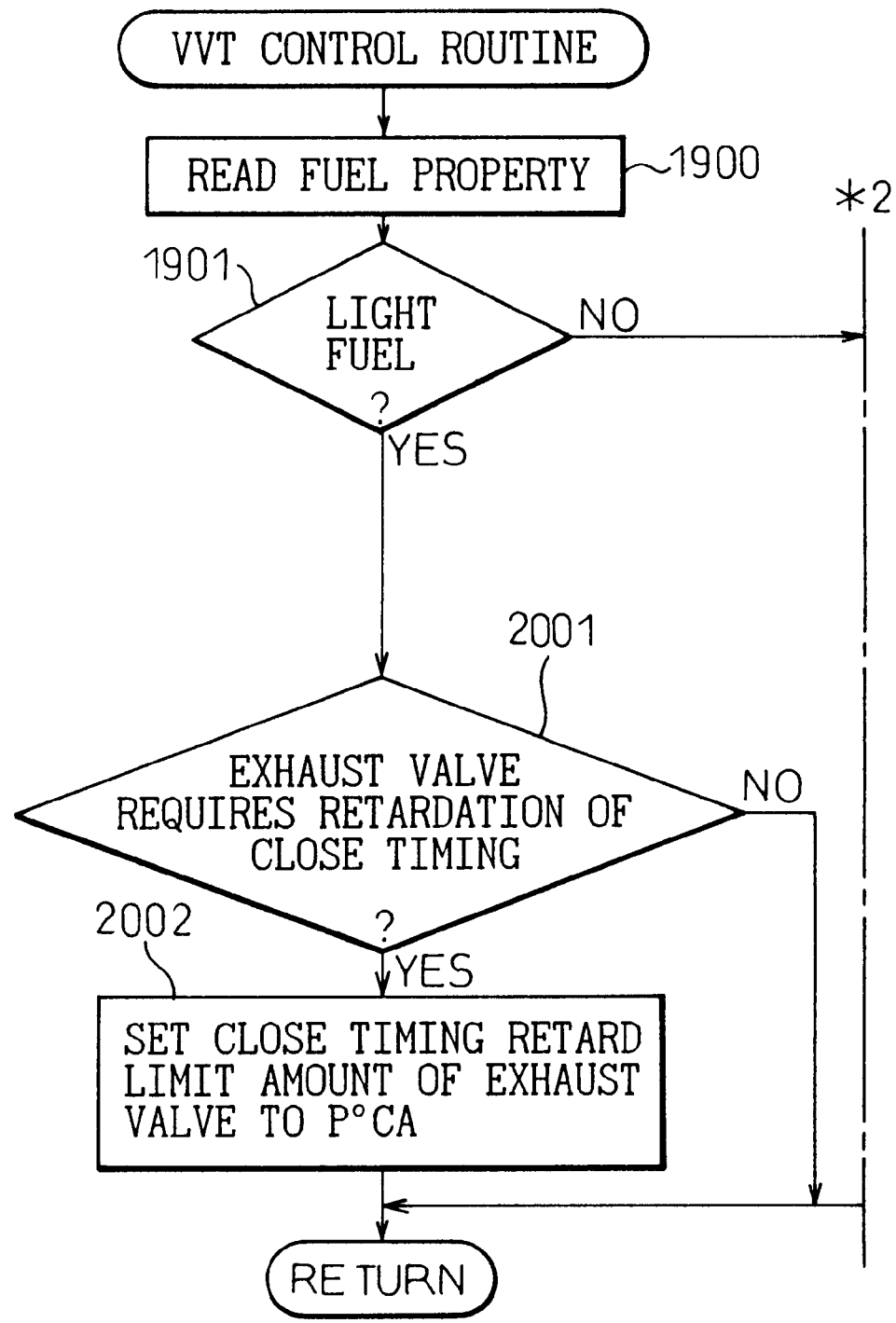

FIGS. 20A and 20B are flowcharts showing an engine valve timing control device 10 according to a fifth embodiment of the invention. This drawing shows the steps of retard control of the close timing of the exhaust valve 8. The steps of controlling the close timing of the exhaust valve 8 are designated by the same numerals as the corresponding steps of open timing control of the intake valve 9, respectively.

In the close timing retard control of the exhaust valve 8, the steps 1900, 1901, 1904 for determining the fuel property are the same as the corresponding steps of open timing advance control. In the case where the fuel is determined as a light fuel in step 1901, the process proceeds to step 2001 for determining whether the exhaust valve 8 requires the retardation of the close timing or not. In the case where the exhaust valve 8 requires no retardation of the close timing, the routine is terminated immediately. In the case where the exhaust valve 8 requires the retardation of the close timing, on the other hand, the process proceeds to step 2002 for setting the close retard control amount of the exhaust valve 8 to P0CA thereby to terminate this routine.

In the case where step 1904 determines that the fuel is an intermediate fuel, on the other hand, the process proceeds to step 2003 for determining whether the exhaust valve 8 requires the retardation of the close timing or not. In the case where the exhaust valve 8 requires no retardation of the close timing, the routine is terminated immediately. In the case where the exhaust valve 8 requires the retardation of the close timing, on the other hand, the process proceeds to step 2004 for setting the close timing retard control amount of the exhaust valve 8 to Q0CA and the routine is terminated. The close timing retard control amount Q0CA of the exhaust valve 8 thus set is a value smaller than the close timing retard control amount P0CA for the light fuel.

In the case where step 1904 determines that the fuel is a heavy fuel, on the other hand, the process proceeds to step 2005. In step 2005, it is determined whether the exhaust valve 8 requires the retardation of the close timing or not. In the case where the exhaust valve 8 requires no retardation of the close timing, the routine is terminated immediately. In the case where the exhaust valve 8 requires the retardation of the close timing, on the other hand, the process proceeds to step 2006 for setting the close timing retard control amount of the exhaust valve 8 to R0CA and the routine is terminated. The close timing retard control amount R0CA of the intake valve 9 set for a heavy fuel is a value smaller than the close timing retard control amount Q0CA for an intermediate fuel.

Figure 27B:
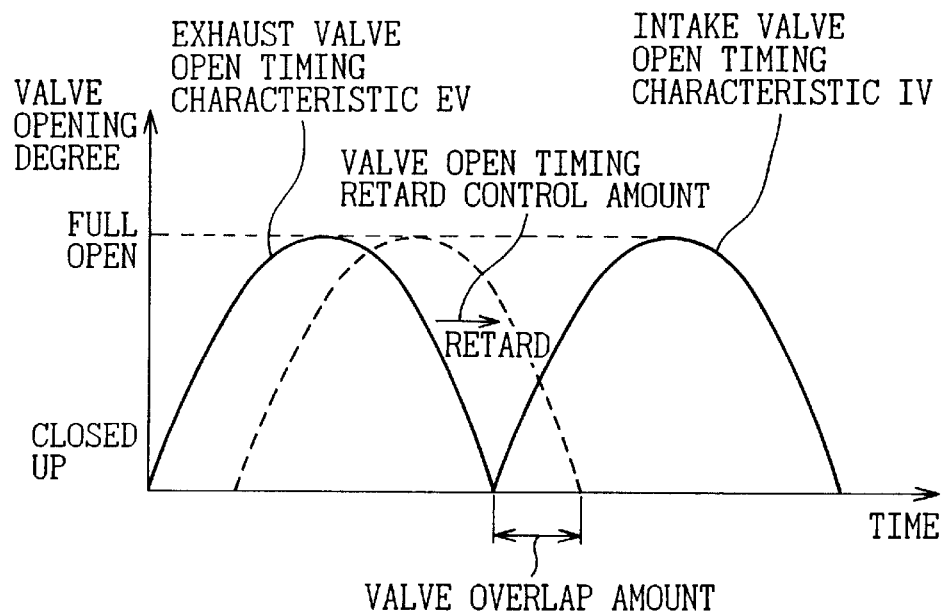
FIG. 27B is a diagram showing the valve open characteristics of the intake valve and the exhaust valve when the exhaust valve is retarded for obtaining a valve overlap.

As described above, according to the fifth embodiment, the close timing retard control amount of the exhaust valve 8 is also adjusted according to the fuel property. This will be explained with reference to FIG. 27B. In FIG. 27B, the solid curve EV represents the open characteristic of the exhaust valve 8, and the solid curve IV the open characteristic of the intake valve 9. When the close timing of the exhaust valve 8 is retarded, the exhaust valve 8 assumes the open characteristic as shown by dashed line in FIG. 27B, and the valve overlap amount between the exhaust valve 8 and the intake valve 9 increases.

According to the fifth embodiment, as seen from the steps described with reference to FIGS. 20A and 20B, the close timing retard control amount of the exhaust valve 8 is smaller for a heavy or intermediate fuel than for a light fuel even when the exhaust valve 8 requires the retardation of the close timing. As a result, in the case where the exhaust valve 8 requires the retardation of the close timing, the valve overlap amount is changed downward according to the fuel property in such a manner as to be progressively reduced with the increase in the degree of heaviness of the fuel in the case where the same exhaust valve 8 requires the advance of the open timing. Thus, the deterioration of the drivability is prevented.

In this way, the open timing advance control amount of the intake valve 9 and the close timing retard control amount of the exhaust valve 8 can be changed in accordance with the fuel property by substantially the same control operation. In the description that follows, therefore, the explanation will be made only about an embodiment involving the open timing advance control of the intake valve 9 taking the fuel property into account, and no embodiment will be explained involving the close timing retard control of the exhaust valve 8.

Figure 21A:
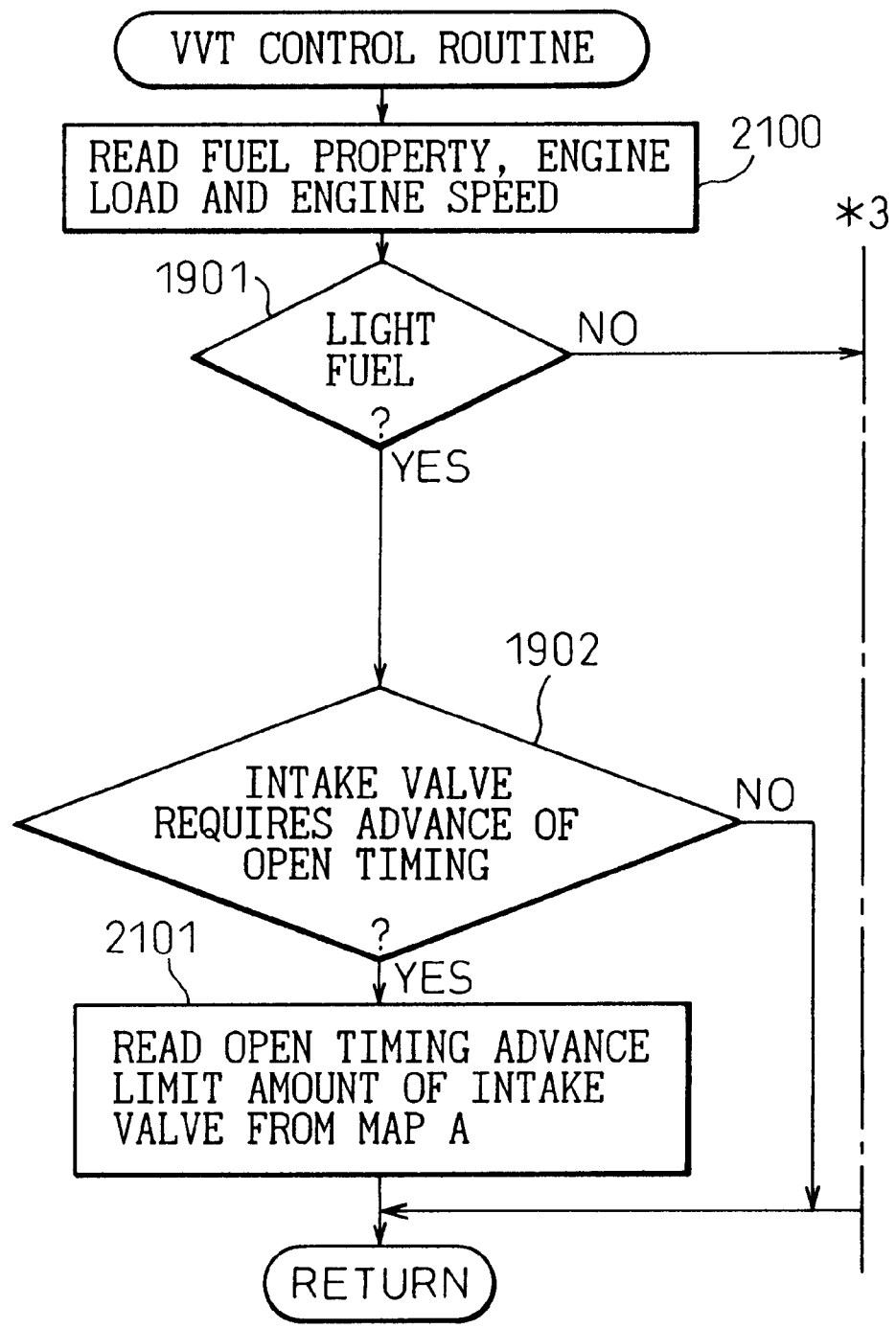

FIGS. 21A and 21B are flowcharts showing an engine valve timing control device 10 according to a sixth embodiment of the present invention, and shows the steps of controlling the advance of the open timing of the intake valve 9. In the description of the control steps according to the sixth embodiment, the same control steps as for the open timing control of the intake valve 9 according to the fourth embodiment shown in FIGS. 19A and 19B will be designated by the same reference numerals, respectively.

In step 2100, the fuel property determined by the process explained with reference to FIG. 9A and the engine speed and the engine load are read. In the next steps 1901 and 1904, it is determined whether the fuel is a light fuel, an intermediate fuel or a heavy fuel.

Figure 22A:
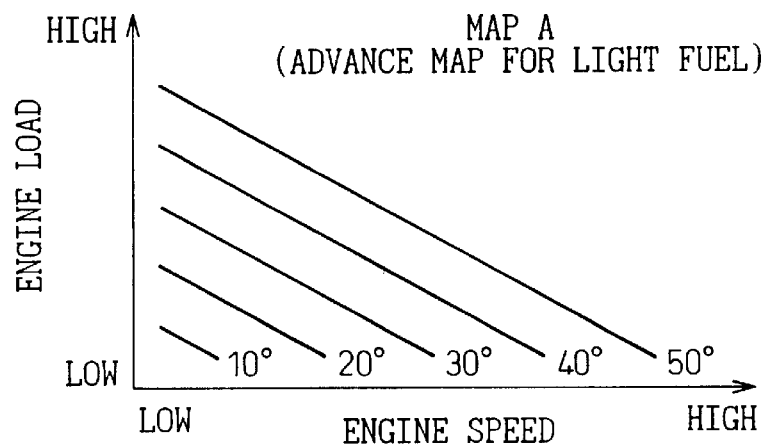
FIG. 22A is a characteristic diagram showing an advance map of the light fuel corresponding to the engine speed and the engine load in the control steps of FIGS. 21A and 21B.

In the case of a light fuel, step 1902 determines whether the intake valve 9 requires the advance of the open timing or not. In the case where the intake valve 9 requires no advance of the open timing, the routine is terminated immediately. In the case where the intake valve 9 requires the advance of the open timing, on the other hand, the process proceeds to step 2101. In step 2101, the amount of advancing the open timing of the intake valve 9 is read from the advance map A of the light fuel stored in the ROM 52 of the ECU 21, and the routine is terminated. The map A, as shown in FIG. 22A, gives the open timing advance characteristic of the intake valve 9 corresponding to the magnitude of the engine speed and the engine load.

Also, in the case of an intermediate fuel, step 1905 determines whether the intake valve 9 requires the advance of the open timing or not. In the case where the intake valve 9 requires no advance of the open timing, the routine is terminated immediately. If the intake valve 9 requires the advance of the open timing, on the other hand, the process proceeds to step 2102. In step 2102, the open timing advance amount of the intake valve 9 is read from the advance map B for the intermediate fuel stored in the ROM 52 of the ECU 21, and the routine is terminated. The map B has the characteristic indicated by solid curve in FIG. 22B, and gives the open timing advance characteristic of the intake valve 9 corresponding to the magnitude of the engine speed and the engine load. By way of comparison, the map B shows the open timing advance characteristic of the light fuel by dotted curve, and the open timing advance characteristic of the heavy fuel by two-dot chain.

Further, in the case of a heavy fuel, step 1907 determines whether the intake valve 9 requires the advance of the open timing or not. In the case where the intake valve 9 requires no advance of the open timing, the routine is terminated immediately. In the case where the intake valve 9 requires the advance of the open timing, on the other hand, the process proceeds to step 2103. In step 2103, the amount of advancing the open timing of the intake valve 9 is read from the advance map C for the heavy fuel stored in the ROM 52 of the ECU 21, and the routine is terminated. The map C has the characteristic indicated by solid curve in FIG. 22C, and gives the open timing advance characteristic of the intake valve 9 corresponding to the magnitude of the engine speed and the engine load. By way of comparison, the open timing advance characteristic of the light fuel is shown by dotted curve in the map C.

In the sixth embodiment, in the case where the heavy or intermediate fuel is used according to the process described in FIGS. 21A and 21B, the engine speed and the engine load giving the same open timing advance value for the intake valve 9 assume a larger value. As a result, in the case where the intake valve 9 requires an advance of the open timing, the valve overlap amount is changed downward in accordance with the fuel property progressively as the degree of fuel heaviness increases for the same valve open timing advance characteristic. Thus a deterioration of the drivability is prevented.

Figure 23A:
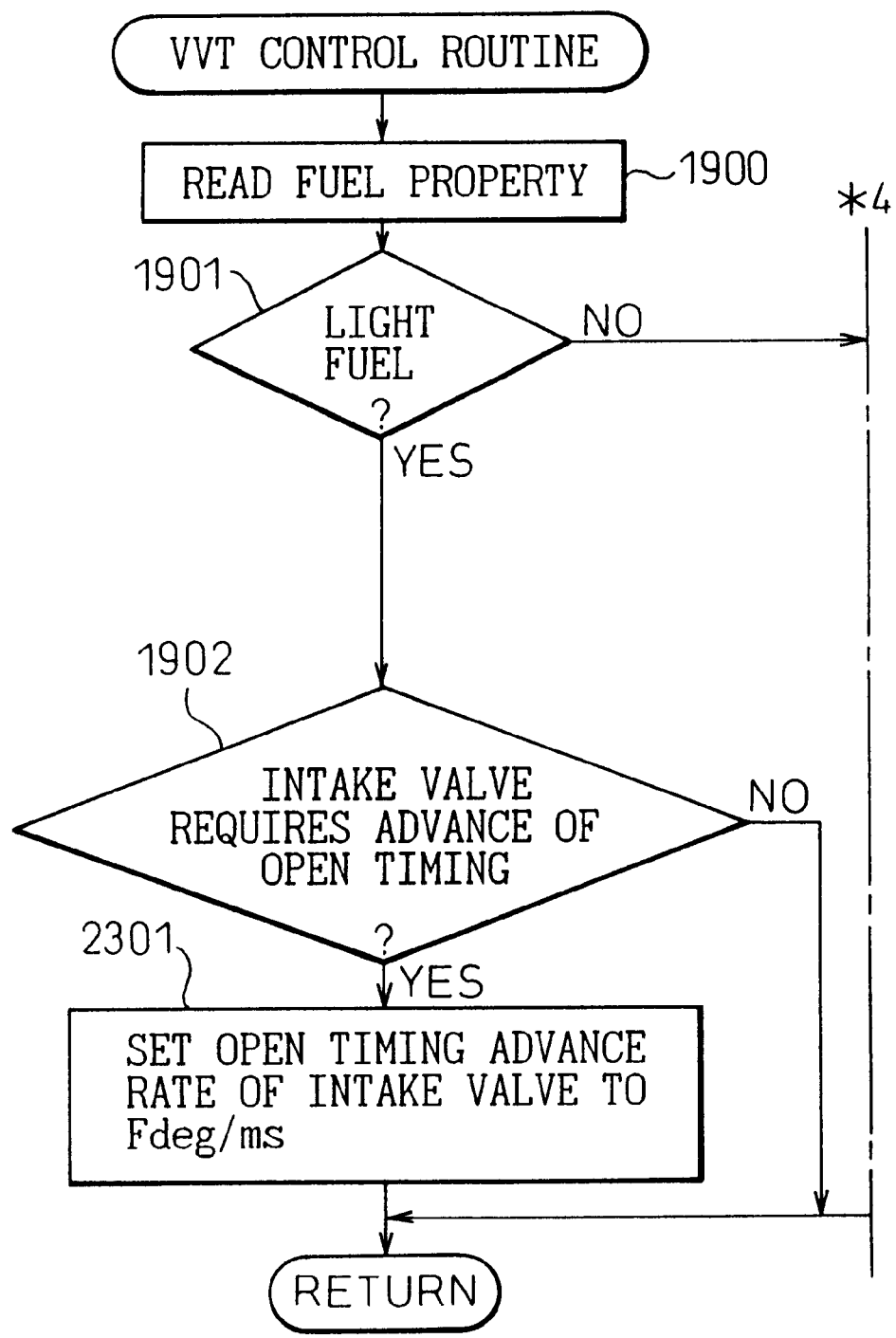

FIGS. 23A and 23B are flowcharts showing a valve timing control device 10 of an engine according to a seventh embodiment of the present invention, and shows the process of controlling the advance of the open timing of the intake valve 9. In the description of the seventh embodiment, the same steps as those for controlling the open timing of the intake valve 9 according to the first embodiment described with reference to FIGS. 19A and 19B are designated by the same numerals, respectively.

In step 1900, the fuel property determined by the steps described with reference to FIG. 9A is read. In the next steps 1901 and 1904, it is determined whether the fuel is light, intermediate or heavy in property.

In the case of a light fuel, step 1902 determines whether the intake valve 9 requires the advance of the open timing or not. In the case where the intake valve 9 requires no advance of the open timing, the routine is terminated immediately. If the intake valve 9 requires the advance of the open timing, on the other hand, the process proceeds to step 2301. In step 2301, the open timing advance rate of the intake valve 9 is set to Fdeg/ms, and the routine is terminated.

Further, in the case of an intermediate fuel, step 1905 determines whether the intake valve 9 requires the advance of the open timing or not. In the case where the intake valve 9 requires no advance of the open timing, the routine is terminated immediately. If the intake valve 9 requires the advance of the open timing, on the other hand, the process proceeds to step 2302. In step 2302, the open timing advance rate of the intake valve 9 is set to Mdeg/ms, and the routine is terminated. The valve open timing advance rate Mdeg/ms is smaller than the valve open timing advance rate Fdeg/ms of the intake valve 9 for the light fuel.

Further, in the case of a heavy fuel, step 1907 determines whether the intake valve 9 requires the advance of the open timing or not. In the case where the intake valve 9 requires no advance of the open timing, the routine is terminated immediately. If the intake valve 9 requires the advance of the open timing, on the other hand, the process proceeds to step 2303. In step 2303, the open timing advance rate of the intake valve 9 is set to Sdeg/ms, and the routine is terminated. The valve open timing advance rate Sdeg/ms is smaller than the valve open timing advance rate Mdeg/ms of the intake valve 9 for the intermediate fuel.

The advance rate of the intake valve 9 can be controlled by the valve timing control device 10 in such a manner that the oil pressure applied to the advance chamber and the retard chamber in the valve timing control device 10 is controlled by an oil control valve in duty cycles. Specifically, the when the oil pressure applied to the advance chamber is increased by increasing the duty factor, the advance rate can be increased.

According to the seventh embodiment, in the case where the heavy or intermediate fuel is used, according to the steps described in FIGS. 23A and 23B, the valve open timing advance rate of the intake valve 9 which otherwise might be the same is smaller for the intermediate fuel than for the light fuel, and smaller for the heavy fuel than for the intermediate fuel. As a consequence, in the case where the intake valve 9 requires the advance of the open timing, the valve overlap amount is changed downward to an increasing extent with the degree of heaviness of the fuel. Thus, a deterioration of the drivability is prevented.

Figure 24A:
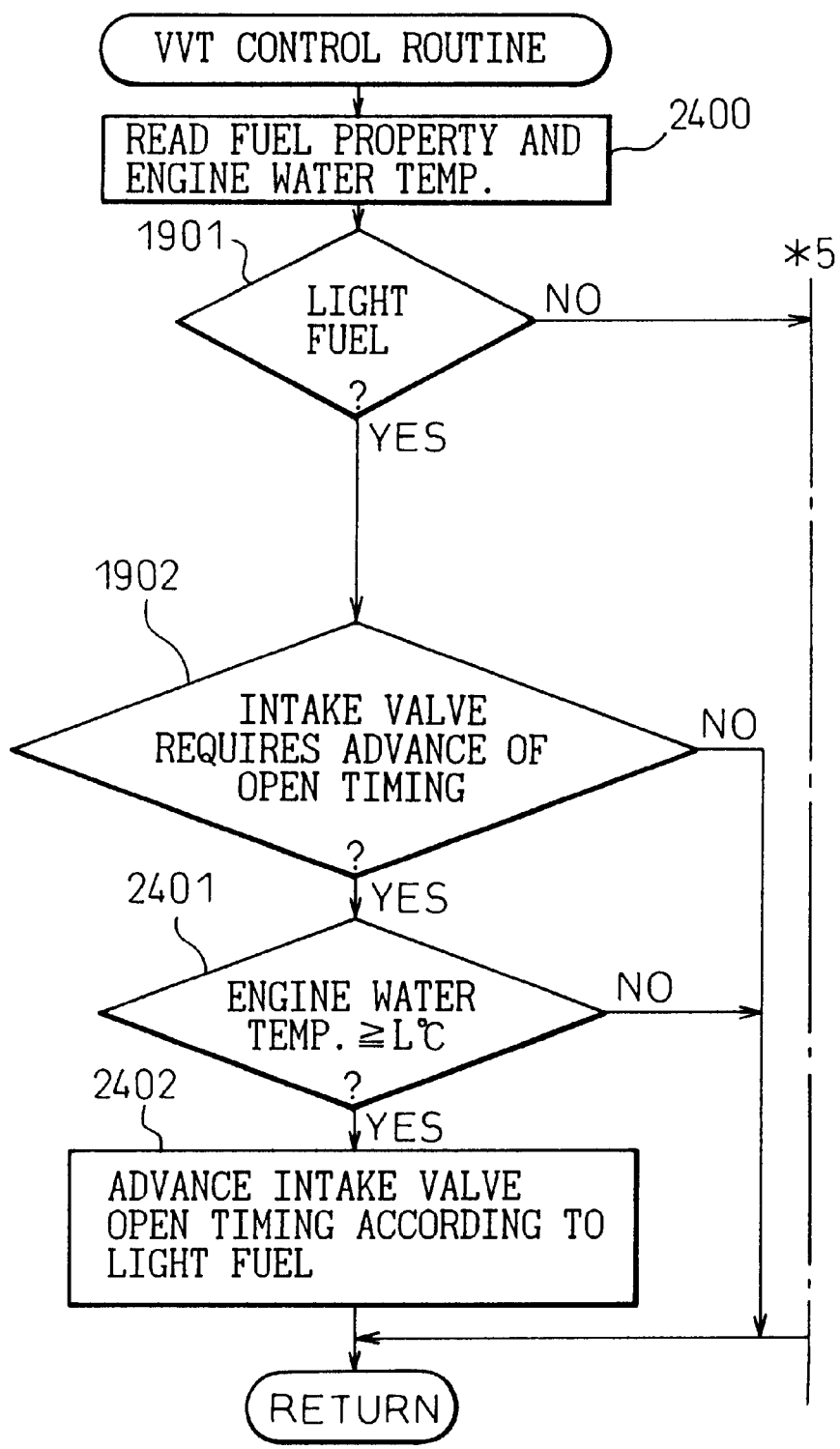
FIGS. 24A and 24B are flowcharts showing the steps of controlling the valve timing according to an eighth embodiment of the invention.
Figure 24B:
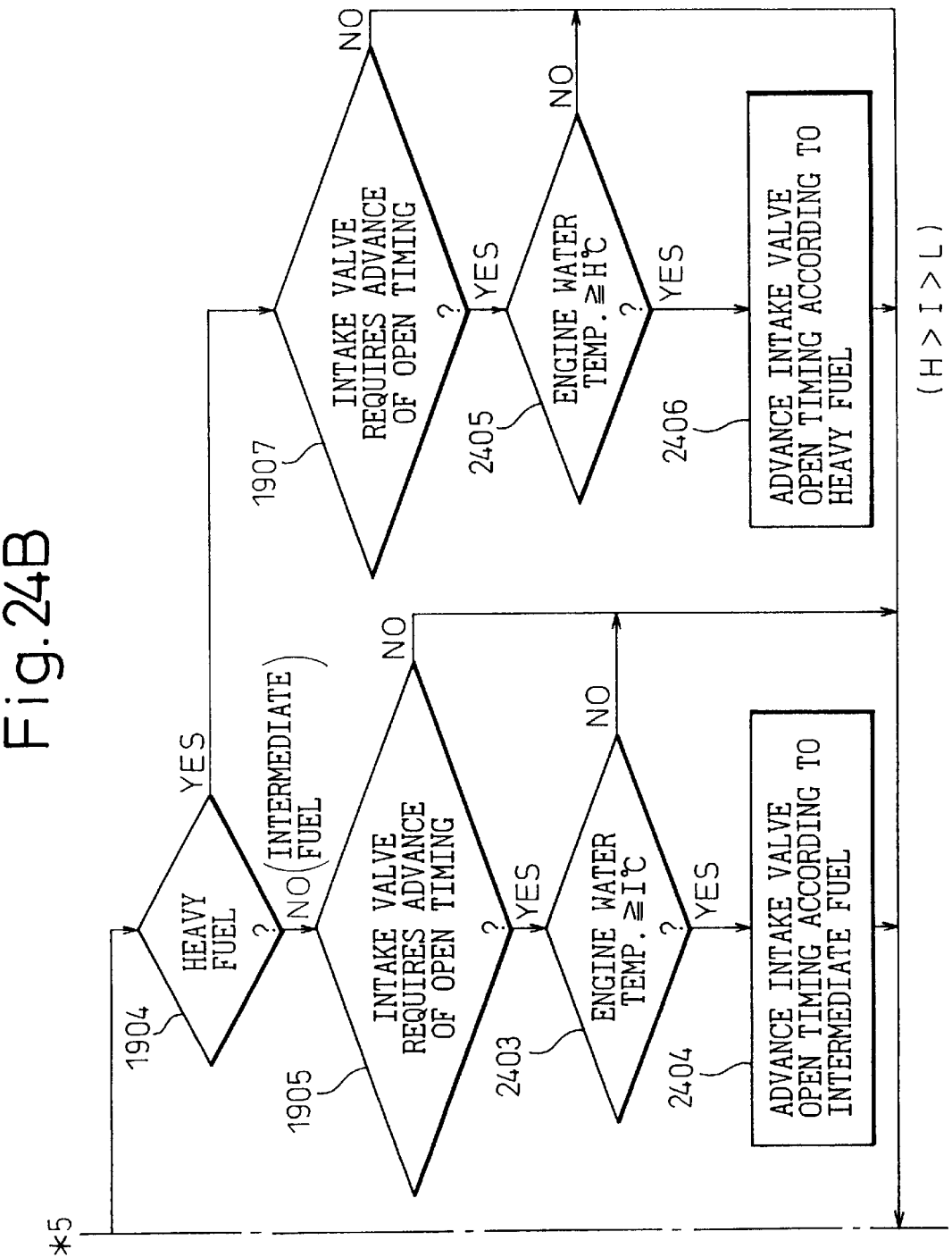

FIGS. 24A and 24B are flowcharts showing an engine valve timing control device 10 according to an eighth embodiment of the invention, and shows the steps of controlling the advance of the open timing of the intake valve 9. In the description of the control steps according to the eighth embodiment, the same steps as the corresponding ones for controlling the open timing of the intake valve 9 in the fourth embodiment described with reference to FIGS. 19A and 19B are designated by the same numerals, respectively.

In step 2400, the fuel property determined by the steps described with reference to FIG. 9A and the engine water temperature are read. In the next steps 1901 and 1904, it is determined whether the fuel is light, intermediate or heavy in property.

In the case of a light fuel, step 1902 determines whether the intake valve 9 requires the advance of the open timing or not. In the case where the intake valve 9 requires no advance of the open timing, the routine is terminated immediately. In the case where the intake valve 9 requires the advance of the open timing, on the other hand, the process proceeds to step 2401. In step 2401, it is determined whether the engine water temperature is not lower than L° C. or not. In the case where the engine water temperature is lower than L° C., the routine is terminated immediately. In the case where the engine water temperature is not lower than L° C., on the other hand, the process proceeds to step 2402. In step 2402, the open time advance of the intake valve 9 is controlled in accordance with the light fuel and the routine is terminated. The open timing advance of the intake valve can be controlled in accordance with the light fuel by use of the advance control amount X described with reference to the fourth embodiment, the advance value on the advance map A described with reference to the sixth embodiment or the advance rate Fdeg/ms described with reference to the seventh embodiment.

In the case of an intermediate fuel, step 1905 determines whether the intake valve 9 requires the advance of the open timing. In the case where the intake valve 9 requires no advance of the open timing, the routine is terminated immediately. In the case where the intake valve 9 requires the advance of the open timing, on the other hand, the process proceeds to step 2403. In step 2403, it is determined whether the engine water temperature is not lower than I ° C. or not. This engine water temperature I assumes a value higher than the engine water temperature L in step 2401. In the case where the engine water temperature is lower than I ° C., the routine is terminated immediately. In the case where the engine water temperature is not lower than I ° C., on the other hand, the process proceeds to step 2404. In step 2404, the open timing advance of the intake valve 9 is controlled in accordance with the intermediate fuel and the routine is terminated. The open timing advance of the intake valve can be controlled in accordance with the intermediate fuel by use of the advance control amount Y in the case where the advance control in step 2402 uses the advance control amount X described with reference to the fourth embodiment, by use of the advance value on the advance map B in the case where the advance control in step 2402 uses the advance value on the advance map A described with reference to the sixth embodiment, and by use of the advance rate Mdeg/ms in the case where the advance control in step 2402 uses the advance rate Fdeg/ms described with reference to the seventh embodiment.

Further, In the case of a heavy fuel, step 1907 determines whether the intake valve 9 requires the advance of the open timing. In the case where the intake valve 9 requires no advance of the open timing, the routine is terminated immediately. In the case where the intake valve 9 requires the advance of the open timing, on the other hand, the process proceeds to step 2405. In step 2405, it is determined whether the engine water temperature is not lower than H ° C. or not. This engine water temperature H assumes a value higher than the engine water temperature I in step 2403. In the case where the engine water temperature is lower than H ° C., the routine is terminated immediately. In the case where the engine water temperature is not lower than H ° C., on the other hand, the process proceeds to step 2406. In step 2406, the open timing advance of the intake valve 9 is controlled in accordance with the heavy fuel and the routine is terminated. The open timing advance of the intake valve in accordance with the heavy fuel can be controlled by use of the advance control amount Z in the case where the advance control in step 2402 uses the advance control amount X described with reference to the fourth embodiment, by use of the advance value on the advance map C in the case where the advance control in step 2402 uses the advance value on the advance map A described with reference to the sixth embodiment, and by use of the advance rate Sdeg/ms in the case where the advance control in step 2402 uses the advance rate Fdeg/ms described with reference to the eighth embodiment.

In the eighth embodiment, as seen from the steps described with reference to FIGS. 24A and 24B, the determination of the engine water temperature is added to the steps described with reference to the fourth to seventh embodiments. In the case where the heavy fuel or the intermediate fuel is used, the water temperature value for determining whether the open timing of the intake valve 9 is to be advanced or not is higher for the intermediate fuel than for the light fuel and higher for the heavy fuel than for the intermediate fuel (L<I<H). As a result, the engine warming condition is added for determining whether the open timing of the intake valve 9 is to be advanced or not. Thus, the deterioration of the drivability can be prevented, the fuel consumption is improved, and the emission can be optimized more positively.

FIGS. 25A and 25B are flowcharts showing an engine valve timing control device 10 according to a ninth embodiment of the invention, and shows the steps of controlling the advance of the open timing of the intake valve 9. In the description of the control steps according to the ninth embodiment, the same steps as the corresponding ones for the open timing of the intake valve 9 in the fourth embodiment described with reference to FIGS. 19A and 19B are designated by the same numerals, respectively.

In step 2500, the fuel property determined by the steps described with reference to FIG. 9A, the engine water temperature, the engine load and the engine speed are read. In the next steps 1901 and 1904, the fuel is determined as light, intermediate or heavy in property.

In the case of a light fuel, step 1902 determines whether the intake valve 9 requires the advance of the open timing. In the case where the intake valve 9 requires no advance of the open timing, the routine is terminated immediately. In the case where the intake valve 9 requires the advance of the open timing, on the other hand, the process proceeds to step 2401. In step 2401, it is determined whether the engine water temperature is not lower than L ° C. or not. In the case where the engine water temperature is not lower than L ° C., the process of step 2101 is executed and the routine is terminated. In the case where the engine water temperature is lower than L ° C., on the other hand, the process of step 2502 is executed and the routine is terminated.

Figure 26A:
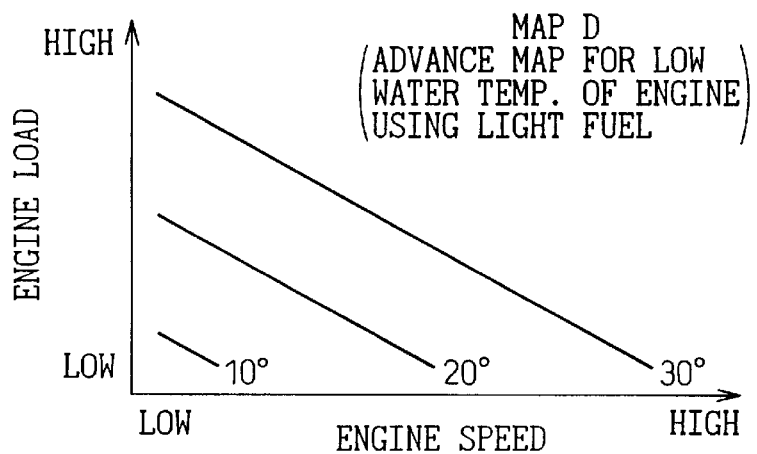
FIG. 26A is a characteristic diagram of the advance map when the water temperature is low for the engine using the light fuel in the control steps of FIGS. 21A and 21B.

Step 2101 involves the same process as the corresponding step in the third embodiment. The open timing advance amount of the intake valve 9 is read from the advance map A for the light fuel stored in the ROM 52 of the ECU 21. The map A, as described with reference to FIG. 22A, gives the open timing advance characteristic of the intake valve 9 corresponding to the engine speed and the engine load. In step 2501, on the other hand, the open timing advance amount of the intake valve 9 is read from the advance map D for the light fuel stored in the ROM 52 of the ECU 21. The map D is an advance map for the light fuel for a low engine water temperature, and the characteristic thereof is shown in FIG. 26A. The map D, like the map A, gives the open timing advance characteristic of the intake valve 9 corresponding to the engine speed and the engine load. As seen from comparison with the map A shown in FIG. 22A, however, the open timing advance value of the intake valve 9 corresponding to the engine speed and the engine load is smaller than when the engine water temperature is high.

In the case of an intermediate fuel, step 1905 determines whether the intake valve 9 requires the advance of the open timing. In the case where the intake valve 9 requires no advance of the open timing, the routine is terminated immediately. In the case where the intake valve 9 requires the advance of the open timing, on the other hand, the process proceeds to step 2403. In step 2403, it is determined whether the engine water temperature is not lower than I ° C. or not. This engine water temperature I is a value higher than the engine water temperature L in step 2402. In the case where the engine water temperature is not lower than I ° C., the process of step 2102 is executed and the routine is terminated. In the case where the engine water temperature is lower than I ° C., on the other hand, the process of step 2502 is executed and the routine is terminated.

Figure 22B:
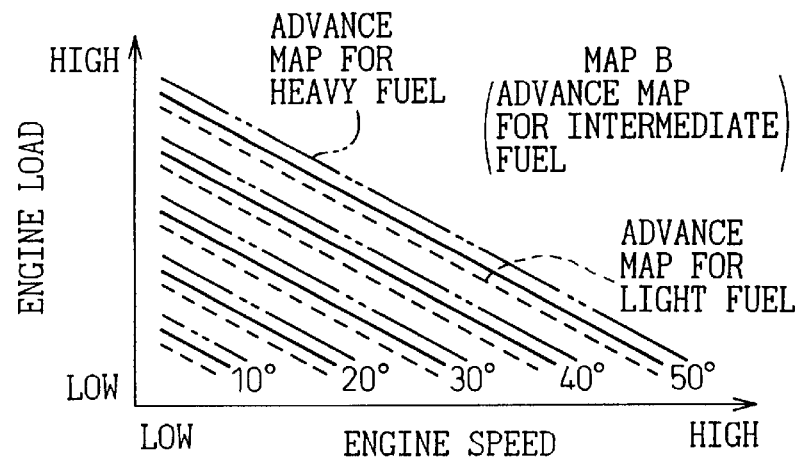
FIG. 22B is a characteristic diagram showing an advance map of the intermediate fuel corresponding to the engine speed and the engine load in the control steps of FIGS. 21A and 21B.
Figure 26B:
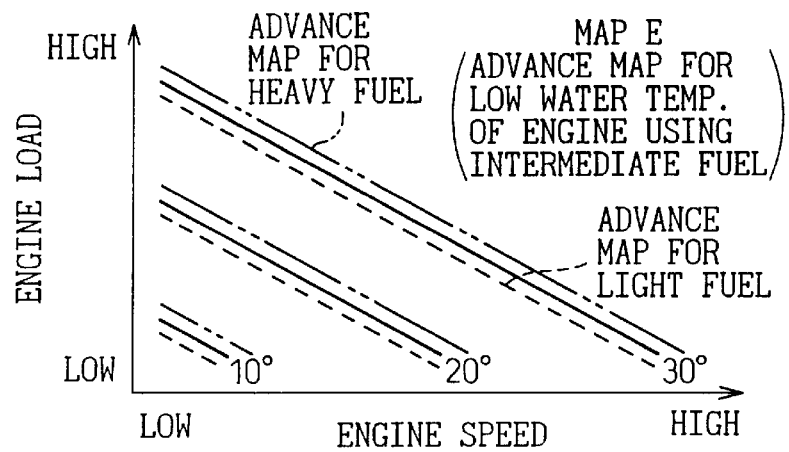
FIG. 26B is a characteristic diagram of the advance map when the water temperature is low for the engine using the intermediate fuel in the control steps of FIGS. 21A and 21B.

Step 2102 involves the same process as the corresponding step in the sixth embodiment. The open timing advance amount of the intake valve 9 is read from the advance map B for the intermediate fuel stored in the ROM 52 of the ECU 21. The map B, as described with reference to FIG. 22B, gives the open timing advance characteristic of the intake valve 9 corresponding to the engine speed and the engine load. In step 2502, on the other hand, the open timing advance amount of the intake valve 9 is read from the advance map E for the intermediate fuel stored in the ROM 52 of the ECU 21. The map E is an advance map for the intermediate fuel for a low engine water temperature, and the characteristic thereof is shown by solid curve in FIG. 26B. The map E, like the map B, gives the open timing advance characteristic of the intake valve 9 corresponding to the engine speed and the engine load. As seen from comparison with the map B shown in FIG. 22B, however, the open timing advance value of the intake valve 9 corresponding to the engine speed and the engine load is smaller than when the engine water temperature is high. By way of comparison, the open timing advance characteristic at a low engine temperature for a light fuel is shown by dotted curve, and the open timing advance characteristic at a low engine temperature for a heavy fuel by two-dot chain.

Further, in the case of a heavy fuel, step 1907 determines whether the intake valve 9 requires the advance of the open timing. In the case where the intake valve 9 requires no advance of the open timing, the routine is terminated immediately. In the case where the intake valve 9 requires the advance of the open timing, on the other hand, the process proceeds to step 2405. In step 2405, it is determined whether the engine water temperature is not lower than H ° C. or not. This engine water temperature H is a value higher than the engine water temperature I in step 2403. In the case where the engine water temperature is not lower than H ° C., the process of step 2103 is executed and the routine is terminated. In the case where the engine water temperature is lower than H ° C., on the other hand, the process of step 2503 is executed and the routine is terminated.

Figure 22C:
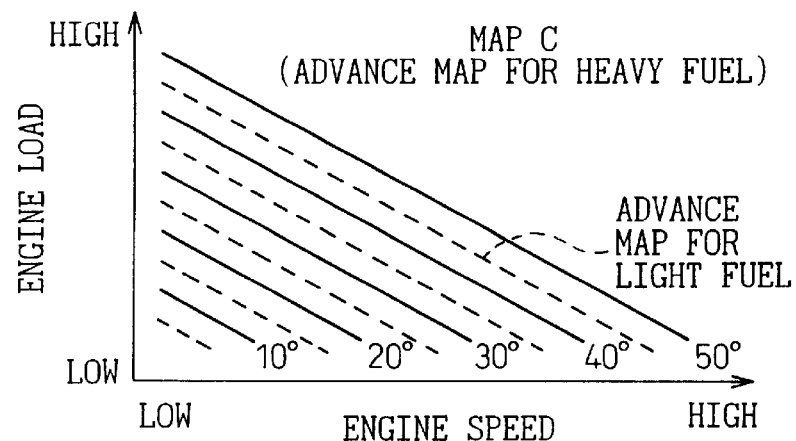
FIG. 22C is a characteristic diagram showing an advance map of the heavy fuel corresponding to the engine speed and the engine load in the control steps of FIGS. 21A and 21B.
Figure 26C:
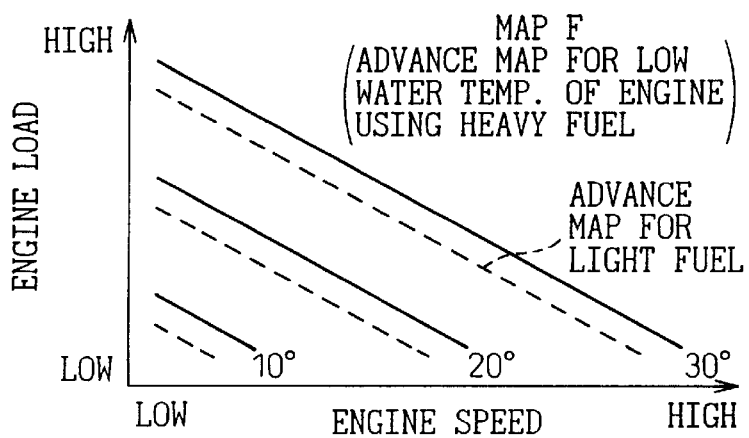
FIG. 26C is a characteristic diagram of the advance map when the water temperature is low for the engine using the heavy fuel in the control steps of FIGS. 21A and 21B.

Step 2103 involves the same process as the corresponding step in the sixth embodiment. The open timing advance amount of the intake valve 9 is read from the advance map C for the heavy fuel stored in the ROM 52 of the ECU 21. The map C, as described with reference to FIG. 22C, gives the open timing advance characteristic of the intake valve 9 corresponding to the magnitude of the engine speed and the engine load. In step 2503, on the other hand, the open timing advance amount of the intake valve 9 is read from the advance map F for the heavy fuel stored in the ROM 52 of the ECU 21. The map F is an advance map for the heavy fuel for a low engine water temperature, and the characteristic thereof is shown by solid curve in FIG. 26C. The map F, like the map C, gives the open timing advance characteristic of the intake valve 9 corresponding to the magnitude of the engine speed and the engine load. As seen from comparison with the map C shown in FIG. 22C, however, the open timing advance value of the intake valve 9 corresponding to the magnitude of the engine speed and the engine load is smaller than when the engine water temperature is high. By way of comparison, the open timing advance characteristic at a low engine temperature for a light fuel is shown by dotted curve.

In the ninth embodiment, as seen from the steps described with reference to FIGS. 25A and 25B, the determination of the engine water temperature is added to the steps described with reference to the fourth embodiment. Specifically, the ninth embodiment is different from the fourth embodiment in that the open timing advance value of the intake valve 9 corresponding to the fuel property in the fourth embodiment is reduced by another advance map corresponding to the water temperature when the engine water temperature is low. In the case of a heavy fuel or intermediate fuel, the water temperature value for determining a small open timing advance value for the intake valve 9 is higher for the intermediate fuel than for the light fuel, and higher for the heavy fuel than for the intermediate fuel. As a result, the open timing advance value for the intake valve 9 is controlled in fine detail in accordance with the engine water temperature and the fuel property. In this way, the deterioration of the drivability is prevented, the fuel consumption rate is improved, and the emission is optimized more positively.

In the eighth and ninth embodiments, the engine oil temperature can be used instead of the engine water temperature. Also, both the engine water temperature and the oil temperature can be used to assure more fine detailed control. Further, in the aforementioned embodiments, the fuel property was determined by the ECU 21 based on the output of the vapor flowmeter 44. As an alternative, the fuel property can be determined by a fuel sensor which may be mounted on the fuel tank 17.

Also, the retard control of the close timing of the exhaust valve by the valve timing control device is described only with reference to the fourth embodiment. Nevertheless, in the fifth to ninth embodiments, the retard control of the close timing of the exhaust valve by the valve timing control device can be carried out in the manner similar to the advance control of the open timing of the intake valve.

Further, the valve timing control device according to the present invention described with reference to the first to ninth embodiments is applicable to any valve variable means in which the valve overlap amount can be changed. For example, in the valve variable means for selectively switching a plurality of cams having different valve lifts, the overlap amount can be changed by applying the present invention.

What is claimed is:

1. A valve timing control device for changing a valve timing of one of an intake valve and an exhaust valve of an engine, comprising:

valve variable means for changing a valve overlap amount from an opening of the intake valve to a closing of the exhaust valve of a cylinder of the engine;

means for detecting operating conditions of the engine;

control means for controlling an operating amount of said valve variable means in accordance with the engine operating conditions;

fuel property detection means for detecting a property of fuel burned in the engine; and operating amount correction means for the control means for correcting a control amount of said control means in accordance with the fuel property detected by said fuel property detection means.

2. A valve timing control device according to claim 1, wherein said operating amount correction means for said control means corrects said control amount based on a limit value corresponding to the fuel property detected by said fuel property detection means.

3. A valve timing control device according to claim 2, wherein the correction of said control amount by the operating amount correction means adjusts, based on the detected fuel property, a limit value of an open timing advance amount of the intake valve and a limit value of a close timing retard amount of the exhaust valve.

4. A valve timing control device according to claim 3, wherein said limit value of the open timing advance amount of said intake valve and said limit value of the close timing retard amount of said exhaust valve are largest for light fuel property and progressively decrease for intermediate and heavy fuel properties respectively.

5. A valve timing control device according to claim 1, wherein said operating amount correction means for said control means changes the correction amount in accordance with the fuel property detected by said fuel property detection means and the engine operating conditions.

6. A valve timing control device according to claim 5, wherein said correction amount of said operating amount correction means of said control means is changed by reading the correction amount from a map corresponding to the fuel property detected by said fuel property detection means and the engine operating conditions.

7. A valve timing control device according to claim 1, wherein said means for detecting the engine operating conditions includes means for detecting an engine temperature, said control means sets the operating amount of said valve variable means when the engine temperature is low to a value lower than that to which the operating amount is set when the engine temperature is high, and wherein said operating amount correction means increases said control amount when the engine temperature is low ad said fuel property detection means determines that a heavy fuel is being used in the engine.

8. A valve timing control device according to claim 1, wherein said means for detecting the engine operating conditions includes means for detecting an engine temperature, and said control means activates said valve variable means when the engine temperature is at least a predetermined value.

9. A valve timing control device according to claim 8, wherein said engine temperature at which said valve variable means is activated by said control means is lowest for light fuel property and progressively increases for intermediate and heavy fuel properties respectively.

10. A valve timing control device for controlling operation of one of an intake and exhaust valve of an engine, comprising:
   valve variable means for changing a valve overlap amount from an opening of the intake valve to a closing of the exhaust valve;
   means for detecting operating conditions of the engine;
   control means for determining a valve overlap amount based on the engine operating conditions and for controlling the valve variable means to achieve the determined valve overlap amount;
   fuel property detection means for detecting a property of fuel burned in the engine; and
   operating amount limiting means for limiting a degree of control of the control means in accordance with the fuel property detected by the fuel property detecting means.

* * * * *